United States Patent [19]
Nakanishi

[11] Patent Number: 5,715,332
[45] Date of Patent: Feb. 3, 1998

[54] IMAGE TRANSMISSION METHOD, AND APPARATUS THEREFOR

[75] Inventor: Hiroyuki Nakanishi, Yokohama, Japan

[73] Assignee: Canon Kabushiki Kaisha, Japan

[21] Appl. No.: 400,524

[22] Filed: Mar. 7, 1995

Related U.S. Application Data

[63] Continuation of Ser. No. 856,173, Mar. 23, 1992, abandoned.

[30] Foreign Application Priority Data

Mar. 26, 1991 [JP] Japan .................. 3-061650

[51] Int. Cl.$^6$ .................................................. G06K 9/36
[52] U.S. Cl. .................................................. 382/232
[58] Field of Search ........................ 358/426, 430; 380/18, 20, 23, 28, 50; 382/232, 238

[56] References Cited

U.S. PATENT DOCUMENTS

| | | | |
|---|---|---|---|
| 4,302,775 | 11/1981 | Widergren et al. | 382/232 |
| 4,325,085 | 4/1982 | Gooch | 382/238 |
| 4,751,742 | 6/1988 | Meeker | 382/240 |
| 4,878,246 | 10/1989 | Pastor et al. | 380/50 |
| 4,985,919 | 1/1991 | Naruse et al. | 380/18 |
| 5,086,487 | 2/1992 | Katayama et al. | 382/56 |
| 5,117,458 | 5/1992 | Takaragi | 380/4 |
| 5,121,448 | 6/1992 | Katayama et al. | 382/57 |
| 5,124,811 | 6/1992 | Ohsawa et al. | 358/448 |
| 5,136,396 | 8/1992 | Kato et al. | 358/426 |
| 5,138,672 | 8/1992 | Hirabayashi et al. | 382/54 |
| 5,148,271 | 9/1992 | Kato et al. | 382/232 |
| 5,218,638 | 6/1993 | Matsumoto et al. | 380/23 |

FOREIGN PATENT DOCUMENTS

| | | |
|---|---|---|
| 0015534 | 9/1980 | European Pat. Off. |
| 0371726 | 6/1990 | European Pat. Off. |
| 3921617 | 4/1990 | Germany |
| 4040391 | 6/1991 | Germany |

*Primary Examiner*—Jose L. Couso
*Attorney, Agent, or Firm*—Fitzpatrick, Cella, Harper & Scinto

[57] ABSTRACT

The secrecy of data transmitted by an image transmission apparatus can be maintained by performing encoding or decoding in conformity with identification information specifying the apparatus. The image transmission apparatus, which is for dynamically converting the image data accumulated in a memory into an arithmetic code and then transmitting the code, is so adapted that, on the sending side, an initializing table for the purpose of encoding is read out of an initializing ROM based upon an ID specifying the apparatus, and a CODEC 107 performs encoding based upon the table. The encoded data is transmitted via a CCU and is decoded on the receiving side in the same manner as encoding was performed on the sending side. As a result, the secrecy of the contents of the communication can be maintained.

22 Claims, 57 Drawing Sheets

| INDEX | NMPS | NLPS | P | SWITCH |
|---|---|---|---|---|
| 0 | 1 | 1 | 0.5 | 1 |
| 1 | 2 | 0 | 0.4375 | 0 |
| 2 | 3 | 1 | 0.375 | 0 |
| 3 | 4 | 2 | 0.3125 | 0 |
| ⋮ | ⋮ | ⋮ | ⋮ | ⋮ |
| 255 | 255 | 254 | $2^{-15}$ | 0 |

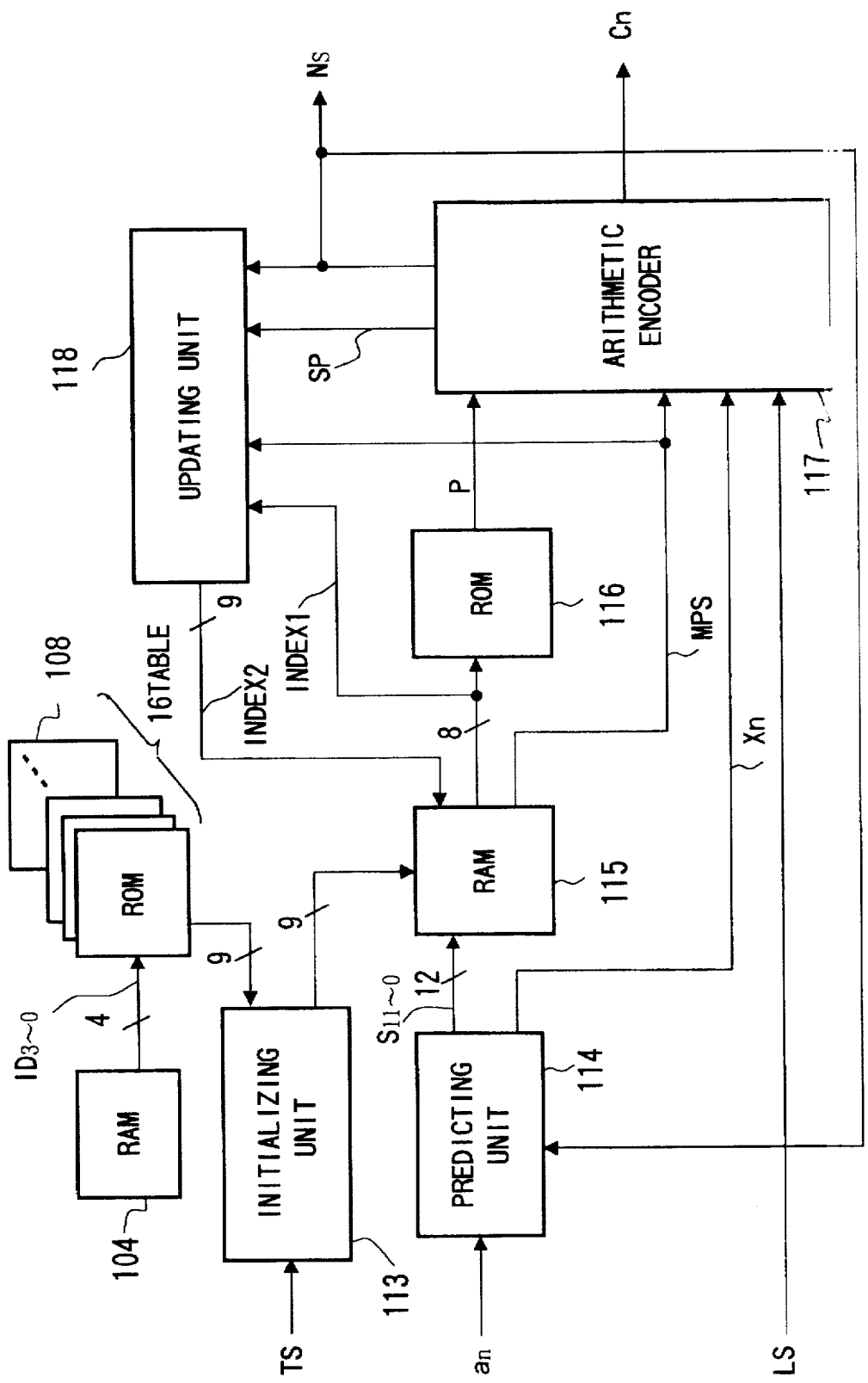

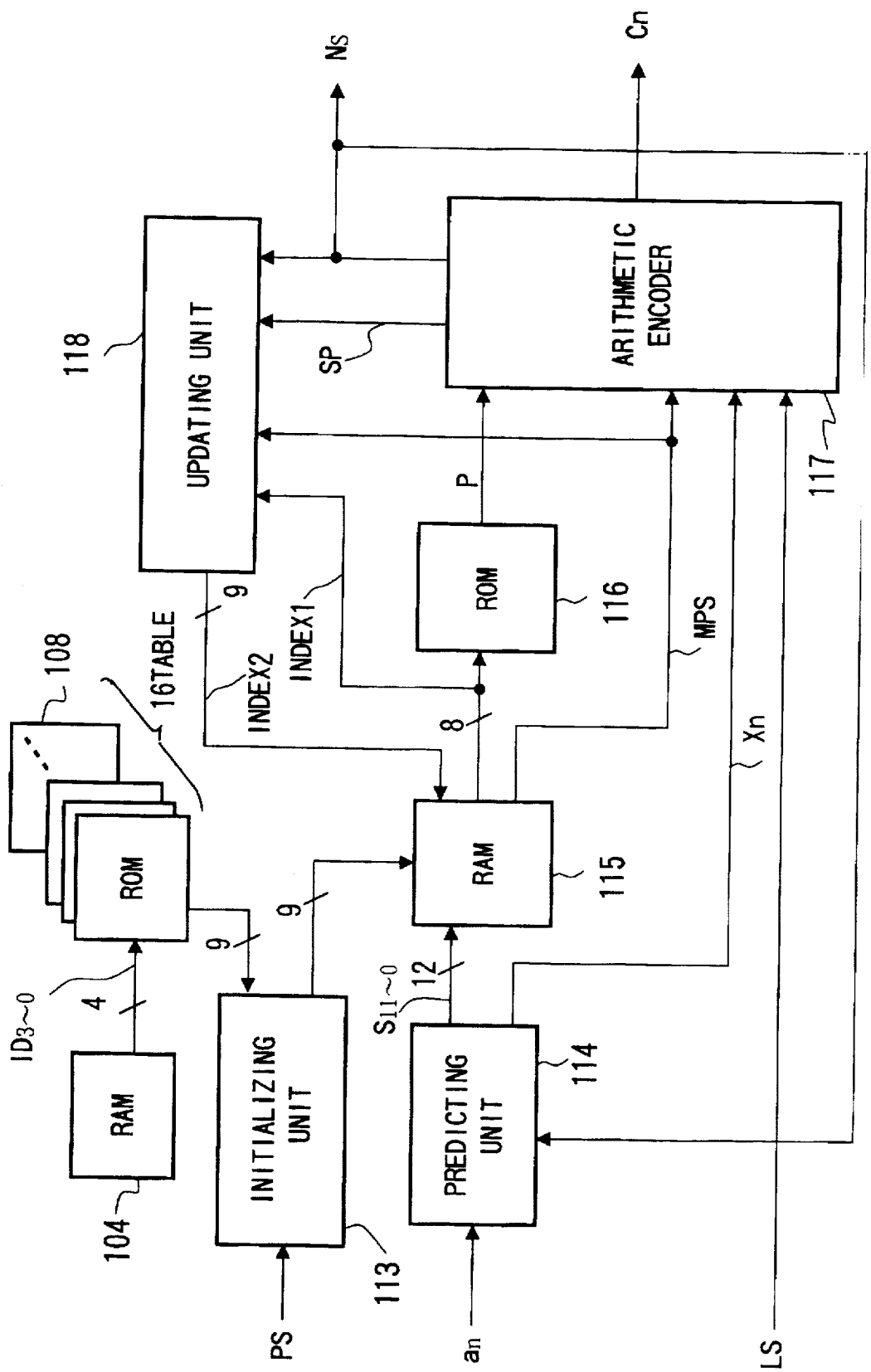

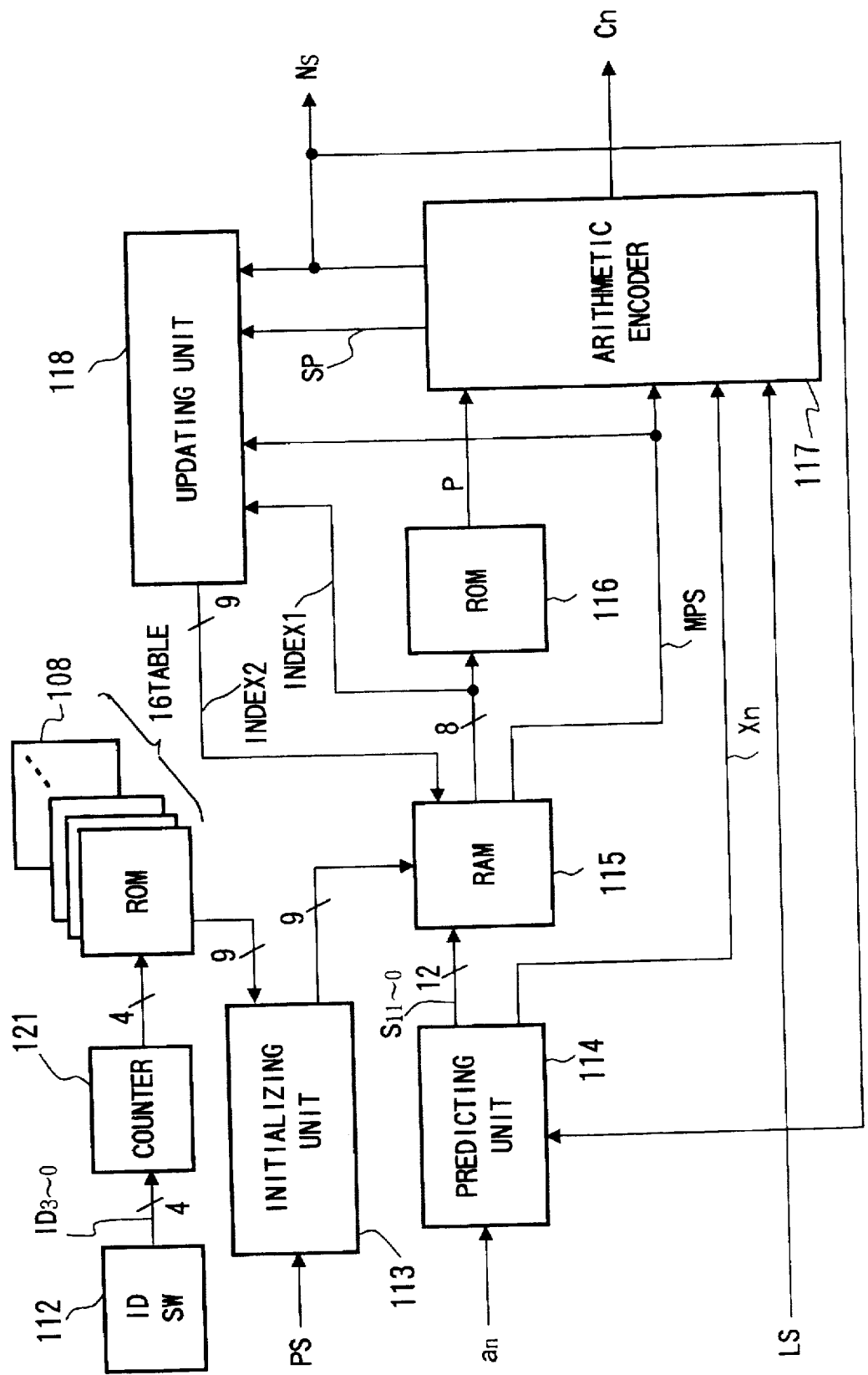

IMAGE TRANSMISSION METHOD, AND APPARATUS THEREFOR

This application is a continuation of application Ser. No. 07/856,173 filed Mar. 23, 1992 now abandoned.

BACKGROUND OF THE INVENTION

1. Field of the Invention

This invention relates to an image transmission method and apparatus in which an input image data is compressed and the compressed image data is transmitted. More particularly the invention relates to an image transmission method and apparatus in which enciphering is performed by carrying out encoding upon changing the parameters of the compression.

2. Description of the Prior Art

In the prior art, for example, a dynamic arithmetic encoding method has been proposed as an encoding method for encoding a black-and-white binary image. This encoding system involves predicting whether a pixel is "0" or "1", performing arithmetic dynamically depending upon whether the prediction is correct or erroneous, and then performing encoding.

With this dynamic arithmetic encoding method, however, a drawback is that absolutely no consideration is given to enciphering of data when the encoded data is transmitted, and therefore the confidentiality of the contents of a communication cannot be maintained. The drawback is also exist in other encoding systems, for example, ADCT (Adaptive Discrete Cosine Transform).

SUMMARY OF THE INVENTION

An object of the present invention is to provide an image transmitting method and apparatus in which the confidentiality of transmitted data can be maintained by performing encoding or decoding in dependence upon identification information which specifies an apparatus.

According to the present invention, the foregoing object is attained by providing an image transmission apparatus comprising initializing means for initializing a parameter for encoding in dependence upon identification information which specifies an apparatus, encoding means for encoding the image data based upon the parameter initialized by the initializing means, and transmitting means for transmitting the image data encoded by the encoding means.

In a preferred embodiment, the initializing means includes memory means for storing a plurality of initializing tables selected in dependence upon the identification information, and selecting means for selecting an initializing table stored by the memory means, wherein initialization of a predicted-state memory for encoding is performed by the initializing table selected by the selecting means.

Another object of this invention is to provide an efficient image data transmission method. Further object of this invention is to provide a simple structure of an image encoding or decoding apparatus. Still further object of this invention is to provide an image encoding or decoding apparatus easy to operate for an operator.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 31 is a block diagram illustrating the construction of the encoder in a second embodiment;

FIG. 39 is a block diagram illustrating the construction of the encoder in a fourth embodiment;

FIG. 43 is a block diagram illustrating the construction of the encoder in a fifth embodiment;

DESCRIPTION OF THE PREFERRED EMBODIMENTS

Preferred embodiments of the present invention will now be described in detail with reference to the accompanying drawings.

First, a dynamic arithmetic encoding method will be described in detail.

Figure 1:
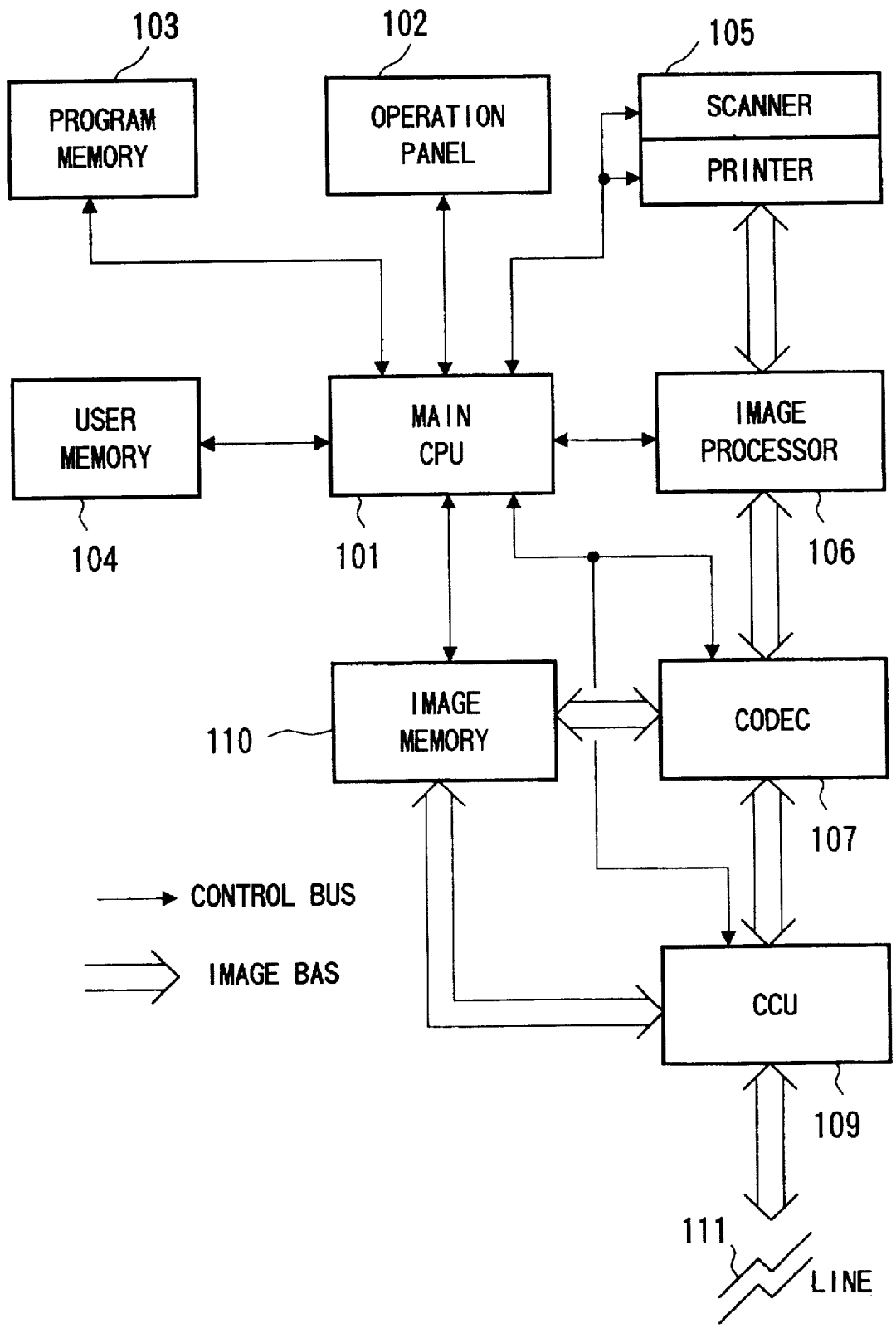
FIG. 1 is a block diagram illustrating the construction of an ordinary image transmission apparatus.

FIG. 1 is a block diagram illustrating an example of an ordinary image transmitting apparatus which employs a dynamic arithmetic encoding method. The apparatus includes a main CPU 101 which carries out overall control of the other blocks, an operation panel 102 at which the user controls the image transmission apparatus, a program memory 103, such as a ROM, storing various programs executed by the main CPU 101, and a user memory 104, such as a RAM, in which data registered by the user, such as numbers for abbreviated dialing, is stored. The apparatus further includes a scanner/printer 105 for reading in or printing out an image, an image processor 106 which executes binarization processing or the like, a CODEC 107 which performs encoding or decoding by means of dynamic arithmetic encoding, a CCU 109 which controls interfacing with a line, an image memory 110, such as a hard disk or RAM, for memory stored transmission and memory reception, and a line 111, such as a public telephone line or leased line.

Figure 2:
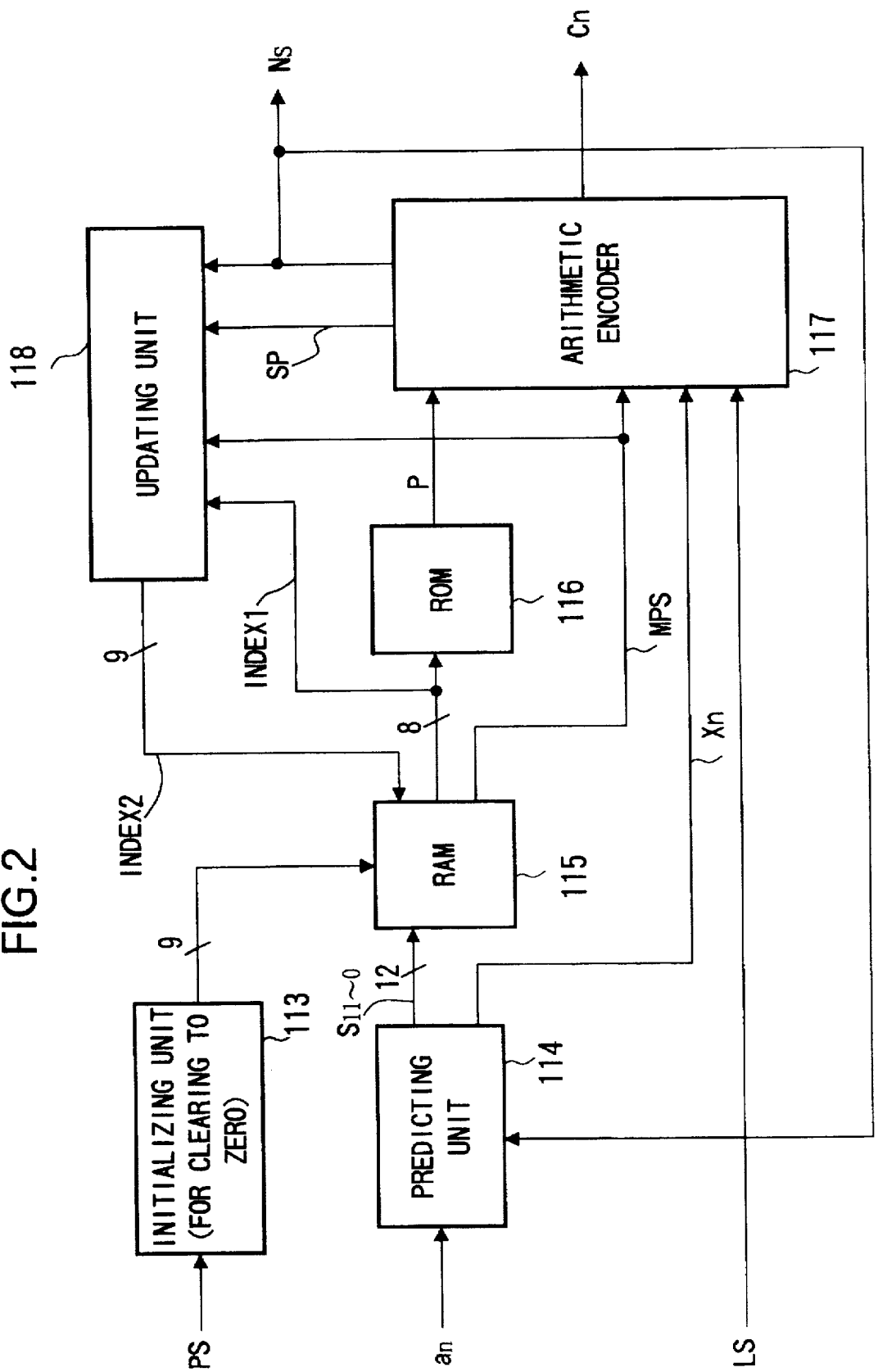
FIG. 2 is a block diagram illustrating the construction of the encoder within a CODEC shown in FIG. 1.

FIG. 2 is a block diagram of a dynamic arithmetic encoder included in the CODEC 107 mentioned above. As shown in FIG. 2, the dynamic arithmetic encoder includes a predicting unit 114 for referring to pixels peripheral to a pixel an, and a predicted-status memory (RAM) 115 which, based upon peripheral-pixel values $S_{11-0}$ outputted by the predicting unit 114, stores an index 1, which indicates the states of these values, and a superiority symbol MPS. Also provided are an initializing unit 113 for clearing the predicted-state memory 115 to "0" by an initialization operation, an arithmetic-parameter ROM 116 which outputs the probability P of an inferiority symbol according to the index 1 outputted by the predicted-status memory 115, an arithmetic encoder 117 for performing arithmetic encoding dynamically from the probability P delivered by the arithmetic-parameter ROM 116, the superiority symbol MPS from the predicted-state memory 115, and the value Xn of the pixel of interest from the predicting unit 114, and an updating unit 118 for updating the index 1 of the predicted-state memory 115 in accordance with whether the superiority symbol MPS and the value Xn of the pixel of interest agree or not.

Figure 3:
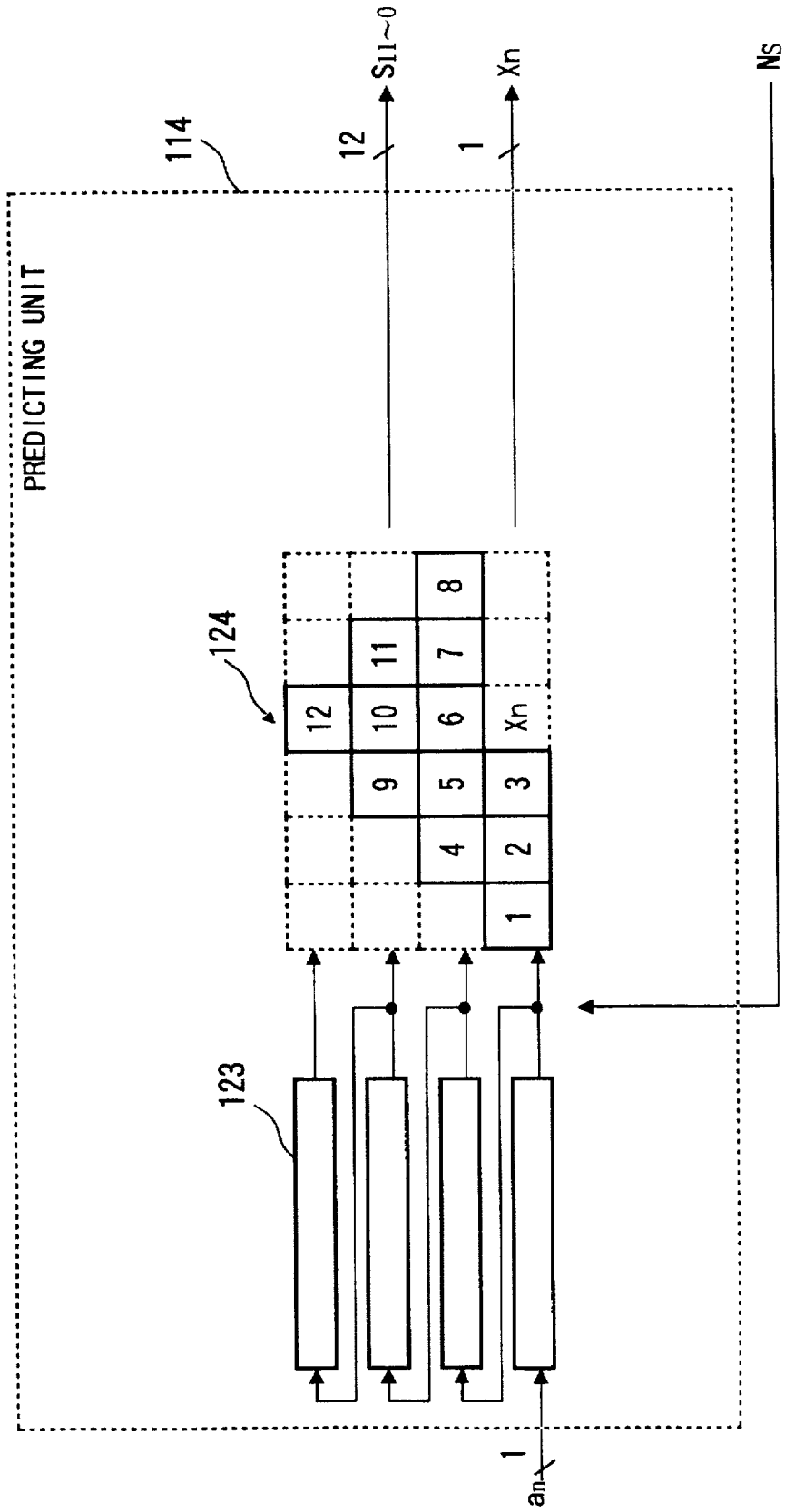
FIG. 3 is a block diagram illustrating the construction of a predicting unit shown in FIG. 2.

FIG. 3 is a block diagram illustrating the predicting unit 114 shown in FIG. 2. The predicting unit 114 includes FIFOs 123 for four lines, a predicting template 124 for outputting Xn as the pixel of interest and values of 12~1 in FIG. 3 and the values of $S_{11-0}$.

Figure 4:
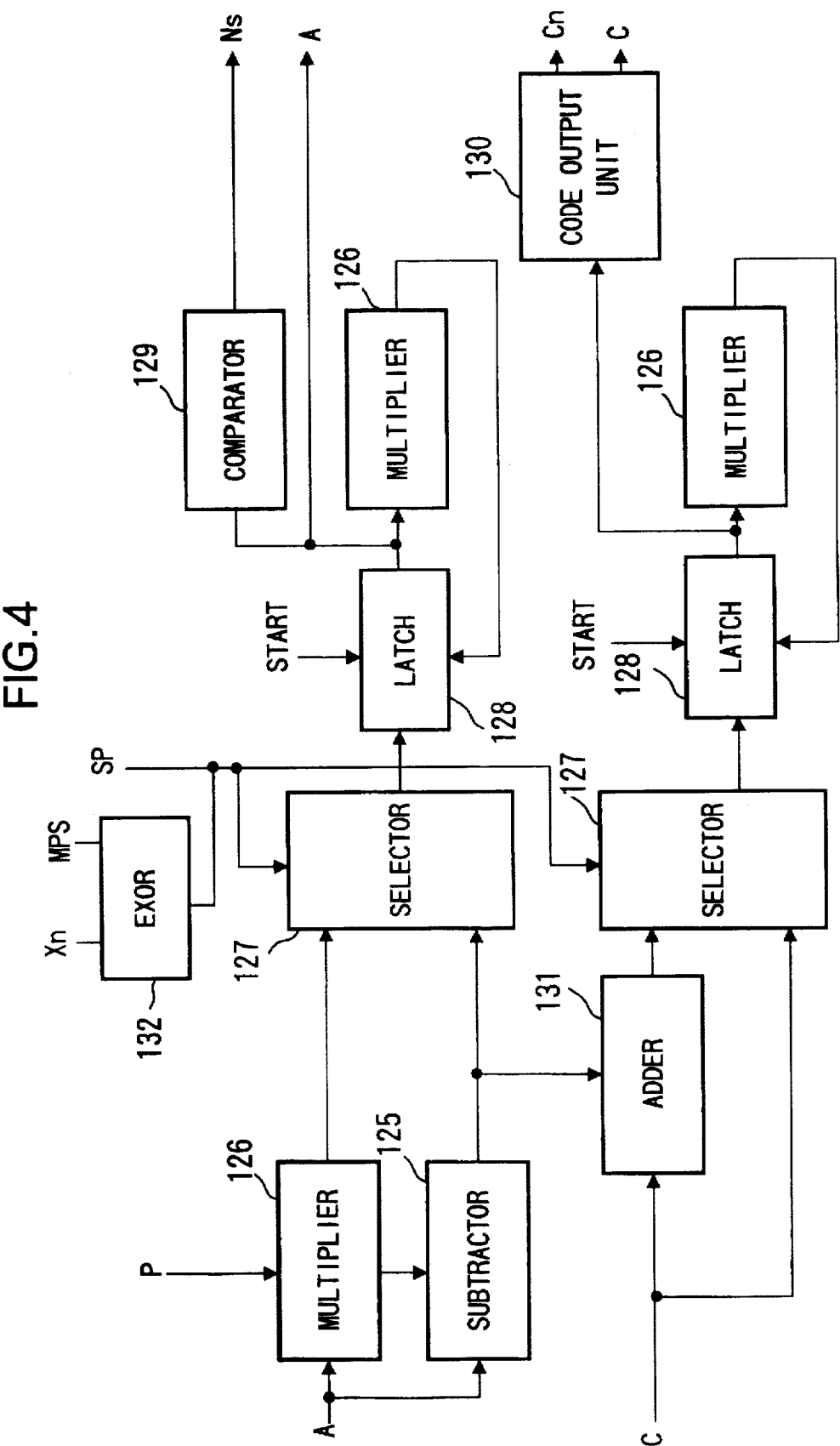
FIG. 4 is a block diagram illustrating the construction of an arithmetic encoder shown in FIG. 2.

FIG. 4 is a block diagram illustrating the construction of the arithmetic encoder 117 shown in FIG. 2. The arithmetic encoder 117 includes a subtractor 125, multipliers 126, a selector 127, latches 128, a comparator 129, a code output unit 130, an adder 131 and an exclusive-OR (EX-OR) gate 132.

The encoding operation performed by the above-mentioned components will now be described in accordance with the flowcharts of FIGS. 5 through 14.

Figure 7:
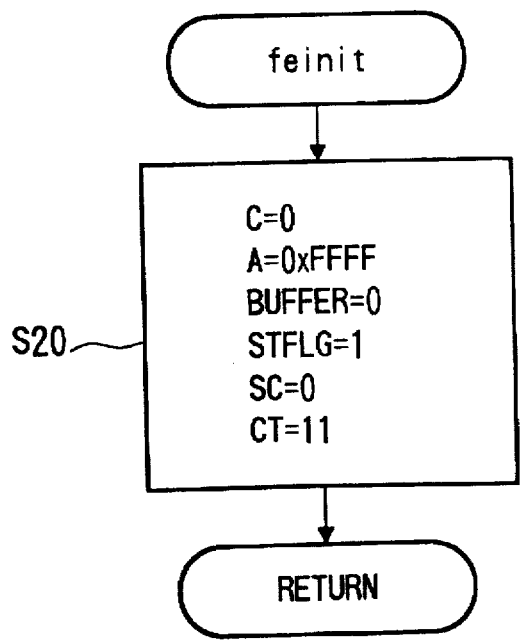
Figure 6:
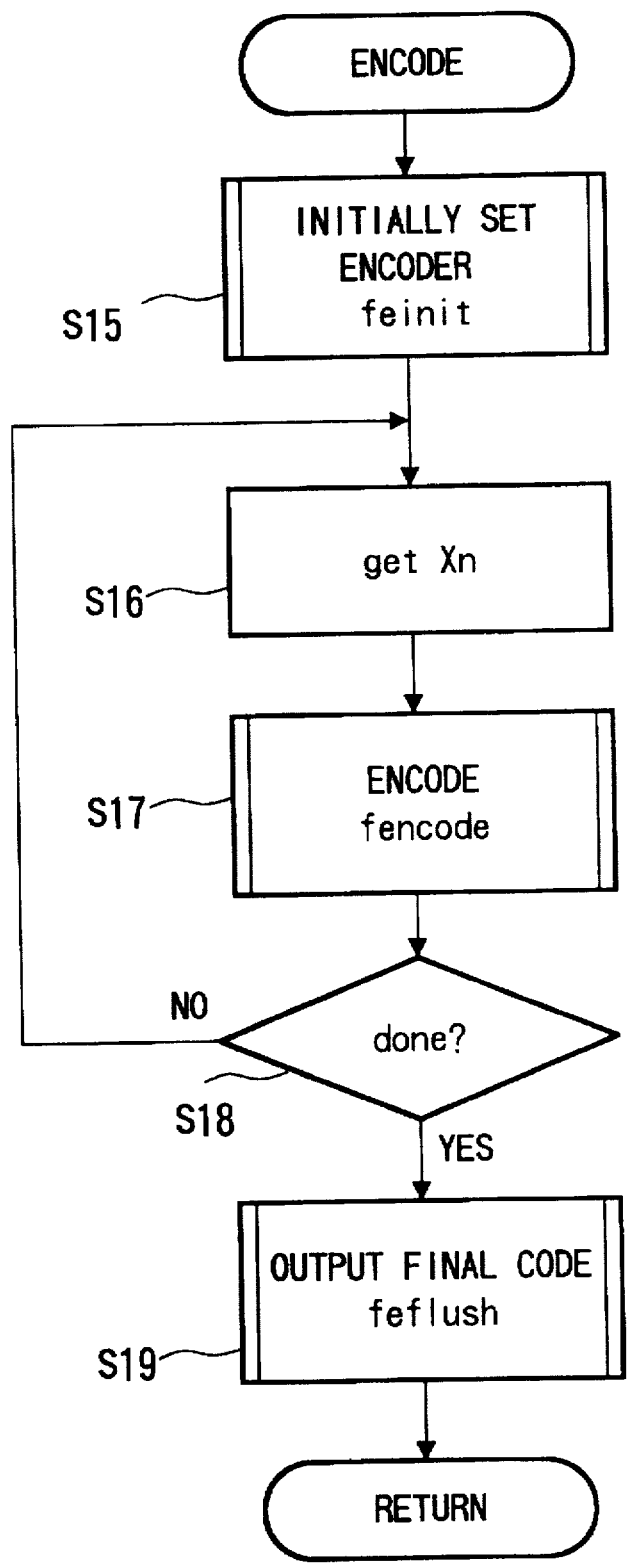
Figure 8:
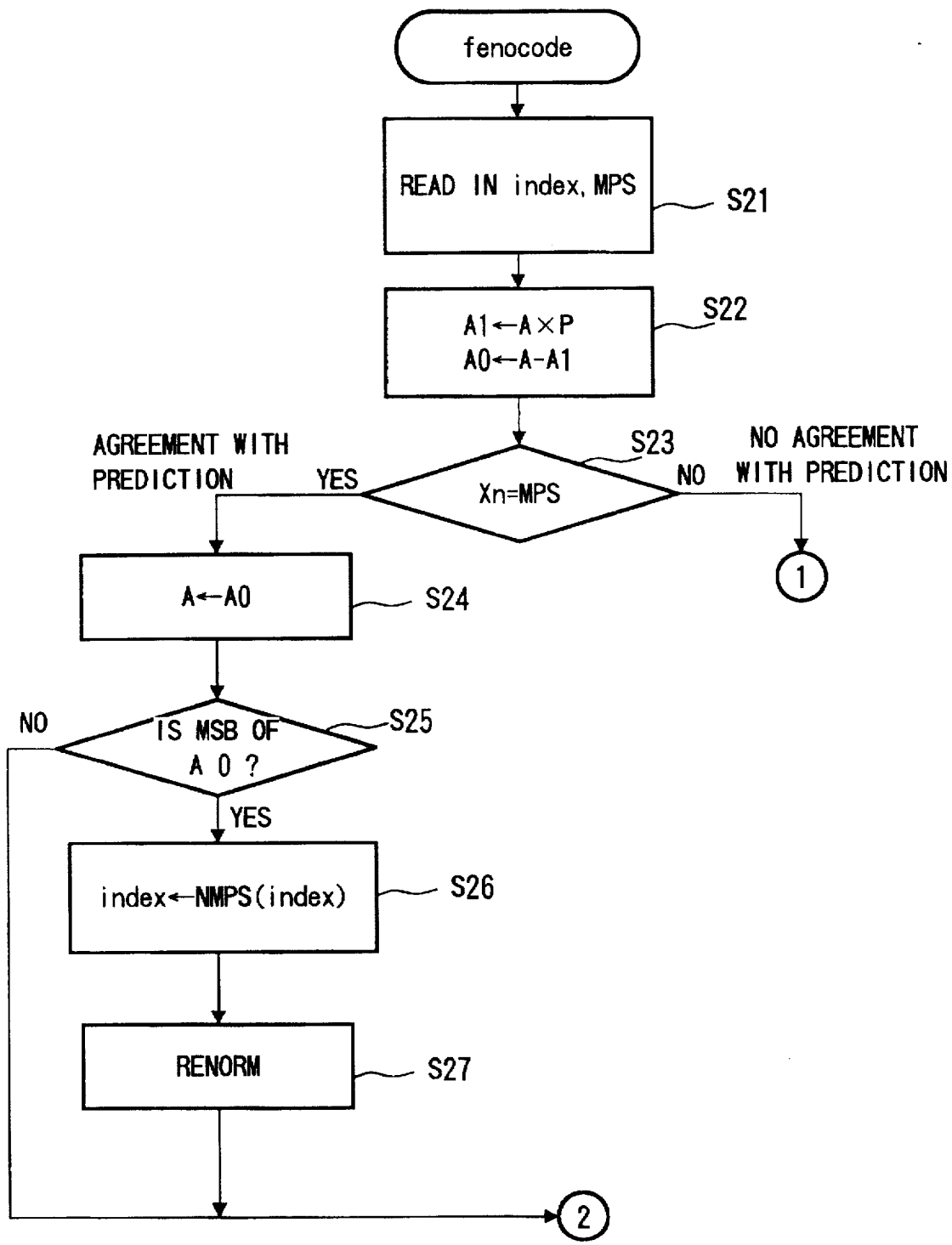
Figure 9:
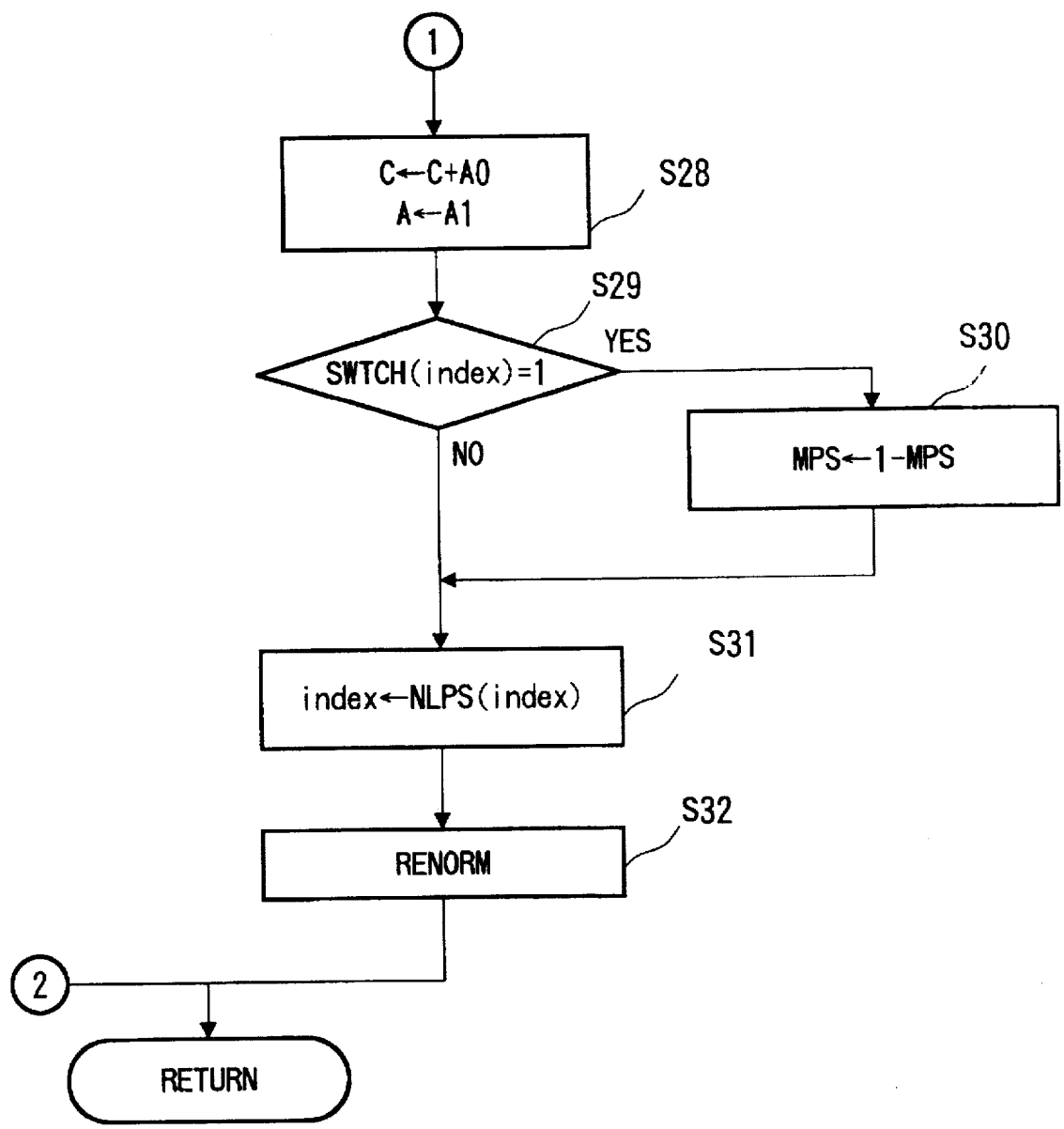

When there is a request to begin encoding, the predicted-state memory 115 is cleared to "0" and initialization is performed at step S14, after which an encoding subroutine shown in FIG. 6 is called at step S3. In the encoding subroutine, a feinit subroutine shown in FIG. 7 is called at step S15. At a step S20 of the feinit subroutine in FIG. 7, a register C, a buffer B and a counter SC are cleared to "0", and a register A, a flag STFLG and CT are set to "FFFF", "1" and "11", respectively. The program returns from the subroutine of FIG. 7 to FIG. 6, where the pixel of interest Xn is read out at step S16. Then, in order for encoding to be carried out, a fencode subroutine shown in FIG. 8 is called at step S17.

Figure 10:
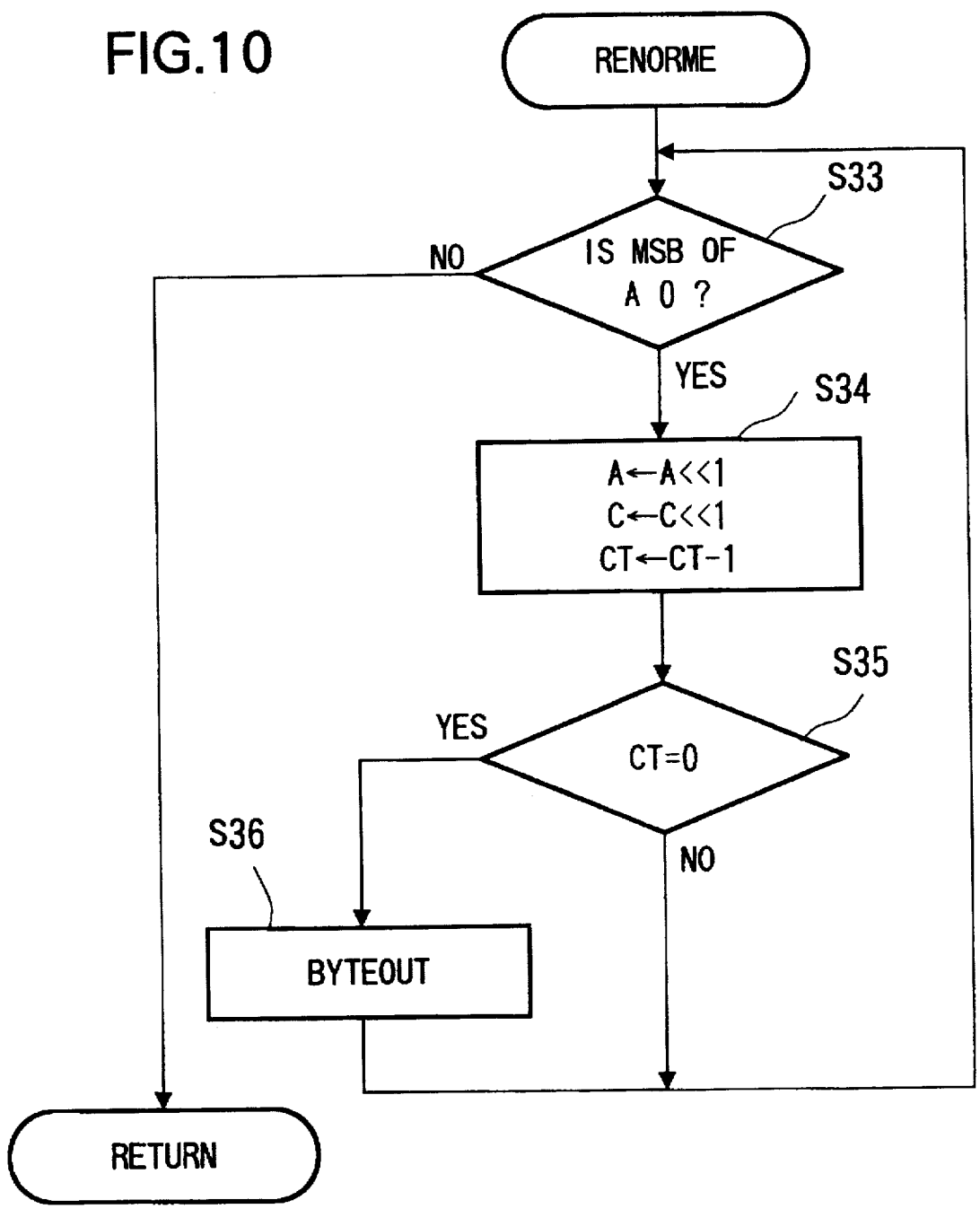

In the fencode subroutine, first the index 1 and the superiority symbol MPS are read out of the predicted-state memory 115 and an arithmetic parameter P (the probability of the inferiority symbol) is decided at step S21. Next, at step S22, the data A in register A is multiplied by the arithmetic parameter P to give A1, and then A1 is subtracted from A to give A0. Then, at step S23, it is determined whether the pixel of interest Xn and the superiority symbol MPS are equal. If they are equal (i.e., if there is agreement with the prediction), then A0 is substituted into the register A at step S24. Next, it is determined at step S25 whether the MSB (most significant bit) of A is "0" or not. If it is "0", then the index 1 is updated at step S26 in accordance with a table NMPS. This is followed by step S27, at which a RENORME subroutine shown in FIG. 10 is called. When processing ends, the program returns from this subroutine. If Xn and MPS are found not to agree at step S23, A0 is added to the data in register C, whereby C is updated, and A1 is substituted into register A at step S28 in FIG. 9. It is determined at step S29 whether the status of a switch corresponding to the index 1 is "1" or not. If the switch status is "1", the superiority symbol MPS is reversed at step S30 and then the index 1 is updated in accordance with table NLPS at step S31. This is followed by step S32, at which the RENORME subroutine shown in FIG. 10 is called and the processing of this subroutine is ended.

Figure 11:
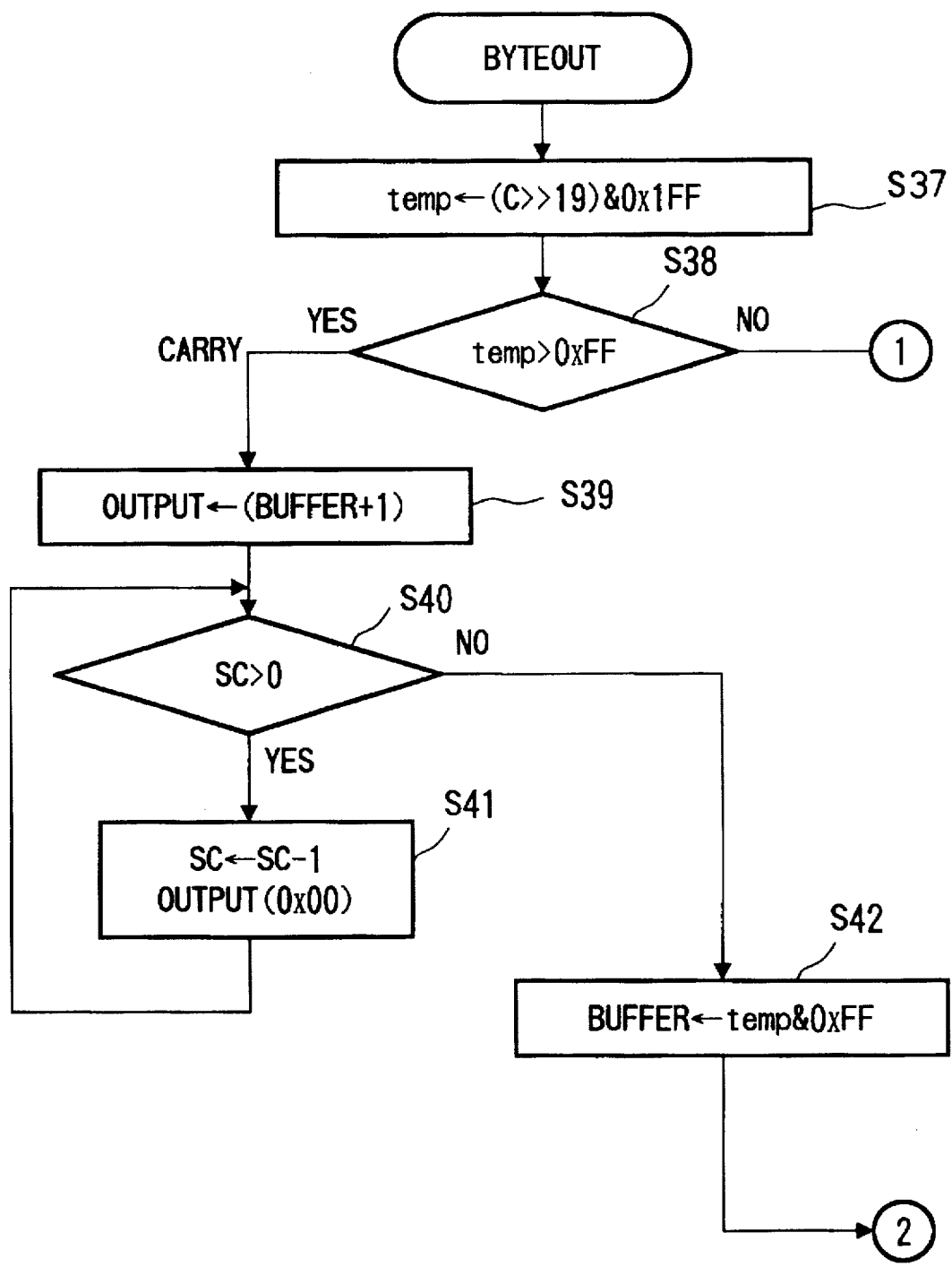

In the RENORME subroutine of FIG. 10, it is determined at step S33 whether the MSB of register A is "0" or not. If it is "0", the register C is shifted to the left and the counter CT is decremented at step S34. It is then determined at step S35 whether CT is "0" or not. If it is "0", then a BYTEOUT subroutine shown in FIG. 11 is called at step S36. The foregoing processing is repeated and, when the MSB of A becomes "1", the program returns from this subroutine.

In the BYTEOUT subroutine of FIG. 11, the 19th to 28th bits of the register C are extracted and stored in a temp register at step S37, and it is determined at step S38 whether temp is "FF"X. If it is greater (i.e., if there is a carry to the 27th bit), the value of a buffer register is incremented and an OUTPUT subroutine shown in FIG. 13 is called at step S39.

Figure 13:
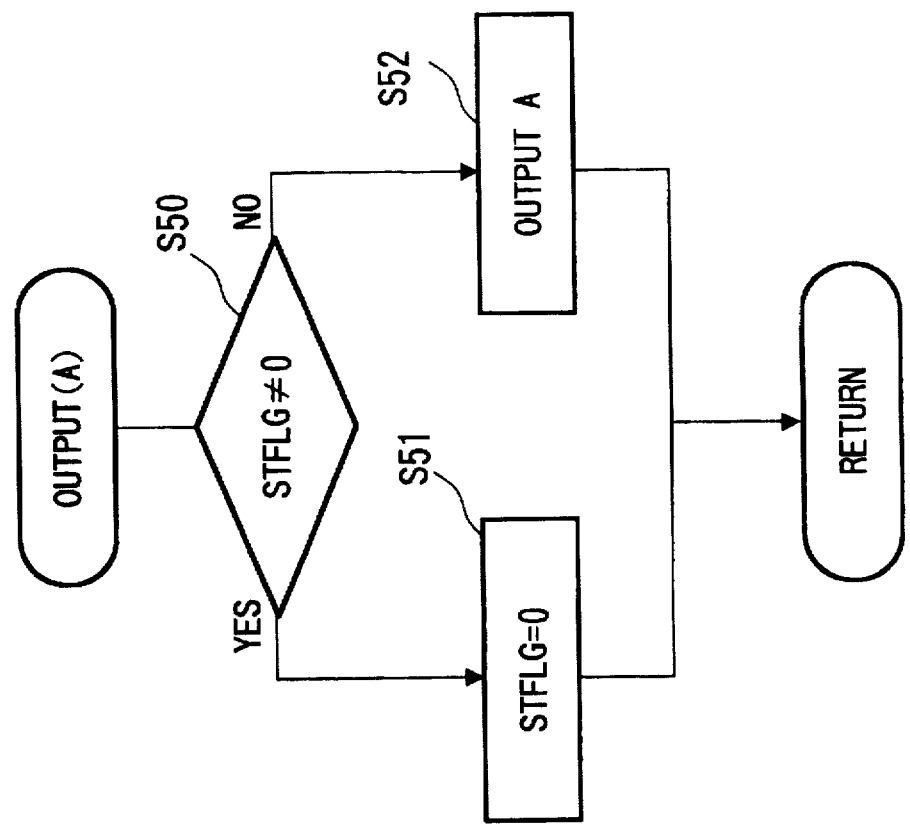

In the OUTPUT subroutine of FIG. 13, it is determined at step S50 whether a flag STFLG is "1" or not. If it is "1", then STFLG is made "0" at step S51 and the program returns from this subroutine.

It should be noted that since the initial value of register C enters only in the initial OUTPUT processing, the above-described processing is for invalidating this.

In a case where STFLG is "0" (that is, from the second time onward), one byte of data is externally outputted (to a file or line) at step S52. Following step S51 or S52, the program returns from this subroutine.

It is determined at step S40 in FIG. 11 whether the counter SC is positive (>0). If the answer is YES, then, at step S41, the counter SC is decremented, the above-mentioned OUTPUT subroutine is called and SC-number of "00"X outputs are delivered. When SC becomes "0", the eight lower-order bits of temp are written in the buffer B at step S42.

Figure 12:
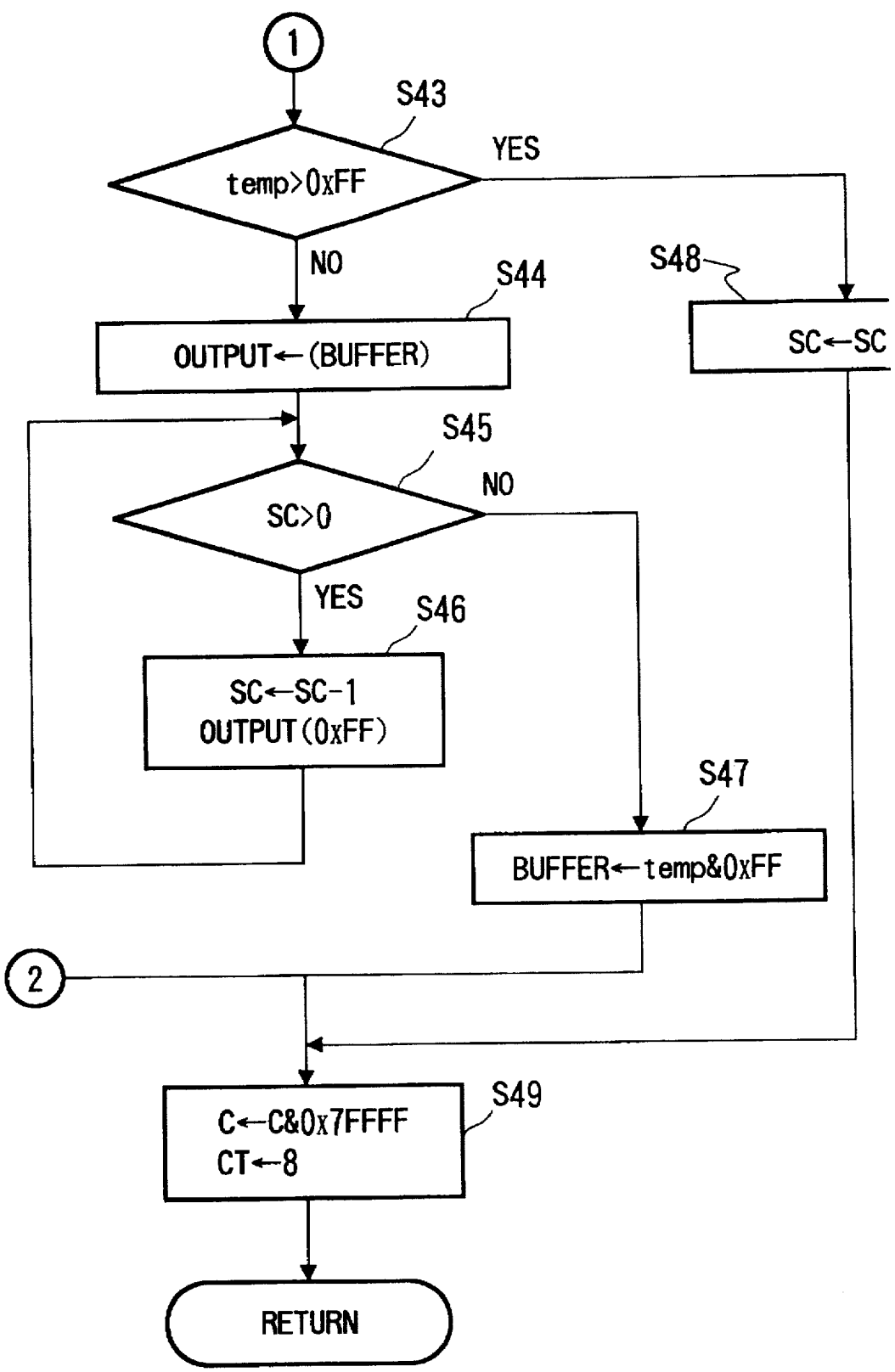

If temp is found to be equal to or less than "FF"X at step S38, "FF"X is checked at step S43 in FIG. 12 and, if temp is equal to "FF"X, then SC is incremented at step S48. However, if temp is less than "FF"X, the OUTPUT subroutine is called and SC-number of "FF"X outputs are delivered (steps S45, S46) through processing similar to that of steps S40, S41 described above. The eight lower-order bits of temp are written in buffer B at step S47, the outputted bits are cleared in register C, and "8" is set in CT at step S49, after which the program returns from this subroutine.

By virtue of the foregoing processing, the processing of steps S16, S17 shown in FIG. 6 is repeated until all pixels are processed (step S18). When processing of the final pixel has ended, a feflush subroutine shown in FIG. 14 is called at step S19.

Figure 14:
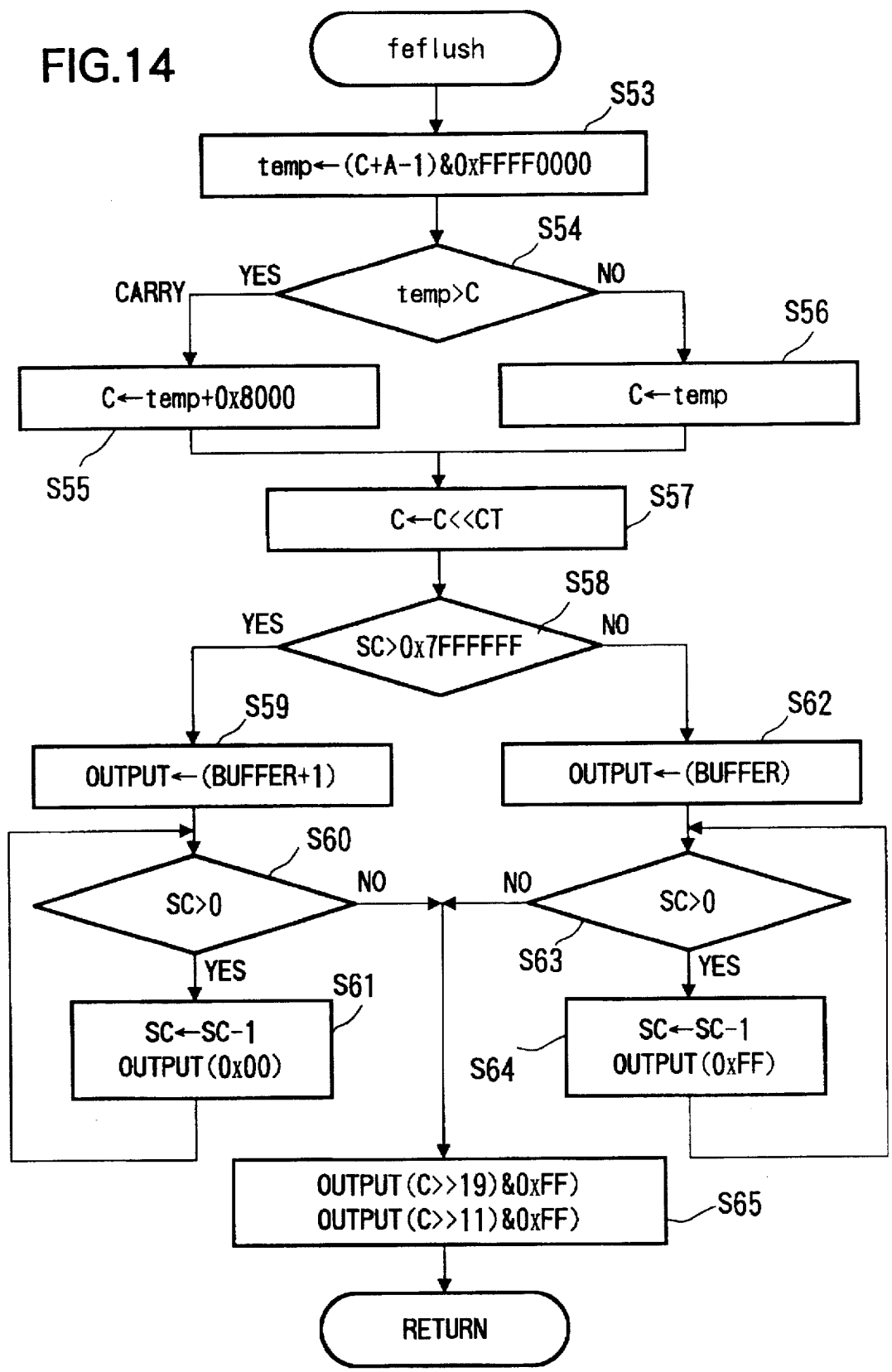

In the feflush subroutine of FIG. 14, the final output of a code remaining in the register C is made. First, 16 bits higher-order bits are extracted from the results of the calculation (C+A−1) and stored in temp at step S53, and temp is compared with C at step S54. If the result is that temp is less than C (indicating a carry), "8000"X is added to temp and the result is substituted into C at step S55. If the answer at step S54 is NO, then C is substituted into temp at step S56.

Next, C is shifted CT bits to the left at step S57, and it is determined at step S58 whether C is greater than "7FFFFFF"X. If it is greater, then "1" is added to buffer B and the above-described OUTPUT subroutine is called at step S59. Then, at steps S60, S61, SC-number of "00"X outputs are delivered. If C is less than "7FFFFFF", the buffer contents are outputted at step S62, and "FF"X outputs are delivered at steps S60, S61 in the manner set forth above. Finally, the 19th to 11th bits of register C are outputted at step S65, and the program returns from this routine.

Figure 5:
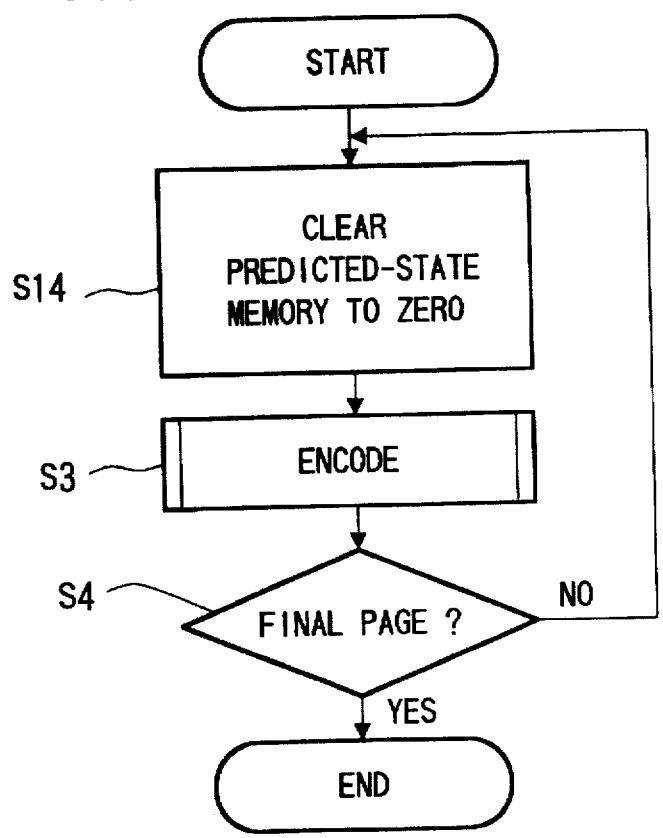
FIGS. 5 through 14 are flowcharts illustrating the encoding processing of the encoder shown in FIG. 2.

Thus, encoding is performed by repeating the processing of steps S14, S3 in FIG. 5 until the processing of the last page ends (YES at step S4).

Figure 15:
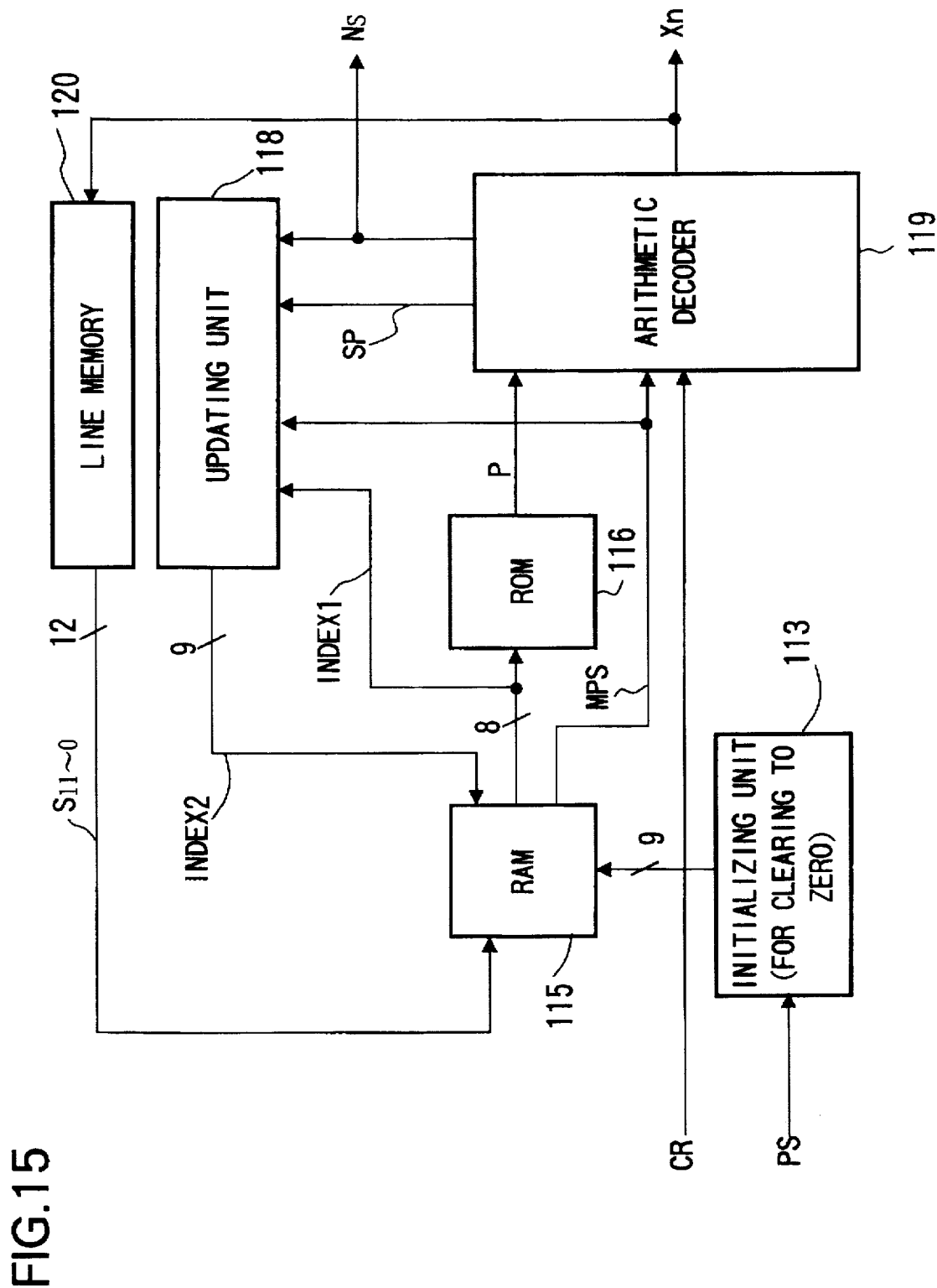
FIG. 15 is a block diagram illustrating the construction of a decoder within the CODEC shown in FIG. 1.

FIG. 15 is a block diagram illustrating the construction of a dynamic arithmetic decoder included in the CODEC 107 of FIG. 1. The dynamic arithmetic decoder includes a line memory 120 for holding four lines of decoded results, a predicted-state memory (RAM) 115 for storing an index, which is based upon peripheral-pixel values $S_{11-0}$ outputted by the line memory 120, and which indicate the states of these values. Also provided are an initializing unit 113 for clearing the predicted-state memory 115 to "0" by an initialization operation, an arithmetic-parameter ROM 116 which outputs the probability P of an inferiority symbol according to the index 1 outputted by the predicted-status memory 115, an arithmetic decoder 119 for performing arithmetic decoding dynamically using upon the probability P delivered by the arithmetic-parameter ROM 116, the superiority symbol MPS, and a code word CR, and an updating unit 118 for updating the index 1 of the predicted-state memory 115 in accordance with whether the superiority symbol MPS and the code word CR agree or not.

Figure 16:
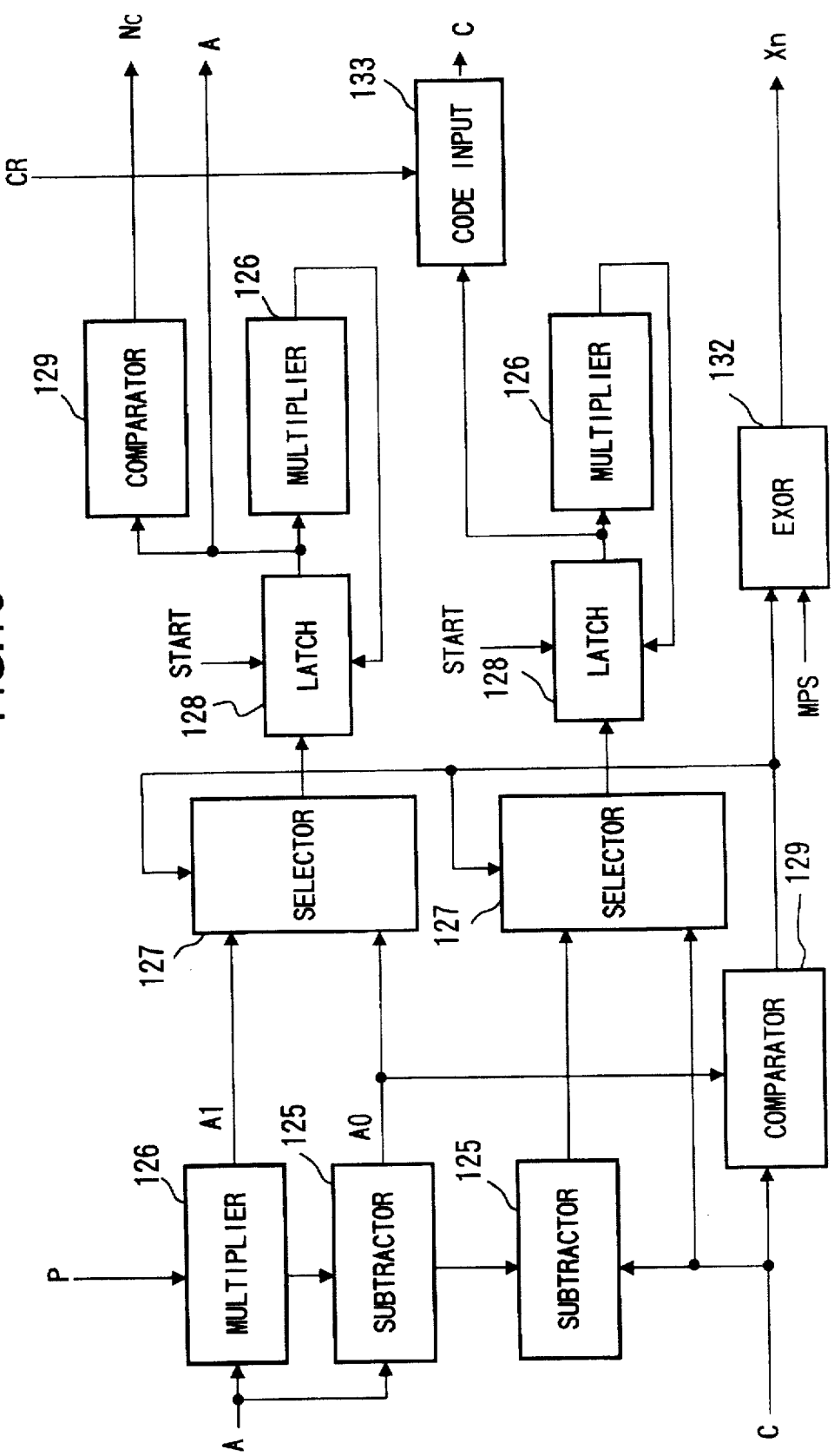
FIG. 16 is a block diagram illustrating the construction of an arithmetic decoder shown in FIG. 15.

FIG. 16 is a block diagram showing the construction of the arithmetic decoder 119 shown in FIG. 15.

The arithmetic decoder 119 includes subtractors 125, multipliers 126, selectors 127, latches 128, comparators 129, a code output unit 130, an exclusive-OR (EX-OR) gate 132, and a code input unit.

The decoding operation performed by the above-mentioned components will now be described in accordance with the flowcharts of FIGS. 17 through 23.

Figure 18:
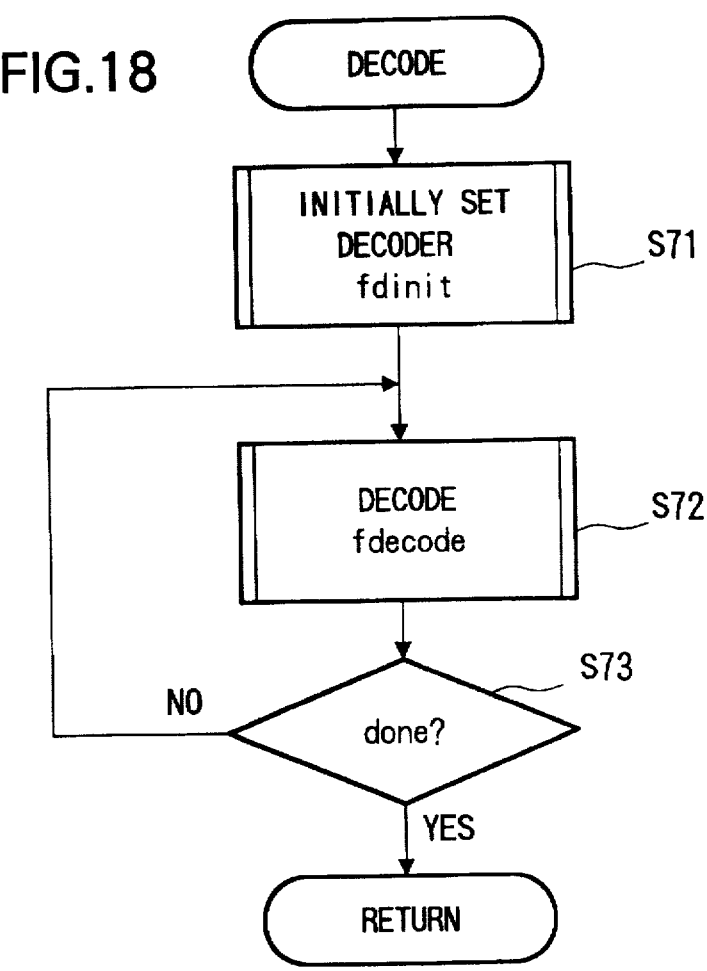
Figure 19:
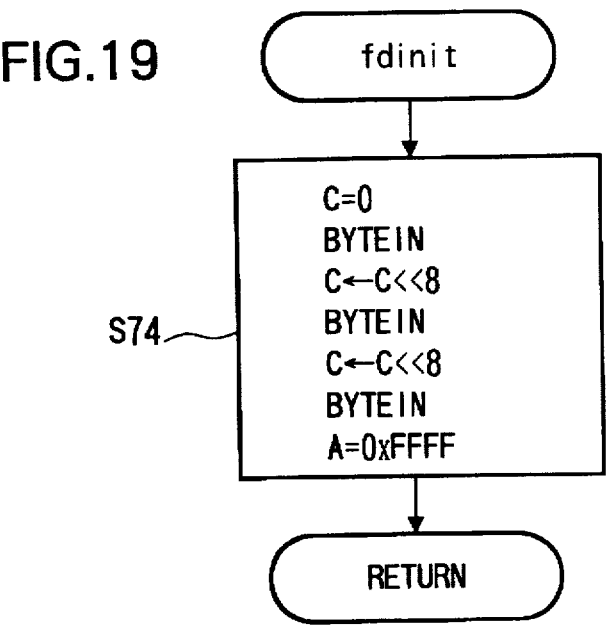

When there is a request to begin decoding, the predicted-state memory 115 is cleared to "0" and initialization is performed at step S14, after which a DECODE subroutine shown in FIG. 18 is called at step S5. In the DECODE subroutine, a fdinit subroutine shown in FIG. 19 is called at step S71. At a step S74 of the fdinit subroutine in FIG. 19, 24 bits from the beginning of the code are inputted to the 24 higher-order bits of the register C by a BYTEIN routine shown in FIG. 23, and "FFFF"X is set in the register A at step S74. The program returns to FIG. 18 from this subroutine.

Figure 20:
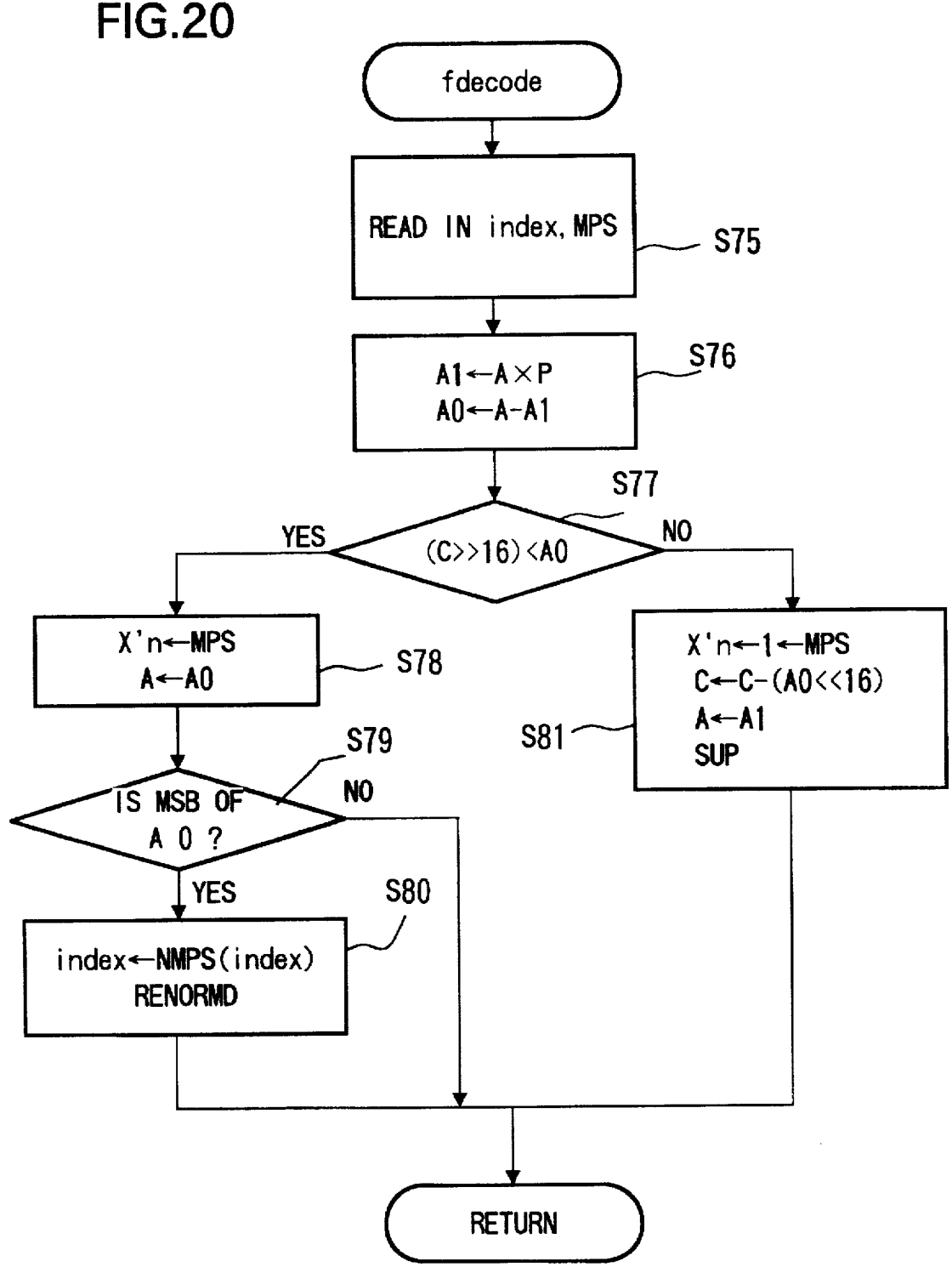

A fdecode subroutine shown in FIG. 20 is called at step S72 in FIG. 18.

In the fdecode subroutine, first the index 1, the superiority symbol MPS and the arithmetic parameter (the probability of the inferiority symbol) P are read out of the memories 115, 116 at step S75. Next, at step S76, the data A in register A is multiplied by P to give A1, and then A1 is subtracted from A to give A0. Then, at step S77, the eight higher-order bits of C and the value of A0 are compared. If A0 is smaller, a decoded value X'n is decoded as the value of the MPS and the value of A0 is substituted into the register A at step S78. It is them determined at step S79 whether the MSB of the register A is "0". If the MSB is "0", the index 1 is updated in accordance with the table NMPS a RENORMD subroutine illustrated in FIG. 21 is called at step S80.

Figure 21:
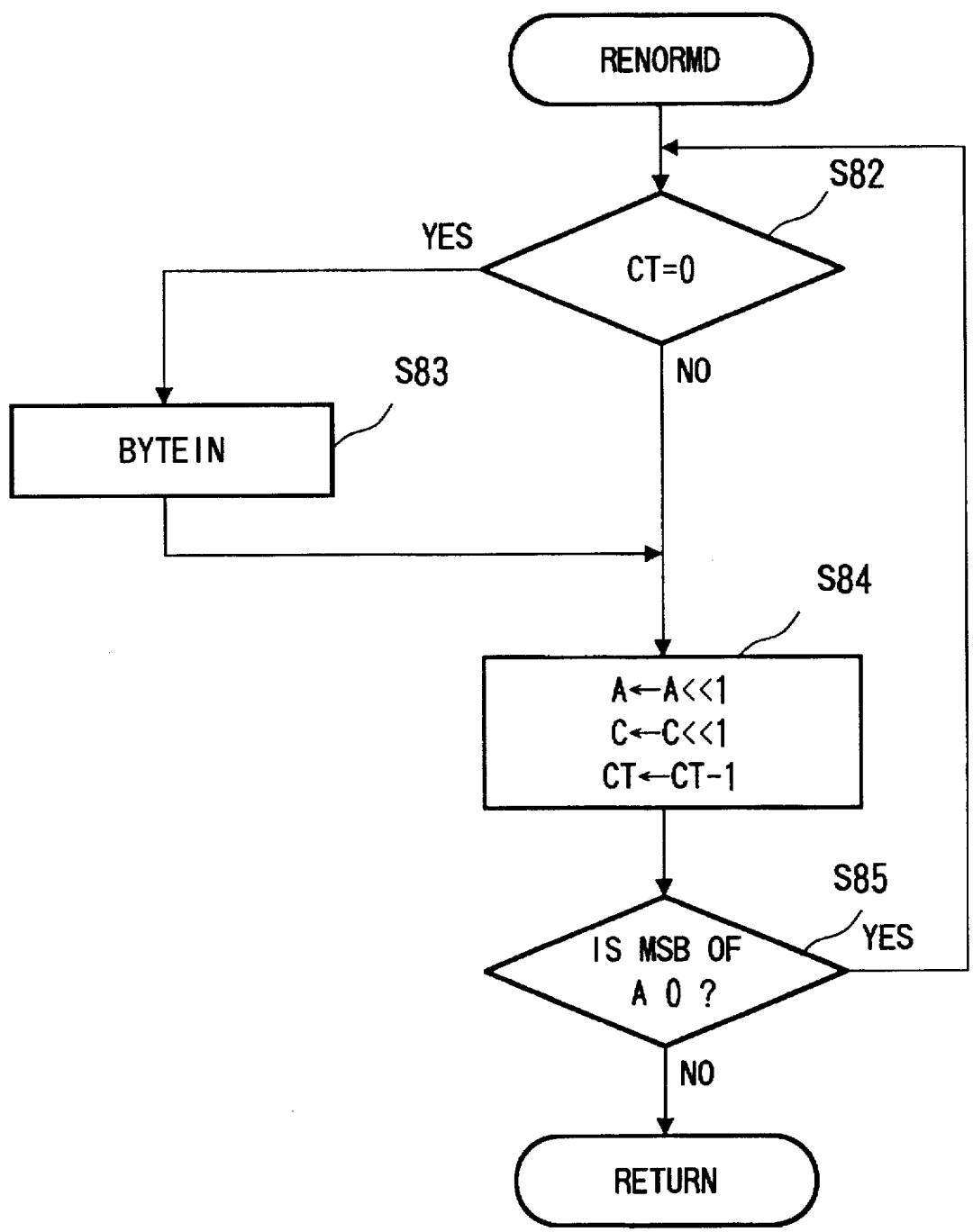
Figure 23:
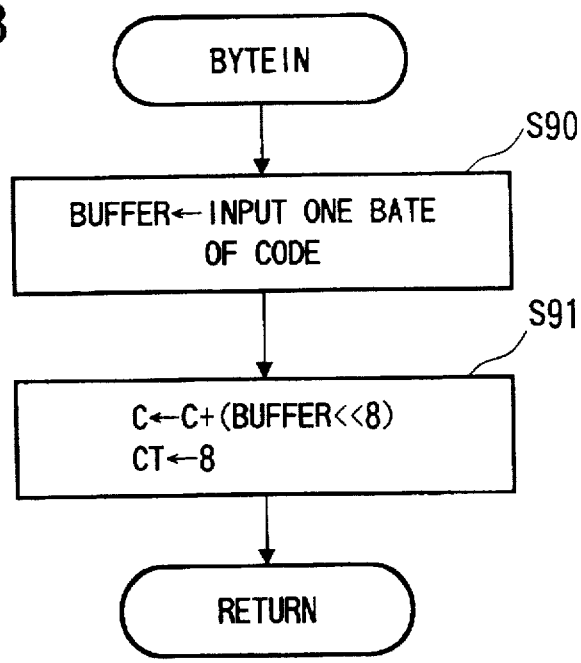

In the RENORMD subroutine of FIG. 21, it is determined at step S82 whether the counter CT is "0". If the answer is YES, the BYTEIN subroutine shown in FIG. 23 is called at step S83. Next, the registers A and C are each shifted to the left and CT is decremented at step S84. The foregoing processing is executed until the MSB of register A becomes "1" at step S85.

If the eight higher-order bits of register C are found to be larger than A0 at step S77, then decoding is performed on the assumption that the prediction is erroneous. Therefore, the program proceeds to step S81, at which 1-MPS is substituted into X'n, A0 is subtracted from the eight higher-order bits of the register C, and A1 is substituted into A. Further, in order to update the index 1, a SUP subroutine shown in FIG. 22 is called.

Figure 22:
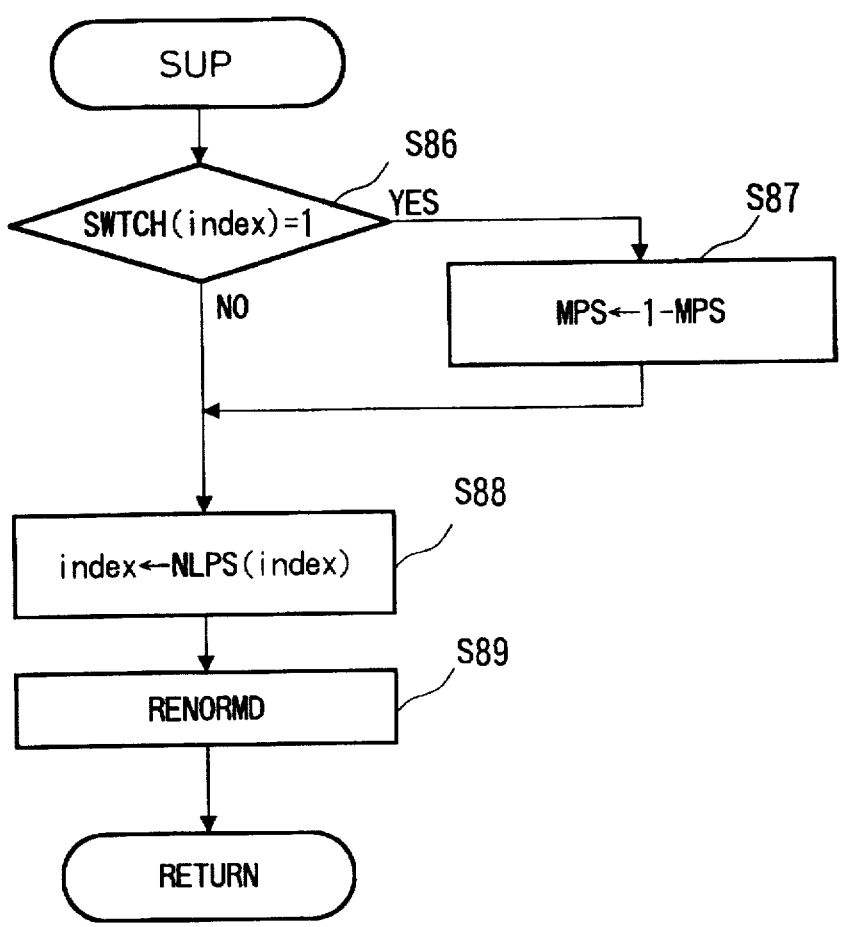

In the SUP subroutine of FIG. 22, it is determined at step S86 whether the status of the switch corresponding to the index 1 is "1" or not. If the switch status is "1", the superiority symbol MPS is reversed at step S87 and then the value of the index 1 is updated in accordance with table NLPS at step S88. This is followed by step S89. When normalization processing ends, the program returns from this subroutine, and the program returns to FIG. 18 from the subroutine of FIG. 20. The above-described processing is repeated until the final pixel is decoded (step S73). The program then returns to FIG. 17.

Figure 17:
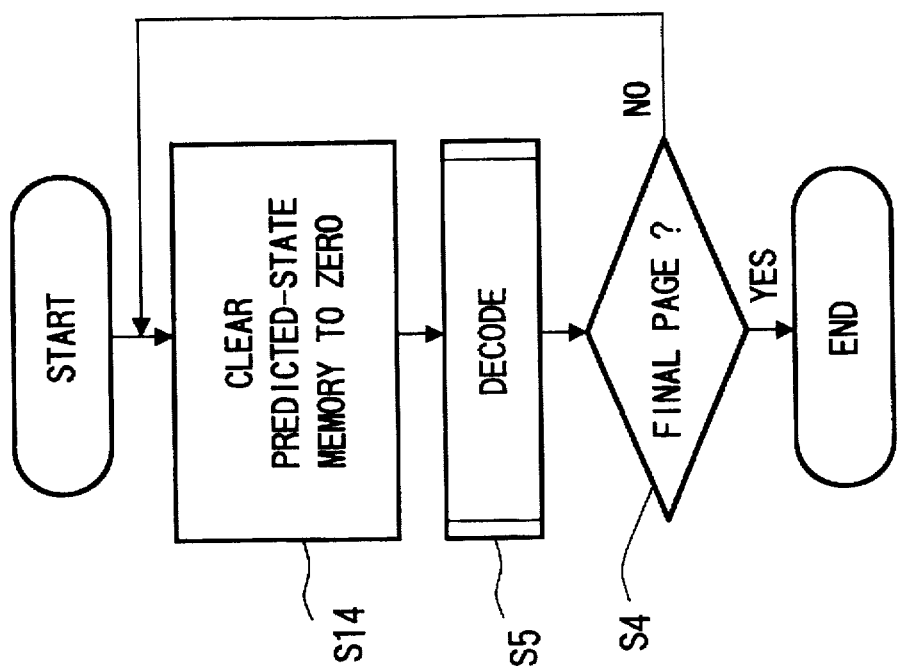
FIGS. 17 through 23 are flowcharts illustrating the decoding processing of the encoder shown in FIG. 15.

Thus, decoding is performed by repeating the processing of steps S14, S5 in FIG. 17 until the processing of the last page ends (YES at step S4).

Next, an image transmission apparatus which performs encoding or decoding in conformity with identification information specifying the apparatus, and which maintains the secrecy of the transmitted data, will be described with reference to the related drawings.

Figure 25:
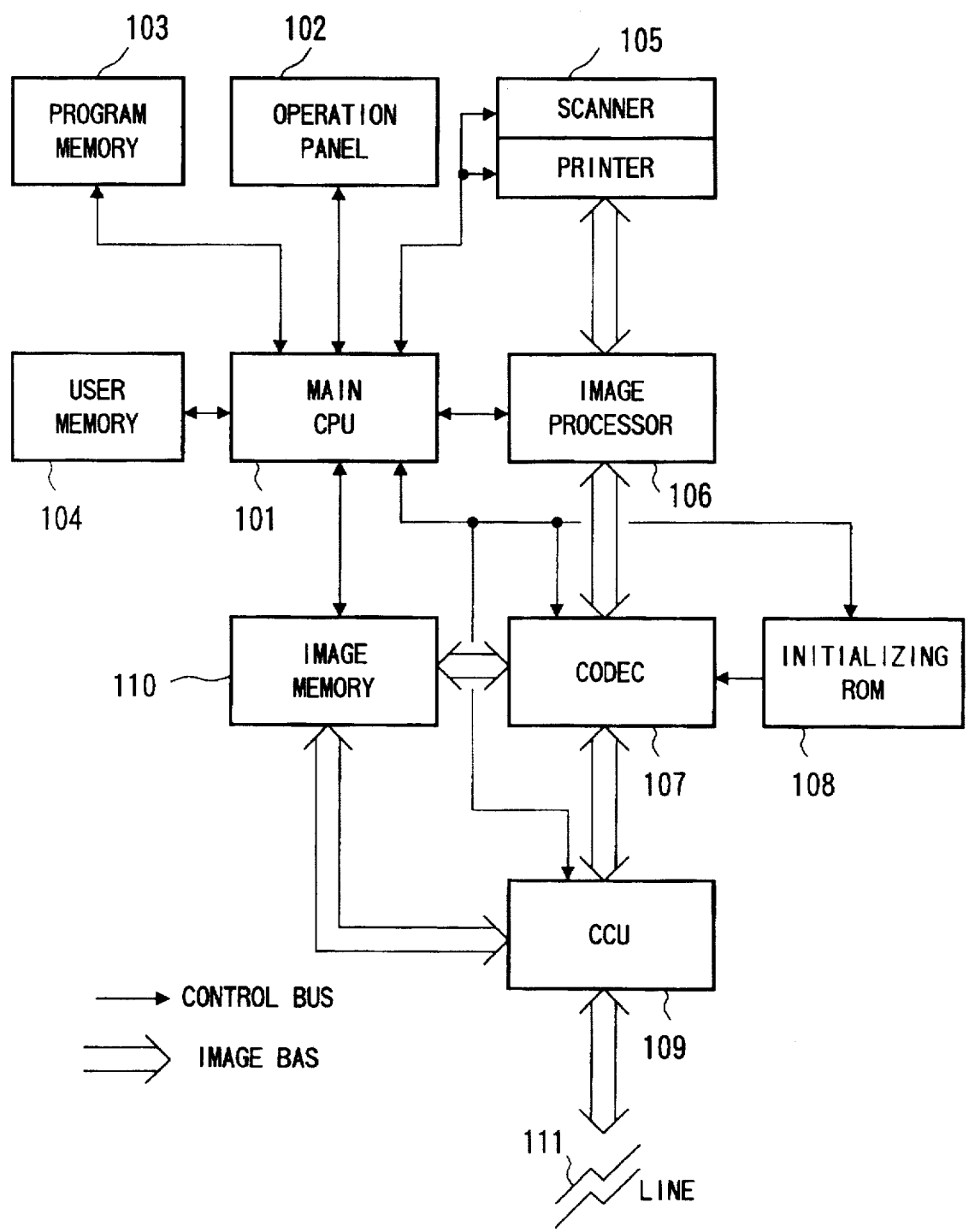
FIG. 25 is a block diagram illustrating the construction of an image transmission apparatus according to an embodiment.
Figure 26:
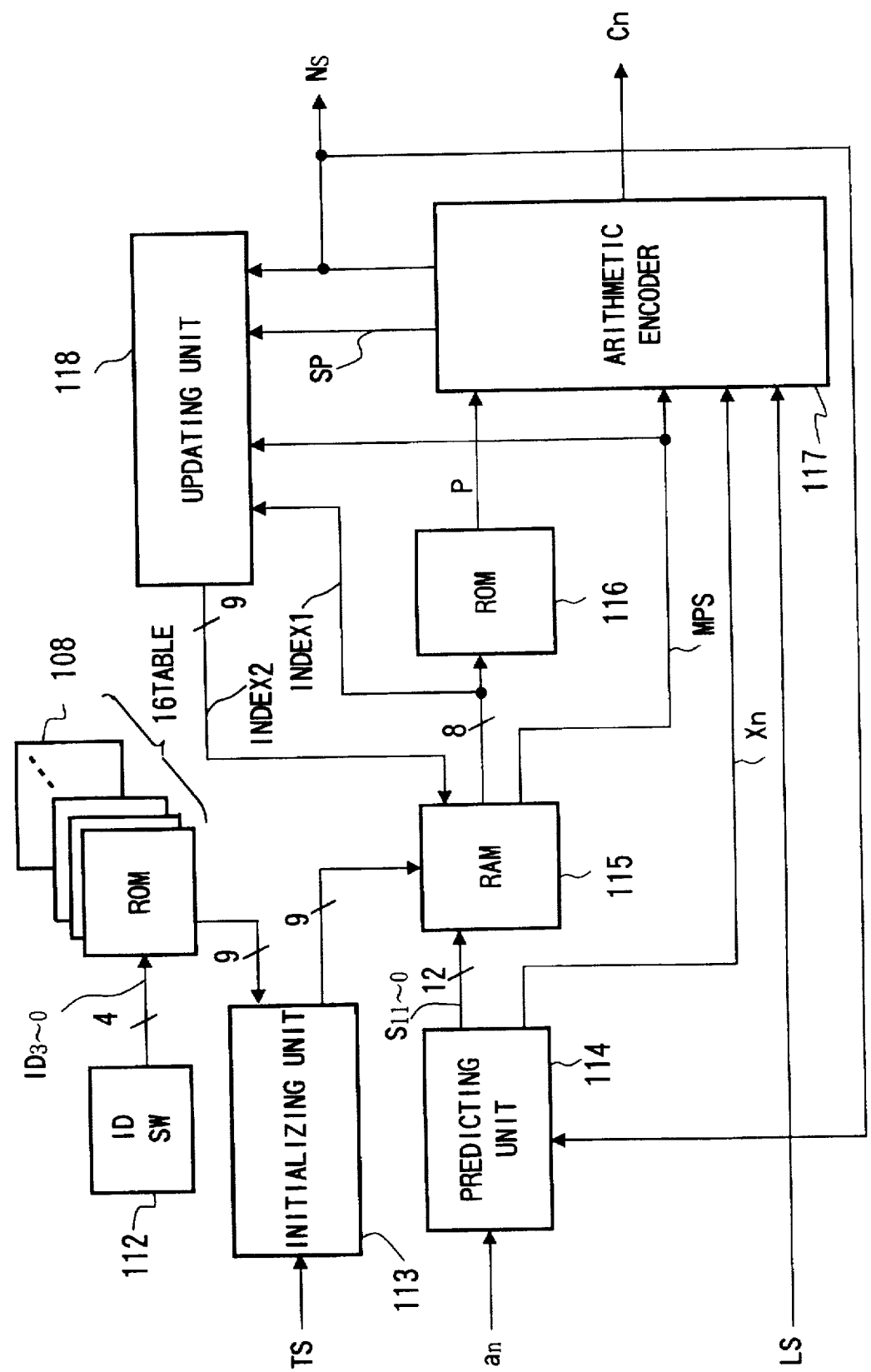
FIG. 26 is a block diagram illustrating the construction of the encoder in a first embodiment.

FIG. 25 is a block diagram illustrating an image transmitting apparatus which employs a dynamic arithmetic encoding method according to this embodiment. The apparatus includes the main CPU 101 which carries out overall control of the other blocks, the operation panel 102 at which the user controls the image transmission apparatus, the program memory 103, such as a ROM, storing programs executed by the main CPU 101, and the user memory 104, such as a RAM, in which data registered by the user, such as numbers for abbreviated dialing, is stored. The apparatus further includes the scanner/printer 105 for reading in or printing out an image, the image processor 106 which executes binarization processing or the like, the CODEC 107 which performs encoding or decoding by means of dynamic arithmetic encoding, an initializing table (ROM) storing various tables for initializing a predicted-state memory included within the CODEC 107, the CCU 109 which controls interfacing with the line, the image memory 110, such as a hard disk or RAM, for memory stored transmission or memory reception, and the line 111, such as a public telephone line or leased line.

<First Embodiment>

Figures 24, 27:
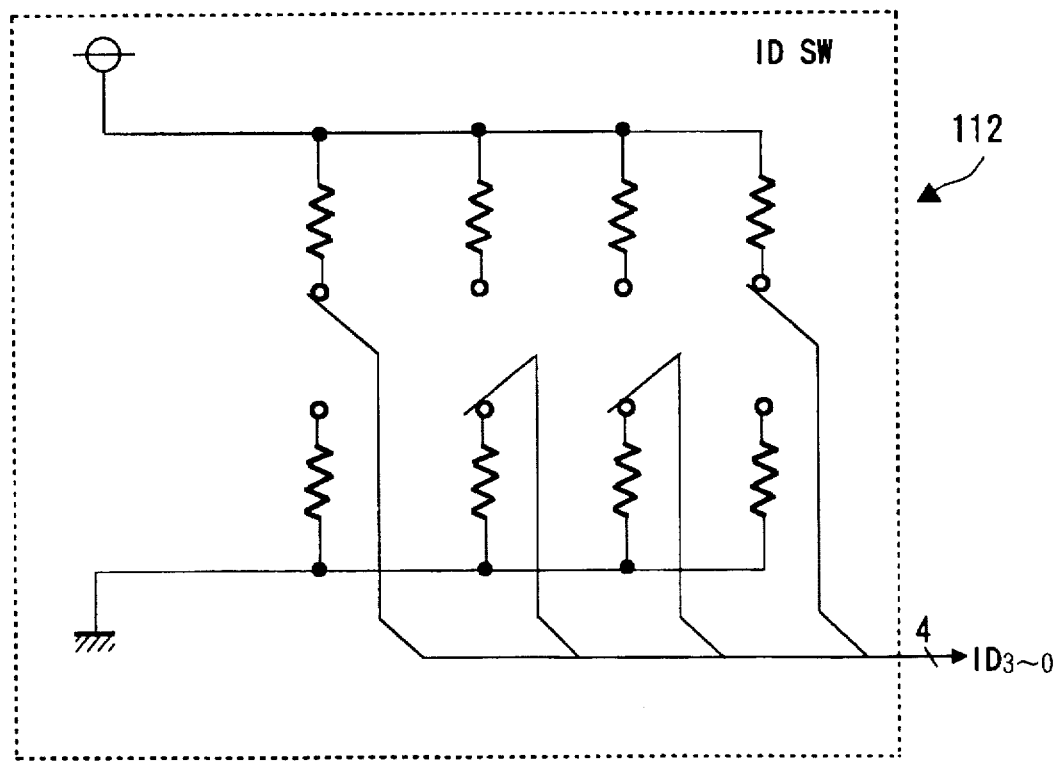
FIG. 24 is a diagram showing a value of P with respect to an index 1.
FIG. 27 is a circuit diagram of an ID switch shown in FIG. 26.

FIG. 25 is a block diagram illustrating the construction of the encoder in a first embodiment. As shown in FIG. 2, the encoder includes the predicting unit 114 for referring to pixels peripheral to a pixel Xn, and a predicted-status memory (RAM) 115 which, based upon peripheral-pixel values $S_{11-0}$ outputted by the predicting unit 114, stores an index 1, which indicates the states of these values, and a superiority symbol MPS. Also provided are an initializing unit 113 for initializing the predicted-state memory 115, initializing table ROMs 108 storing a plurality of initialization tables for performing initialization, and an ID switch 112 for setting the ID of the apparatus. FIG. 27 illustrates the specific circuit construction. Further, there are provided the arithmetic-parameter ROM 116 which outputs the probability P of an inferiority symbol according to the index 1 outputted by the predicted-status memory 115, the arithmetic encoder 117 for performing arithmetic encoding dynamically using the probability P delivered by the arithmetic-parameter ROM 116, the superiority symbol MPS, and the value Xn of the pixel of interest, and the updating unit 118 for updating the index 1 of the predicted-state memory 115 in accordance with whether the superiority symbol MPS and the value Xn of the pixel of interest agree or not.

Figure 28:
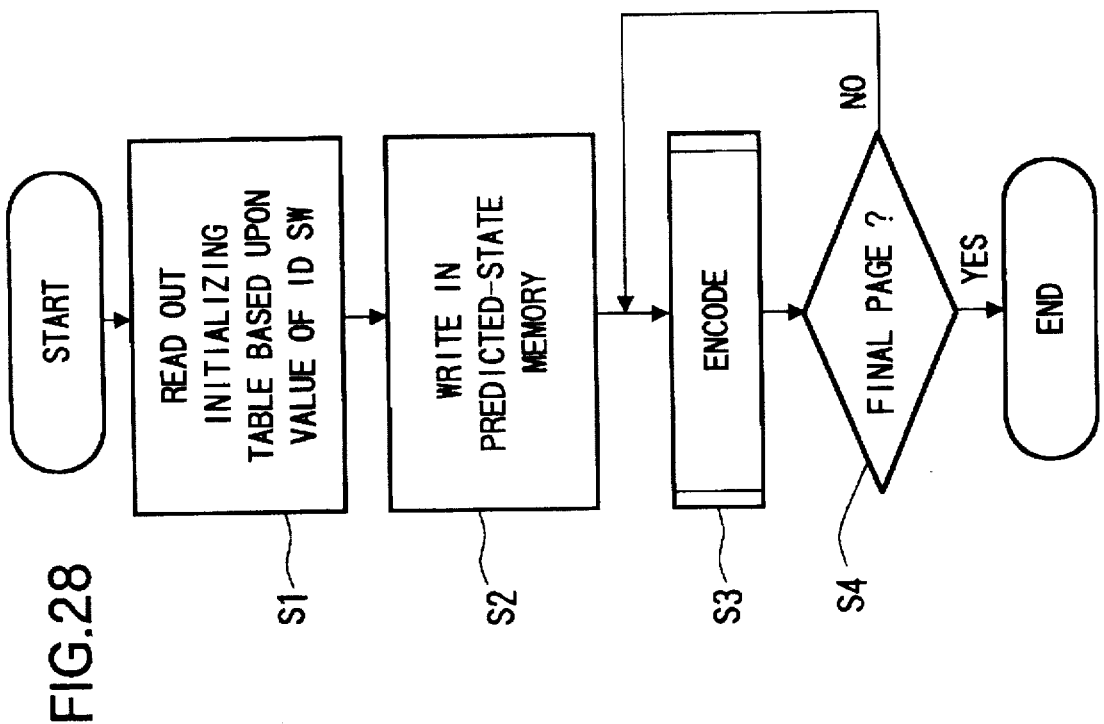
FIG. 28 is a flowchart illustrating the operation of encoding in the first embodiment.

The encoding operation performed by the above-mentioned components according to this embodiment will now be described in accordance with the flowchart of FIG. 28.

When there is a request to begin encoding, the values of the initializing table selected by an output from the four-bit ID switch 112 are read out at step S1, and the values are written in the predicted-state memory 115 at step S2. This is followed by step S3, at which the ENCODE subroutine of FIG. 6 is called and the above-described encoding of one page is performed. Thereafter, the processing of step S3 is repeated without performing the initialization of the predicted-state memory 115. When the processing of the final page ends at step S4, encoding is terminated. When the encoded data is transmitted to line 111, a cipher identification code is appended to the header, after which the resulting encoded data is transmitted.

Figure 29:
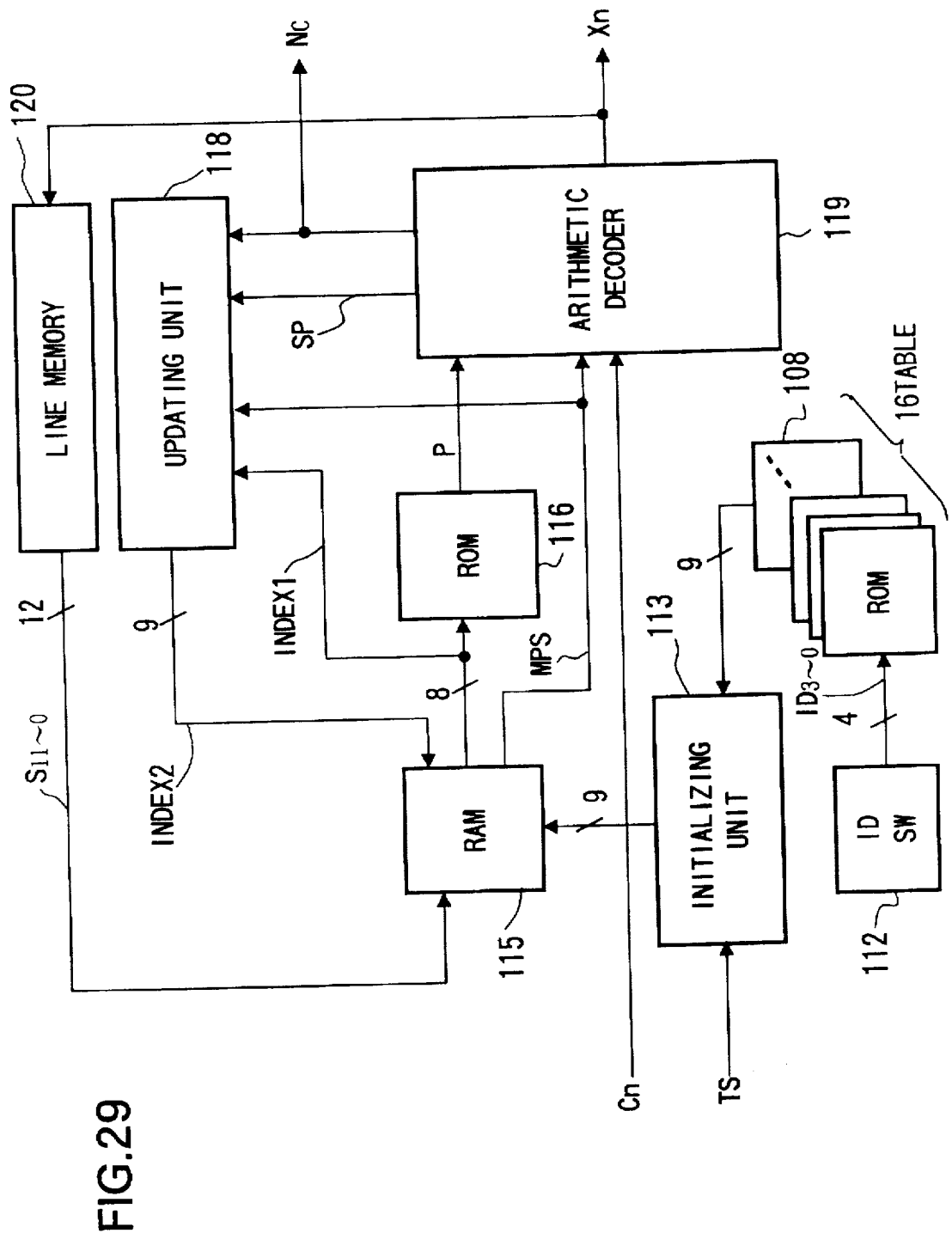
FIG. 29 is a block diagram illustrating the construction of a decoder in the first embodiment.

FIG. 29 is a block diagram showing the decoder according to the first embodiment. The decoder includes the line memory 120 for holding four lines of decoded results, the predicted-state memory 115 for storing an index, which is based upon peripheral-pixel values $S_{11-0}$ outputted by the line memory 120, and which indicates the states of these values. Also provided are the initializing unit 113 for initializing the predicted-state memory 115, the initializing table ROMs 108 storing a plurality of initialization tables for performing initialization, and the ID switch 112 for setting the ID of the apparatus. FIG. 27 illustrates the specific circuit construction. Further, there are provided the arithmetic-parameter ROM 116 which outputs the probability P of an inferiority symbol according to the index 1 outputted by the predicted-status memory 115, the arithmetic decoder 119 for performing arithmetic decoding dynamically using the probability P delivered by the arithmetic-parameter ROM 116, the superiority symbol MPS, and the code word CR, and the updating unit 118 for updating the index 1 of the predicted-state memory 115 in accordance with whether the superiority symbol MPS and the code word CR agree or not.

Figure 30:
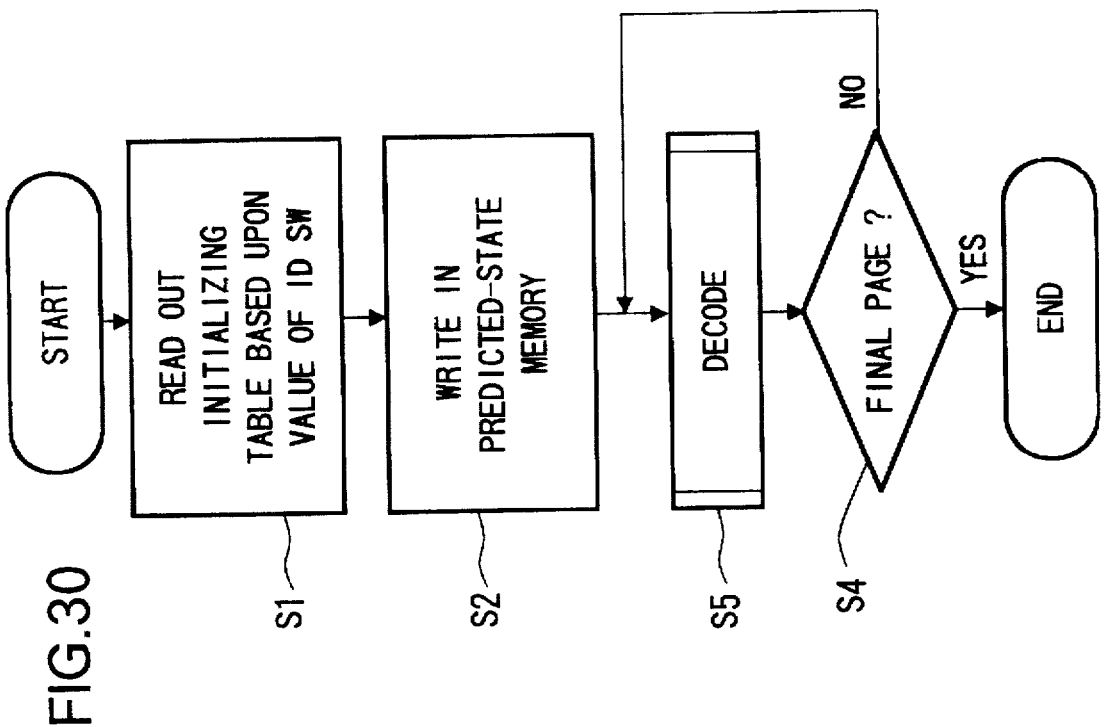
FIG. 30 is a flowchart illustrating the operation of decoding in the first embodiment.

The decoding operation performed by the above-mentioned components according to the first embodiment will now be described in accordance with the flowchart of FIG. 30.

When it is determined that the header of the received data has the aforementioned cipher identification code appended thereto, the values of the initializing table selected by an output from the four-bit ID switch 112 are read out at step S1, and the values are written in the predicted-state memory 115 at step S2. This is followed by step S3, at which the DECODE subroutine of FIG. 18 is called and the above-described decoding of one page is performed. Thereafter, the processing of step S5 is repeated without performing the initialization of the predicted-state memory 115. When the processing of the final page ends at step S4, decoding is terminated.

<Second Embodiment>

Figure 32:
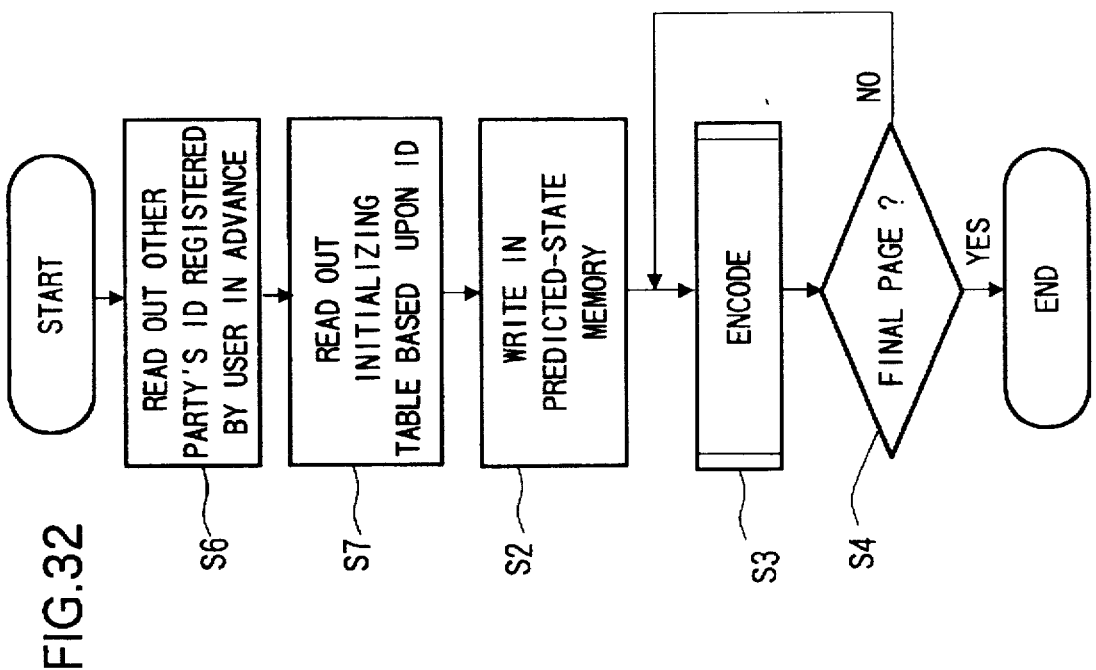
FIG. 32 is a flowchart illustrating the operation of encoding in the second embodiment.

FIG. 31 is a block diagram showing the encoder according to a second embodiment of the invention. Instead of relying upon the ID switch 112 of the first embodiment, this embodiment employs the user memory 104 from which the ID of the destination of the transmission is read out. FIG. 32 is a flowchart illustrating the operation of encoding according to the second embodiment.

When there is a request to begin encoding, the ID of the other party's apparatus registered in advance by the user is read out at step S6, the values of the initializing table selected by the read ID are read out at step S7, and the values are written in the predicted-state memory 115 at step S2. As in the first embodiment, the processing of step S3 is repeated without performing the initialization of the predicted-state memory 115. When the processing of the final page ends at step S4, encoding is terminated. At the time of transmission, a cipher identification code is appended to the header, after which the encoded data is transmitted.

Figure 34:
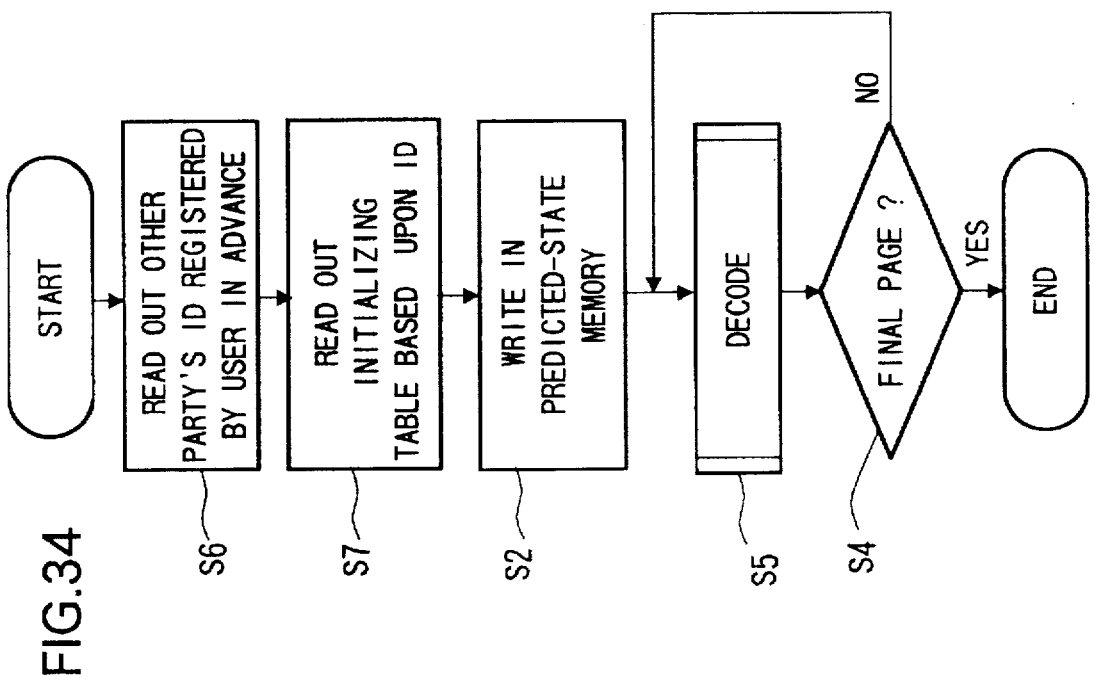
FIG. 34 is a flowchart illustrating the operation of decoding in the second embodiment.
Figure 33:
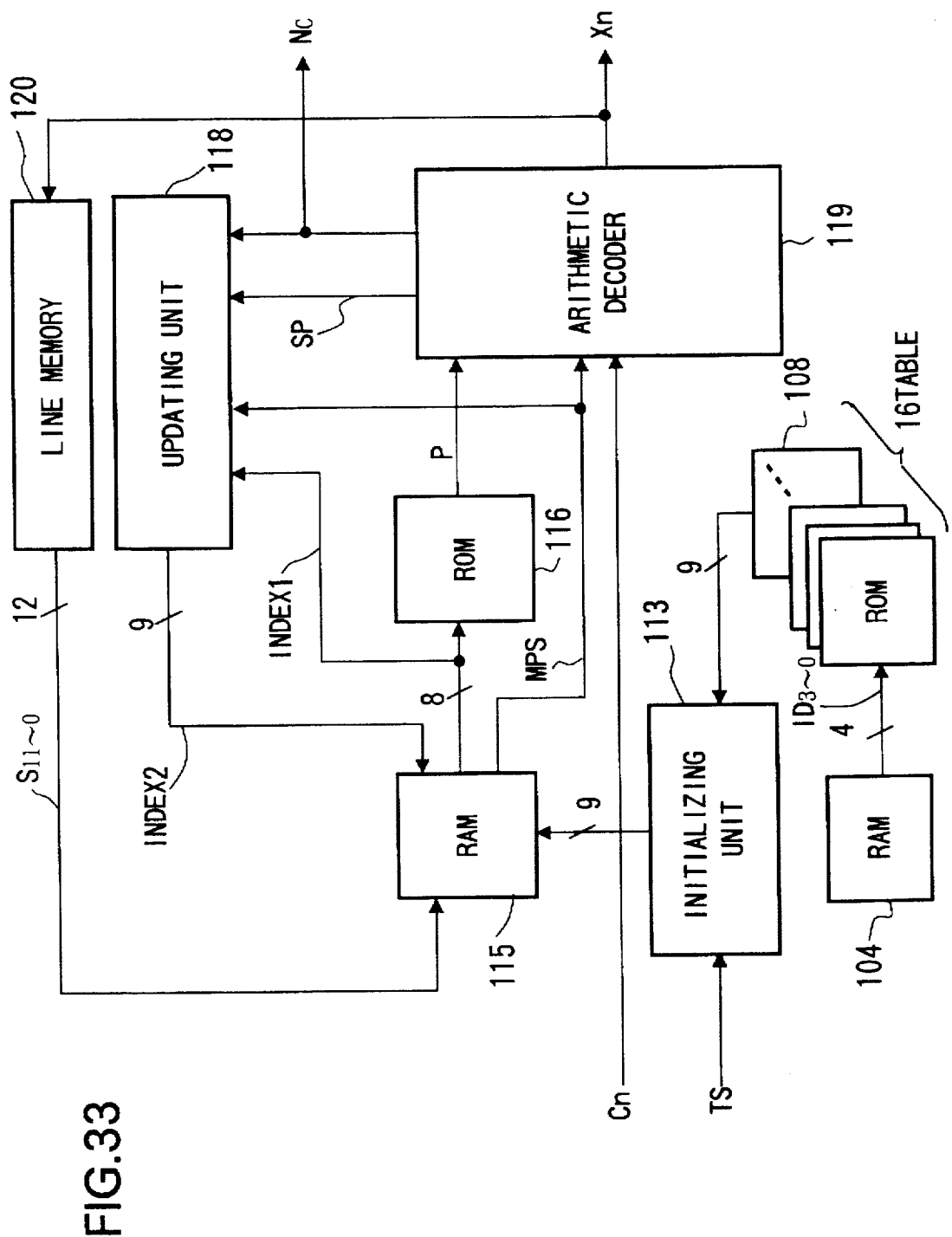
FIG. 33 is a block diagram illustrating the construction of a decoder in the second embodiment.

FIG. 33 is a block diagram showing a decoder according to the second embodiment of the invention. Instead of relying upon the ID switch 112 of the first embodiment, this embodiment employs the user memory 104 from which the ID of the transmitting apparatus is read out. FIG. 34 is a flowchart illustrating the operation of decoding according to the second embodiment.

When it is determined that the header of the received data has the cipher identification code appended thereto, the ID of the transmitting party's apparatus registered in advance by the user is read out at step S6, the values of the initializing table selected by the read ID are read out at step S7, and the values are written in the predicted-state memory 115 at step S2. Thereafter, as in the first embodiment, the processing of step S5 is repeated without performing the initialization of the predicted-state memory 115. When the processing of the final page ends at step S4, decoding is terminated.

<Third Embodiment>

Figure 35:
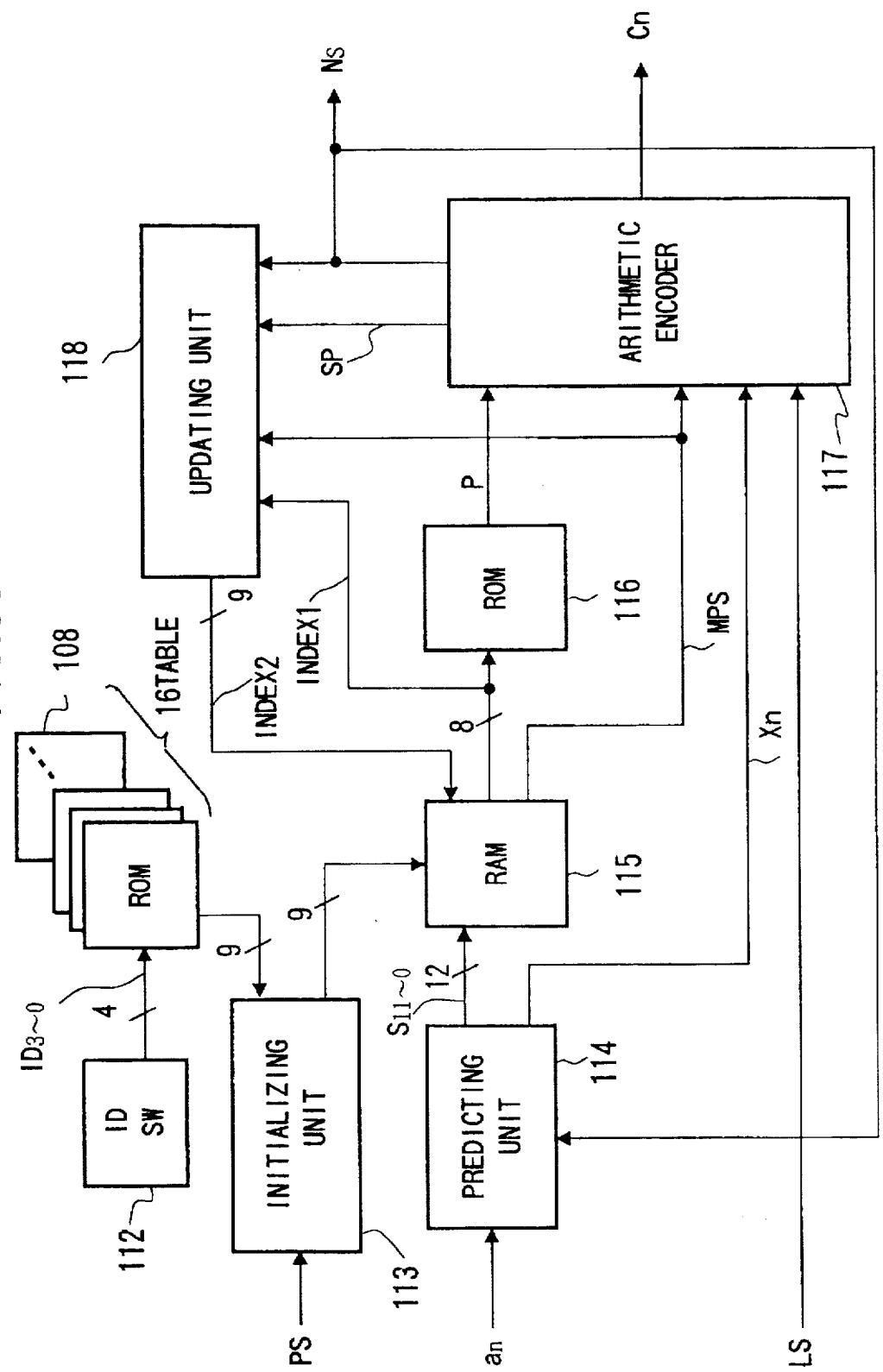
FIG. 35 is a block diagram illustrating the construction of the encoder in a third embodiment.
Figure 36:
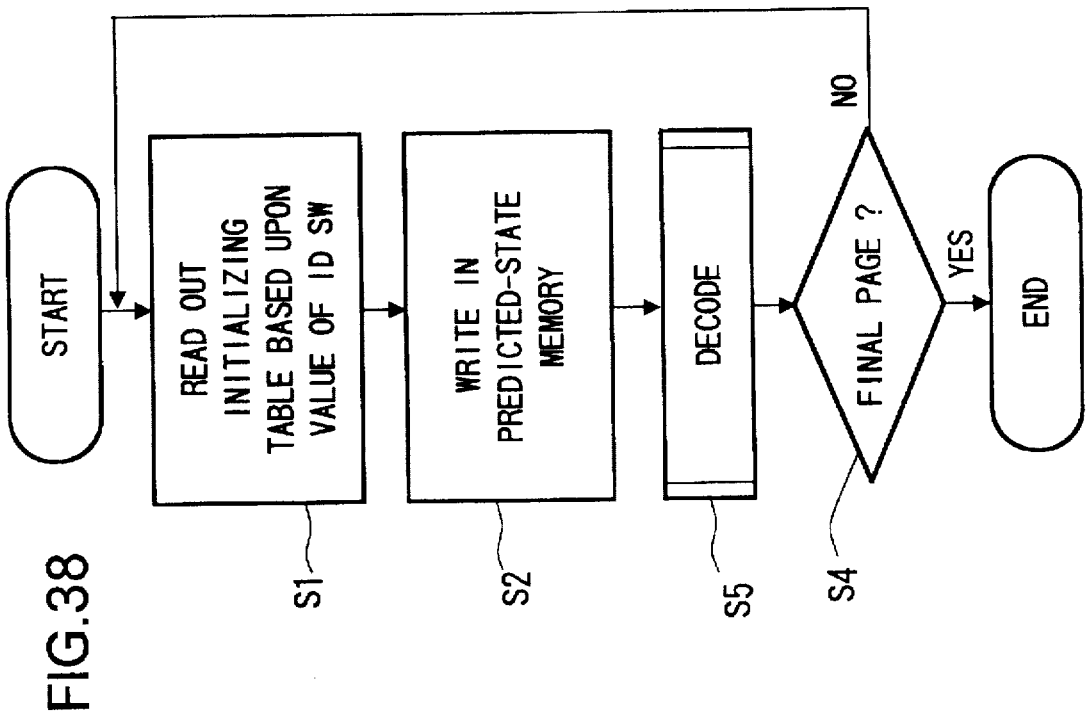
FIG. 36 is a flowchart illustrating the operation of encoding in the third embodiment.

FIG. 35 is a block diagram showing the encoder according to a third embodiment of the invention. In the first embodiment, the initialization of the predicted-state memory 115 is performed by TS (a transformation-start signal). In this embodiment, on the other hand, the initialization of the predicted-state memory 115 is performed by PS (a page-start signal). FIG. 36 is a flowchart illustrating the operation of encoding according to the third embodiment.

When there is a request to begin encoding, the values of the initializing table selected by an output from the four-bit ID switch 112 are read out at step S1, and the values are written in the predicted-state memory 115 at step S2. This is followed by step S3, at which the ENCODE subroutine of FIG. 6 is called and the encoding of one page is performed. Thereafter, the processing of steps S1 through S3 is repeated. When the processing of the final page ends at step S4, encoding is terminated. At the time of transmission, a cipher identification code is appended to the header, after which the resulting encoded data is transmitted.

Figure 38:
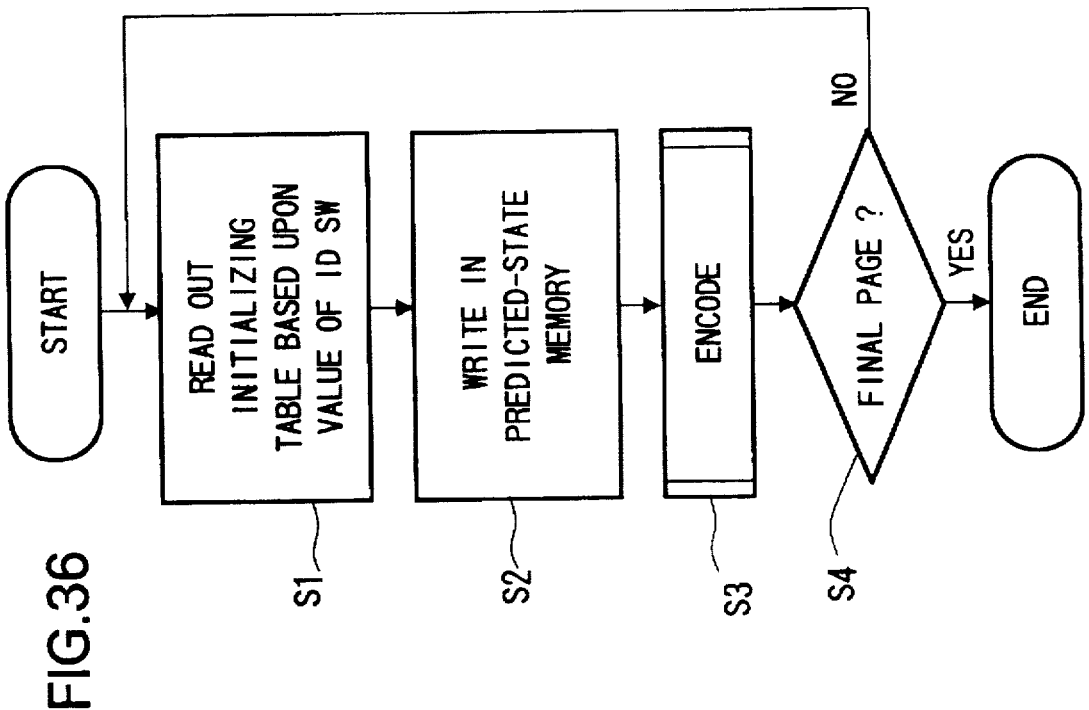
FIG. 38 is a flowchart illustrating the operation of decoding in the third embodiment.
Figure 37:
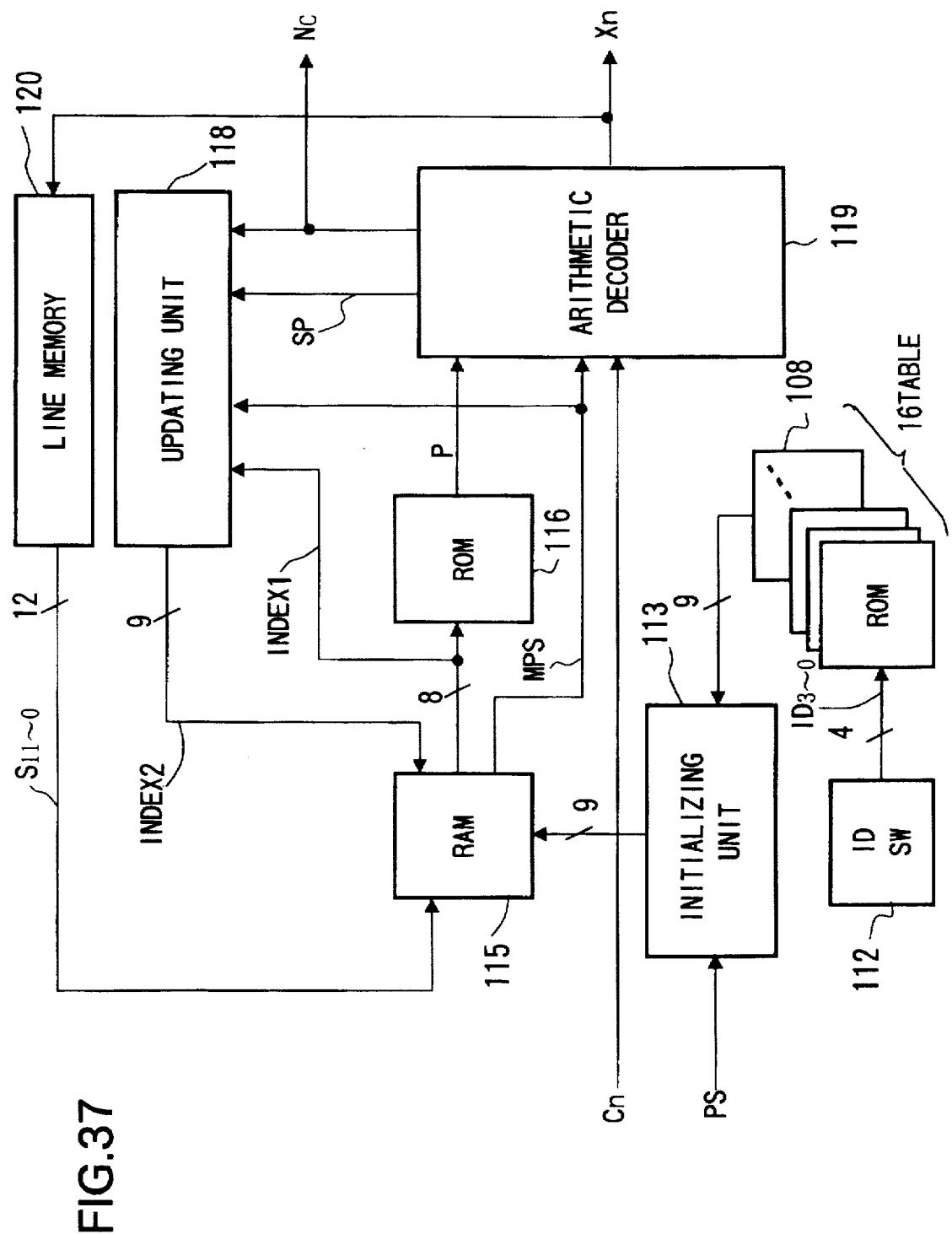
FIG. 37 is a block diagram illustrating the construction of a decoder in the third embodiment.

FIG. 37 is a block diagram showing a decoder according to the third embodiment of the invention. In the first embodiment, the initialization of the predicted-state memory 115 is performed by TS. In this embodiment, on the other hand, the initialization of the predicted-state memory 115 is performed by PS. FIG. 38 is a flowchart illustrating the operation of decoding according to the third embodiment.

When it is determined that the header of the received data has the cipher identification code appended thereto, the values of the initializing table selected by the output of the ID switch 112 are read out at step S1, and the values are written in the predicted-state memory 115 at step S2. Next, the DECODE subroutine shown in FIG. 18 is called and the decoding of one page is performed at step S5. Thereafter, the processing of steps S1, S2 and S5 is repeated. When the processing of the final page ends at step S4, decoding is terminated.

<Fourth Embodiment>

Figure 40:
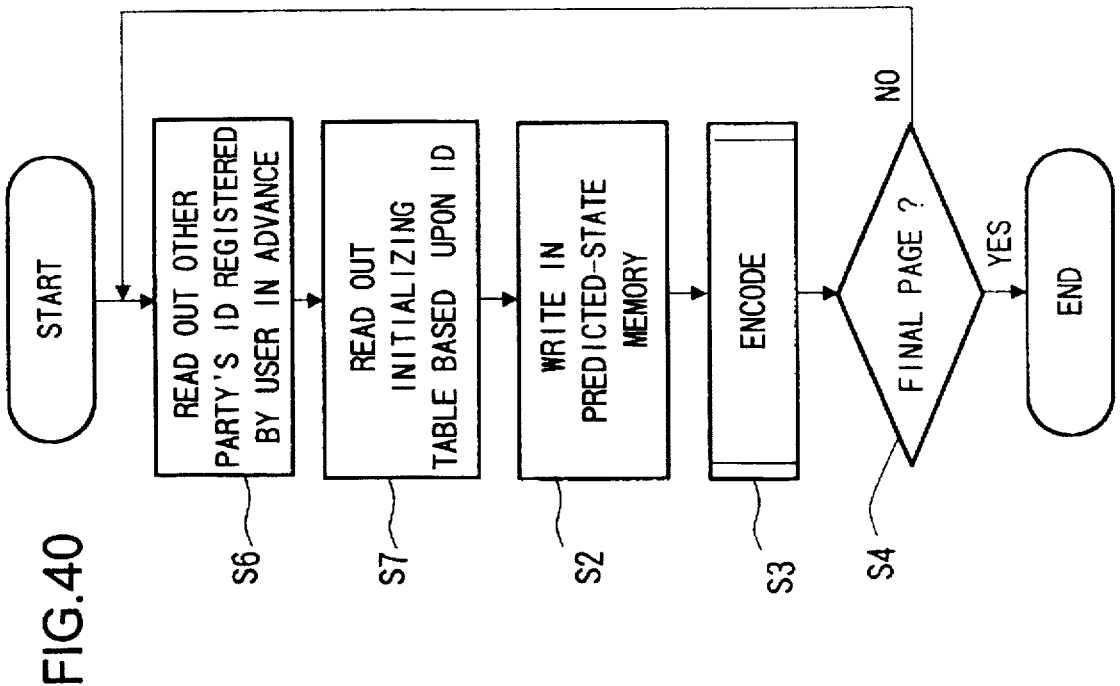
FIG. 40 is a flowchart illustrating the operation of encoding in the fourth embodiment.

FIG. 39 is a block diagram showing the encoder according to a fourth embodiment of the invention. Instead of relying upon the ID switch 112 of the third embodiment, this embodiment employs the user memory 104 from which the ID of the destination of the transmission is read out. FIG. 40 is a flowchart illustrating the operation of encoding according to the fourth embodiment.

When there is a request to begin encoding, the ID of the other party's apparatus registered in advance by the user is read out at step S6, the values of the initializing table selected by the read ID are read out at step S7, and the values are written in the predicted-state memory 115 at step S2. Thereafter, as in the third embodiment, the processing of steps S6, S7, S2 and S3 is repeated. When the processing of the final page ends at step S4, encoding is terminated. At the time of transmission, a cipher identification code is appended to the header, after which the encoded data is transmitted.

Figure 42:
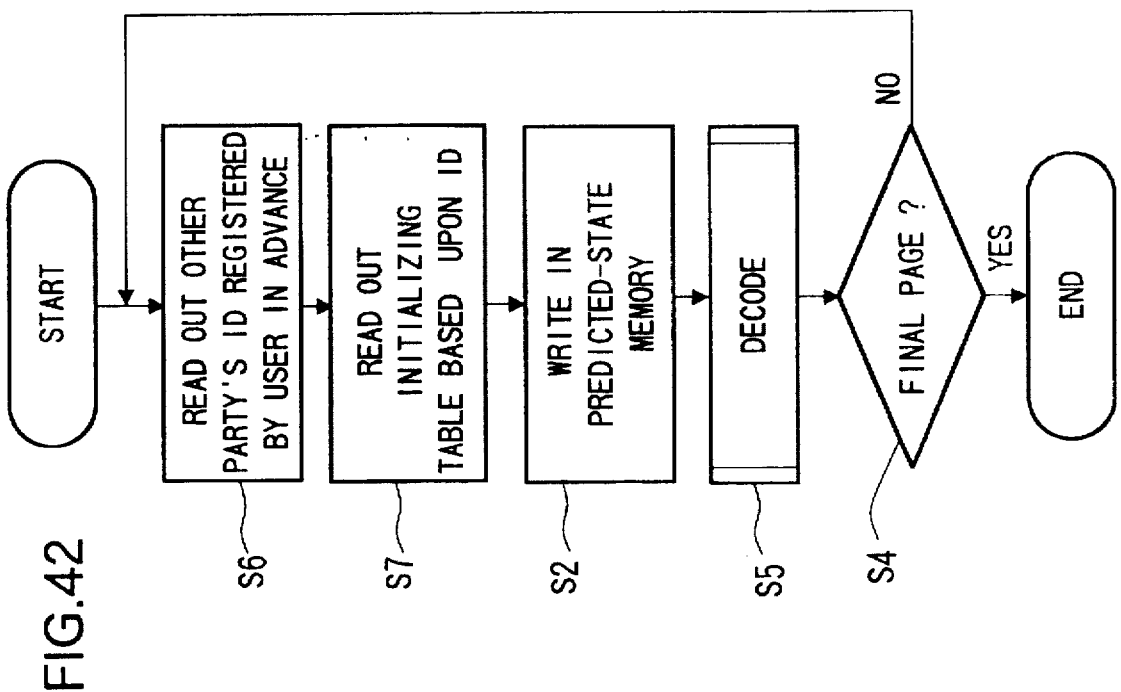
FIG. 42 is a flowchart illustrating the operation of decoding in the fourth embodiment.
Figure 41:
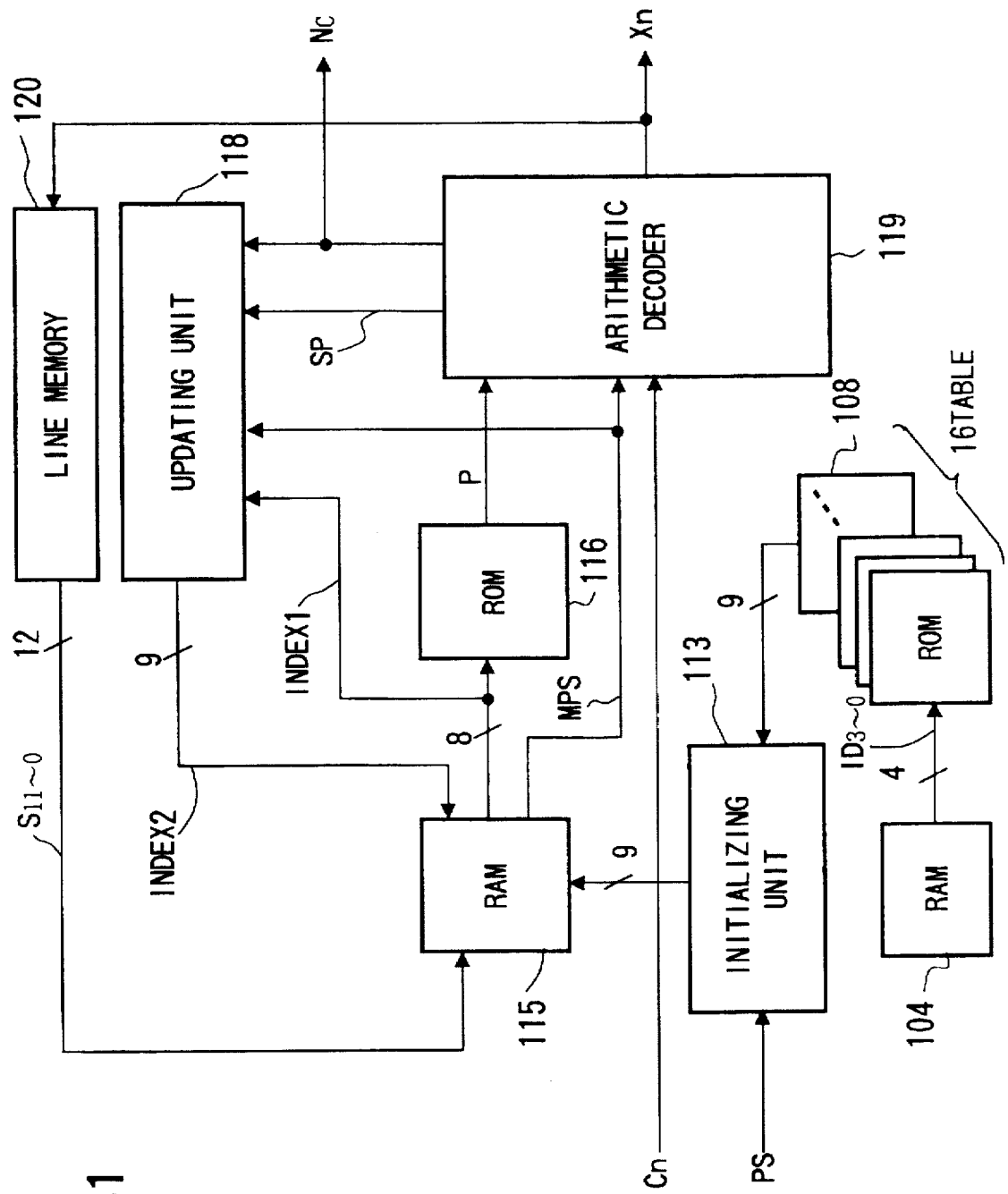
FIG. 41 is a block diagram illustrating the construction of a decoder in the fourth embodiment.

FIG. 41 is a block diagram showing a decoder according to the fourth embodiment of the invention. As in the encoder described above, the ID of the transmitting party's apparatus is read out of the user memory 104 rather than from the ID switch 112. FIG. 42 is a flowchart illustrating the operation of decoding according to the fourth embodiment.

When it is determined that the header of the received data has the cipher identification code appended thereto, the ID of the transmitting party's apparatus registered in advance by the user is read out at step S6, the values of the initializing table selected by the read ID are read out at step S7, and the values are written in the predicted-state memory 115 at step S2. Thereafter, as in the third embodiment, the processing of steps S6, S7, S2, S5 is repeated. When the processing of the final page ends at step S4, decoding is terminated.

<Fifth Embodiment>

Figure 44:
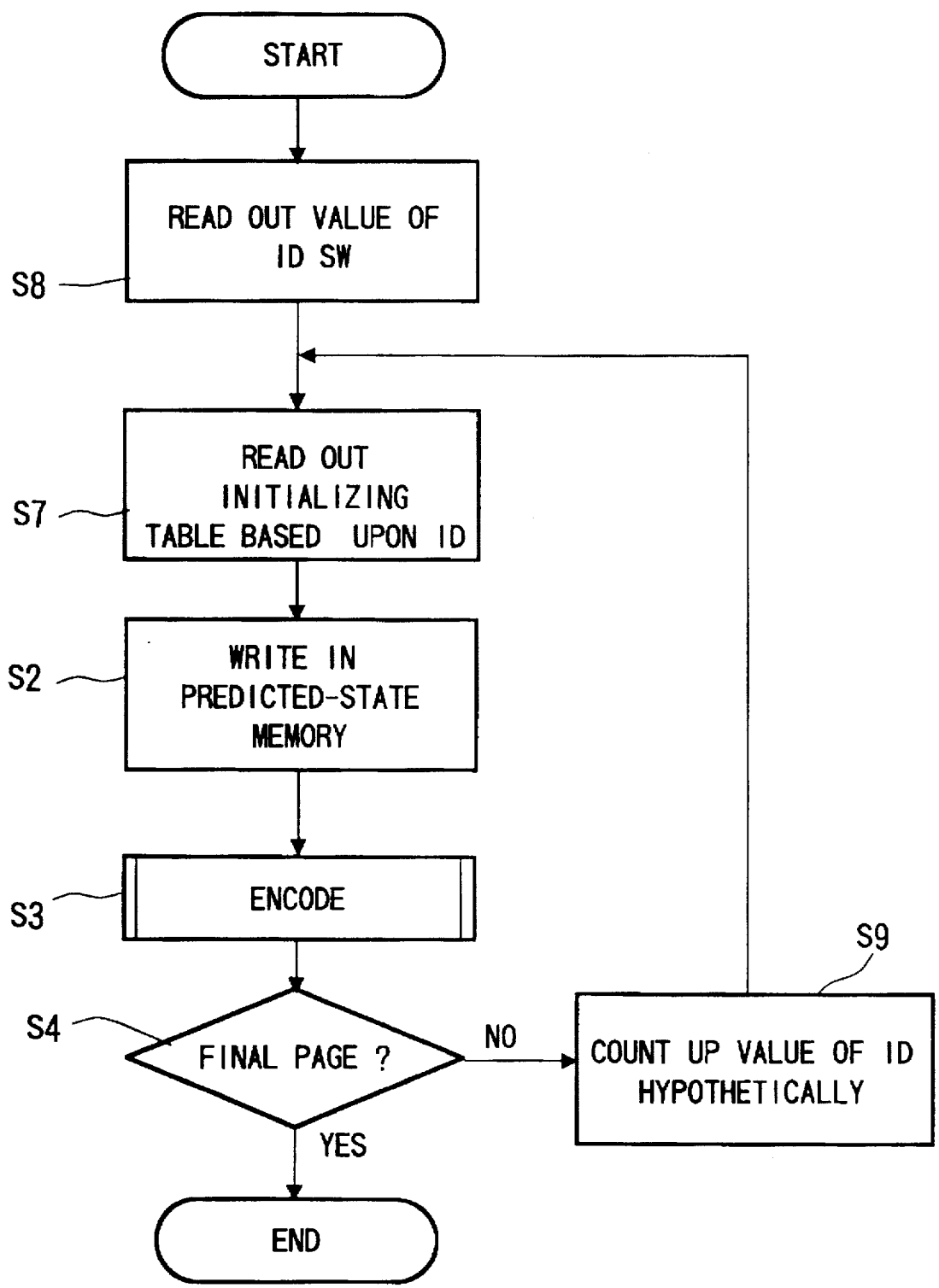
FIG. 44 is a flowchart illustrating the operation of encoding in the fifth embodiment.

FIG. 43 is a block diagram of the encoder according to a fifth embodiment of the invention. In the third embodiment described above, each page is initialized by the same table. In this embodiment, on the other hand, the arrangement is such that the ID is changed hypothetically by a counter every page. FIG. 44 is a flowchart showing the operation of encoding according to the fifth embodiment.

When there is a request to begin encoding, the value from the ID switch is read out at step S8, the values of the initializing table based upon this value are read out at step S7, and the values are written in the predicted-state memory 115 at step S2. This is followed by step S3, at which the ENCODE subroutine of FIG. 6 is called and the encoding of one page is performed. If the page is not the last page, the value of the ID is counted up hypothetically at step S9 by the counter 121. Steps S7, S2, S3 and S9 are repeated, as in the aforementioned manner. When the processing of the last page ends at step S4, encoding is terminated. At the time of transmission, a cipher identification code is appended to the header, after which the resulting encoded data is transmitted.

Figure 45:
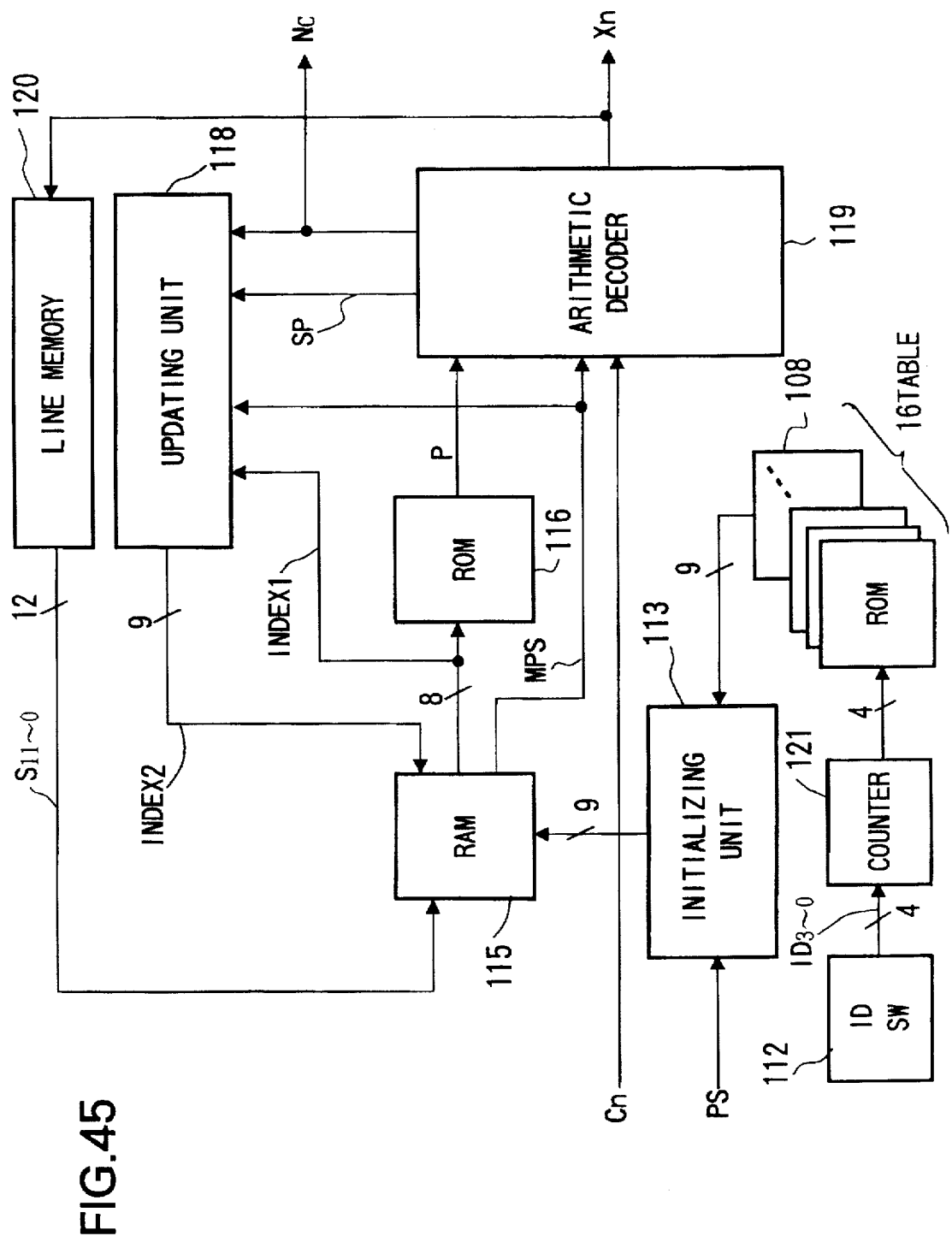
FIG. 45 is a block diagram illustrating the construction of a decoder in the fifth embodiment.
Figure 46:
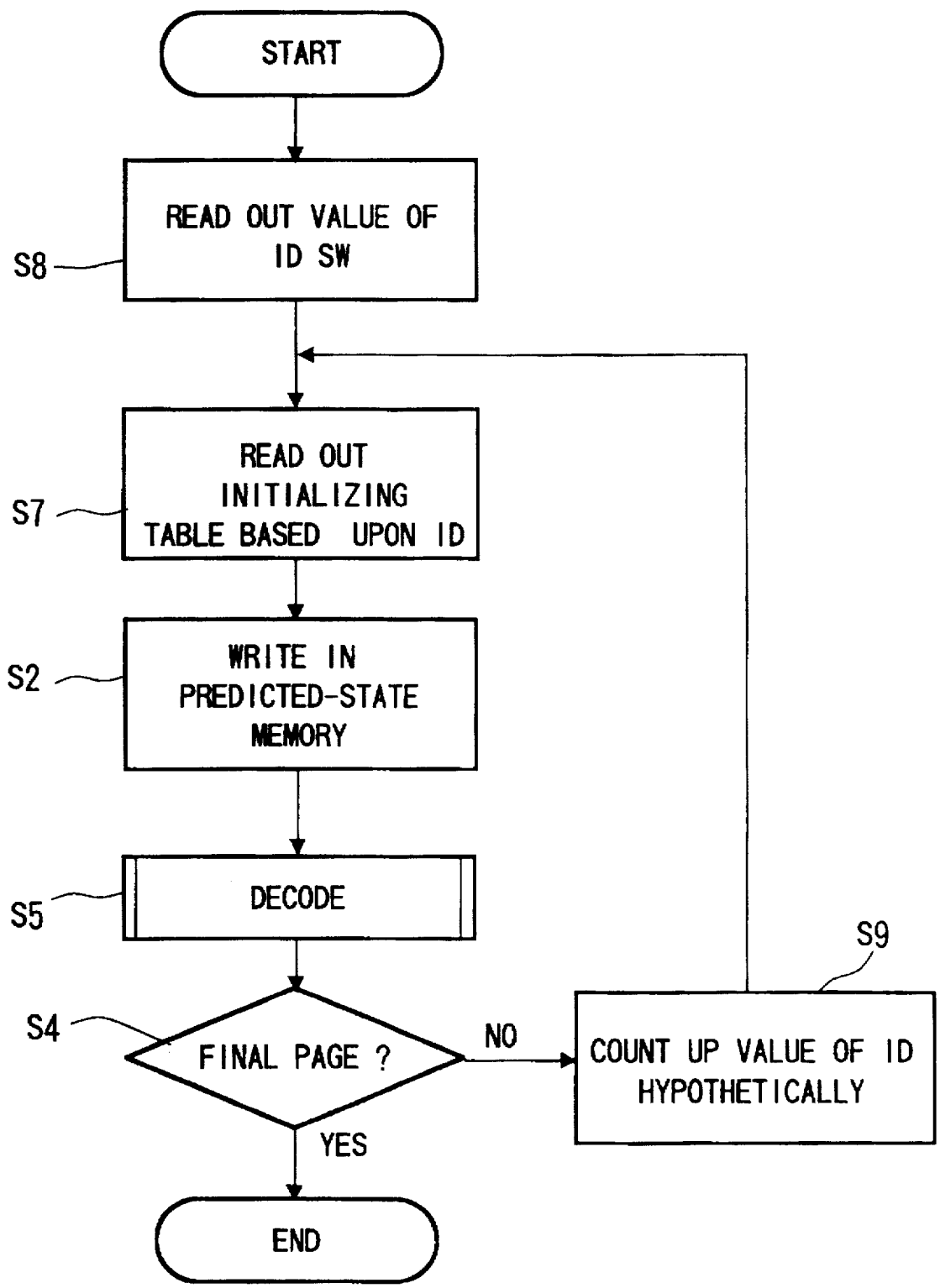
FIG. 46 is a flowchart illustrating the operation of decoding in the fifth embodiment.

FIG. 45 is a block diagram of a decoder according to a fifth embodiment of the invention. As in the manner of the above-described encoder, the ID is changed hypothetically by a counter every page. FIG. 46 is a flowchart showing the operation of decoding according to the fifth embodiment.

When it is determined that the header of the received data has the cipher identification code appended thereto, the value from the ID switch 112 is read out at step S9, the values of the initializing table based upon this value are read out at step S7, and the values are written in the predicted-state memory 115 at step S2. Thereafter, steps S7, S2, S5 and S9 are repeated as in the aforementioned manner. When the processing of the last page ends at step S4, decoding is terminated.

<Sixth Embodiment>

Figure 47:
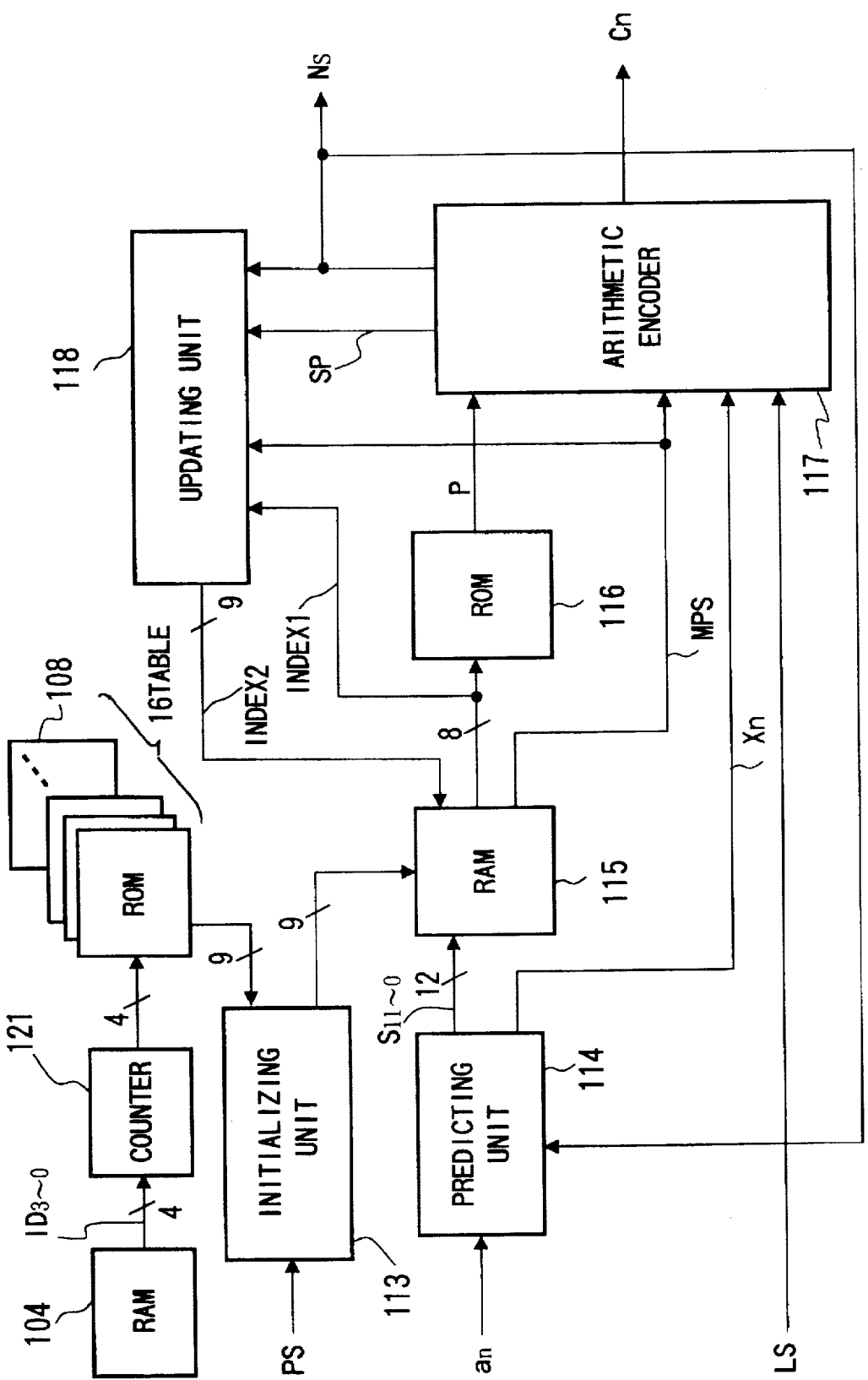
FIG. 47 is a block diagram illustrating the construction of the encoder in a sixth embodiment.
Figure 48:
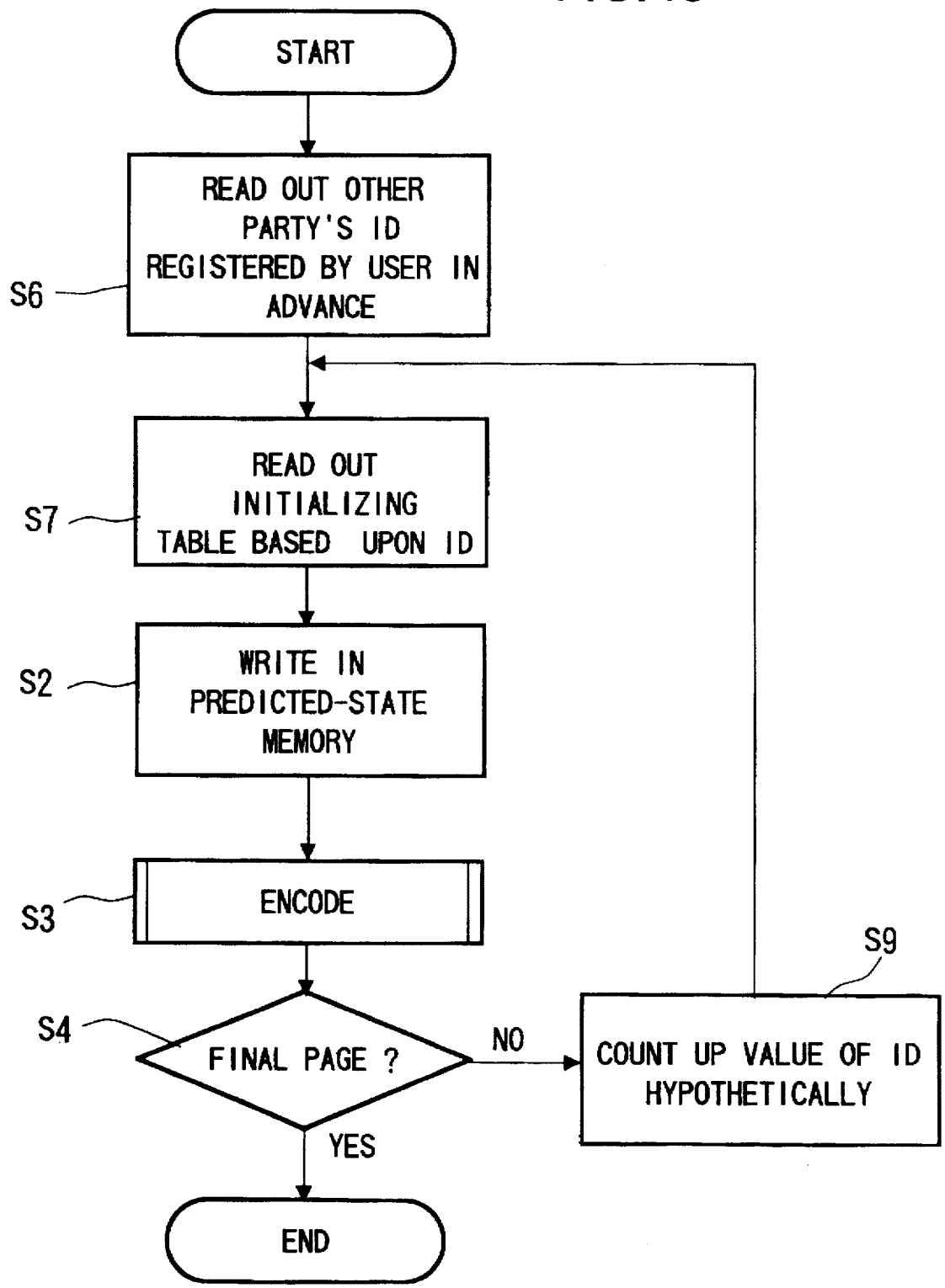
FIG. 48 is a flowchart illustrating the operation of encoding an the sixth embodiment.

FIG. 47 is a block diagram showing the encoder according to a sixth embodiment of the invention. Instead of relying upon the ID switch 112 of the fifth embodiment, this embodiment employs the user memory 104 from which the ID of the destination of the transmission is read out. FIG. 48 is a flowchart illustrating the operation of encoding according to the sixth embodiment.

When there is a request to begin encoding, the ID of the other party's apparatus registered in advance by the user is read out at step S6, the values of the initializing table selected by the read ID are read out at step S7, and the values are written in the predicted-state memory 115 at step S2. Thereafter, as in the fifth embodiment, the processing of steps S7, S2, S3 and S9 is repeated. When the processing of the final page ends at step S4, encoding is terminated. At the time of transmission, a cipher identification code is appended to the header, after which the encoded data is transmitted.

Figure 49:
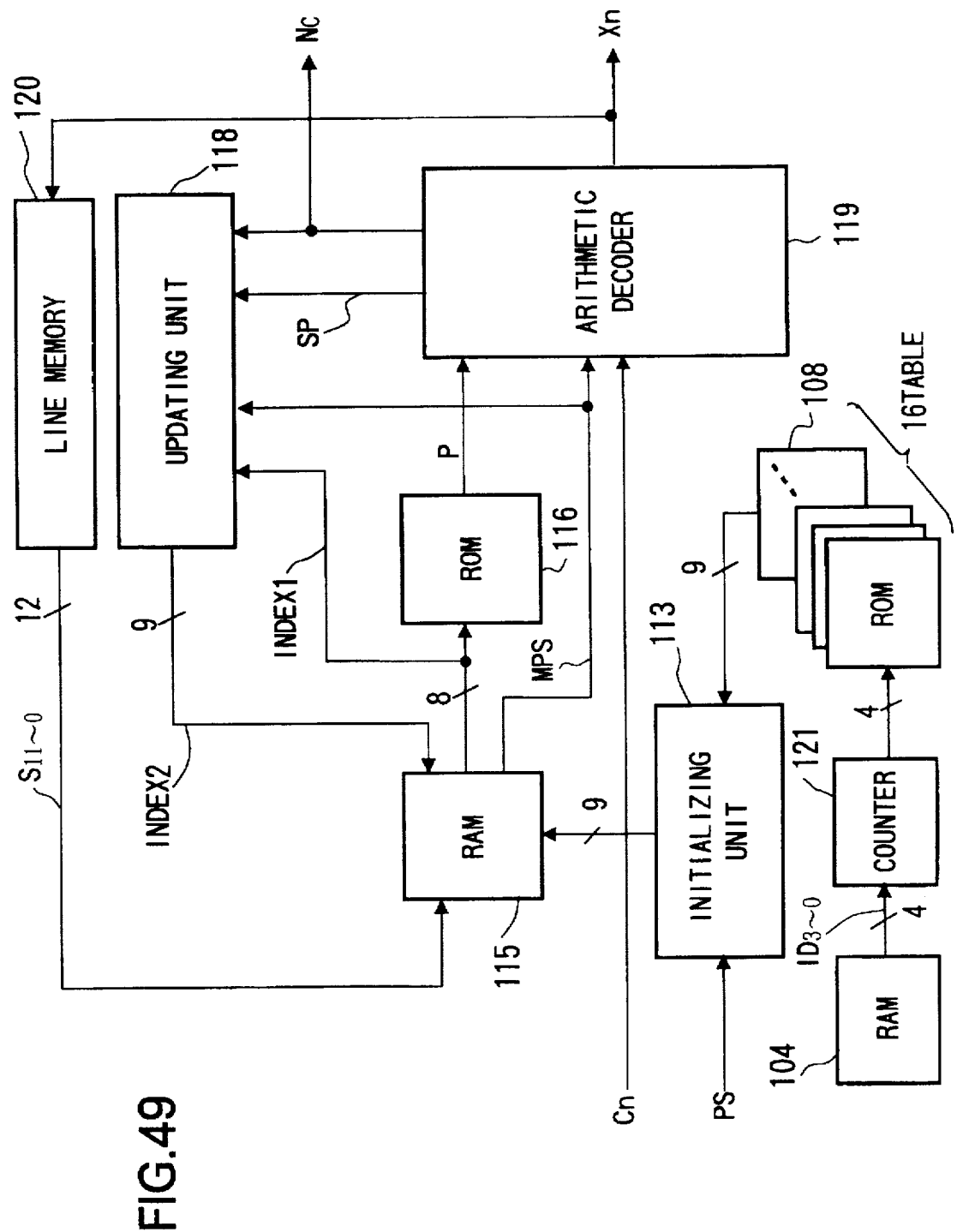
FIG. 49 is a block diagram illustrating the construction of a decoder in the sixth embodiment.
Figure 50:
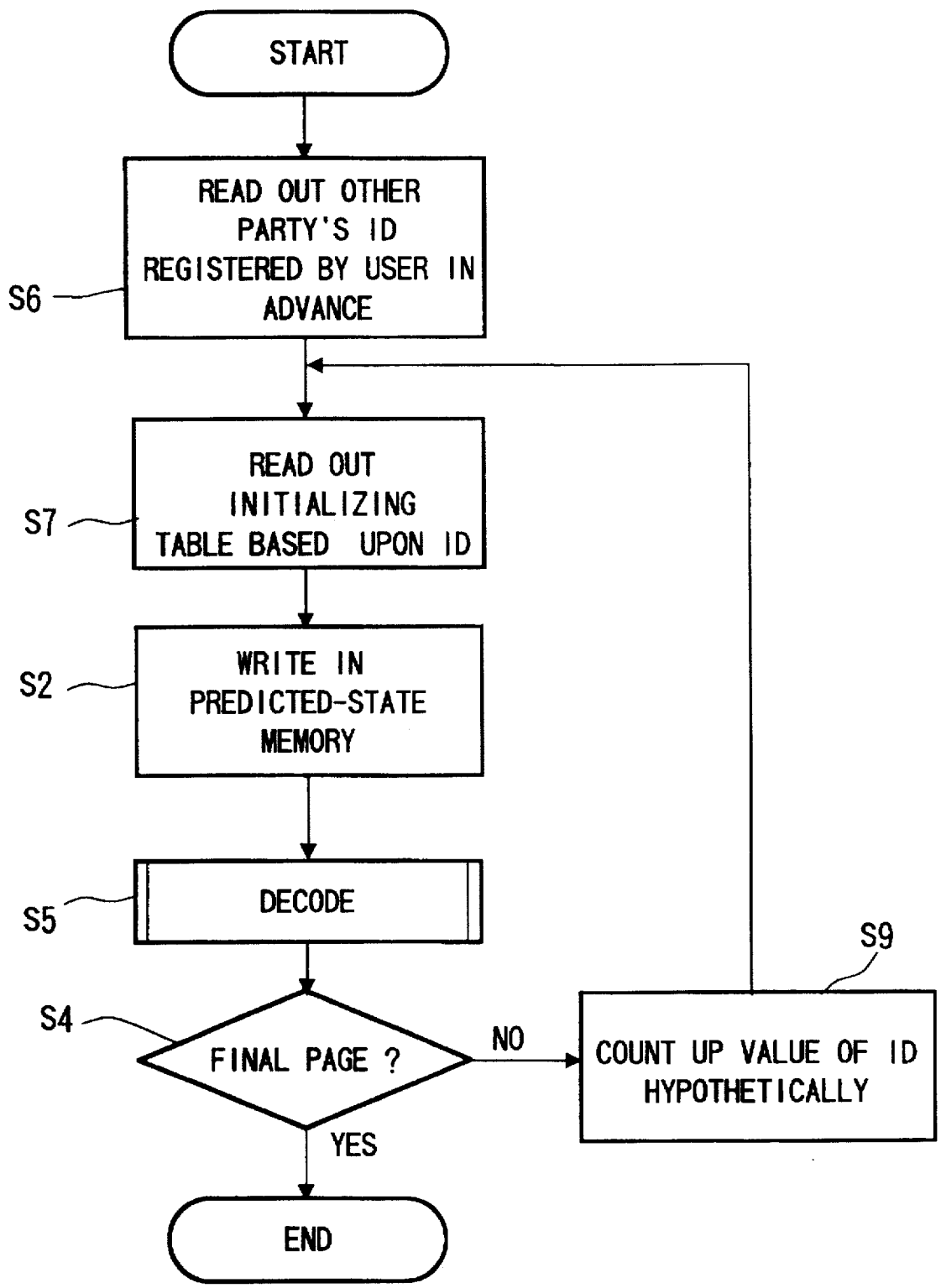
FIG. 50 is a flowchart illustrating the operation of decoding in the sixth embodiment.

FIG. 49 is a block diagram showing a decoder according to the sixth embodiment of the invention. Instead of relying upon the ID switch 112, this embodiment employs the user memory 104 from which the ID of the destination of the transmission is read out, as in the manner of the encoder described above. FIG. 50 is a flowchart illustrating the operation of decoding according to the sixth embodiment.

When it is determined that the header of the received data has the cipher identification code appended thereto, the ID of the transmitting party's apparatus registered in advance by the user is read out at step S6, the values of the initializing table selected by the read ID are read out at step S7, and the values are written in the predicted-state memory 115 at step S2. Thereafter, as in the fifth embodiment, the processing of steps S7, S2, S5, S9 is repeated. When the processing of the final page ends at step S4, decoding is terminated.

<Seventh Embodiment>

Figure 51:
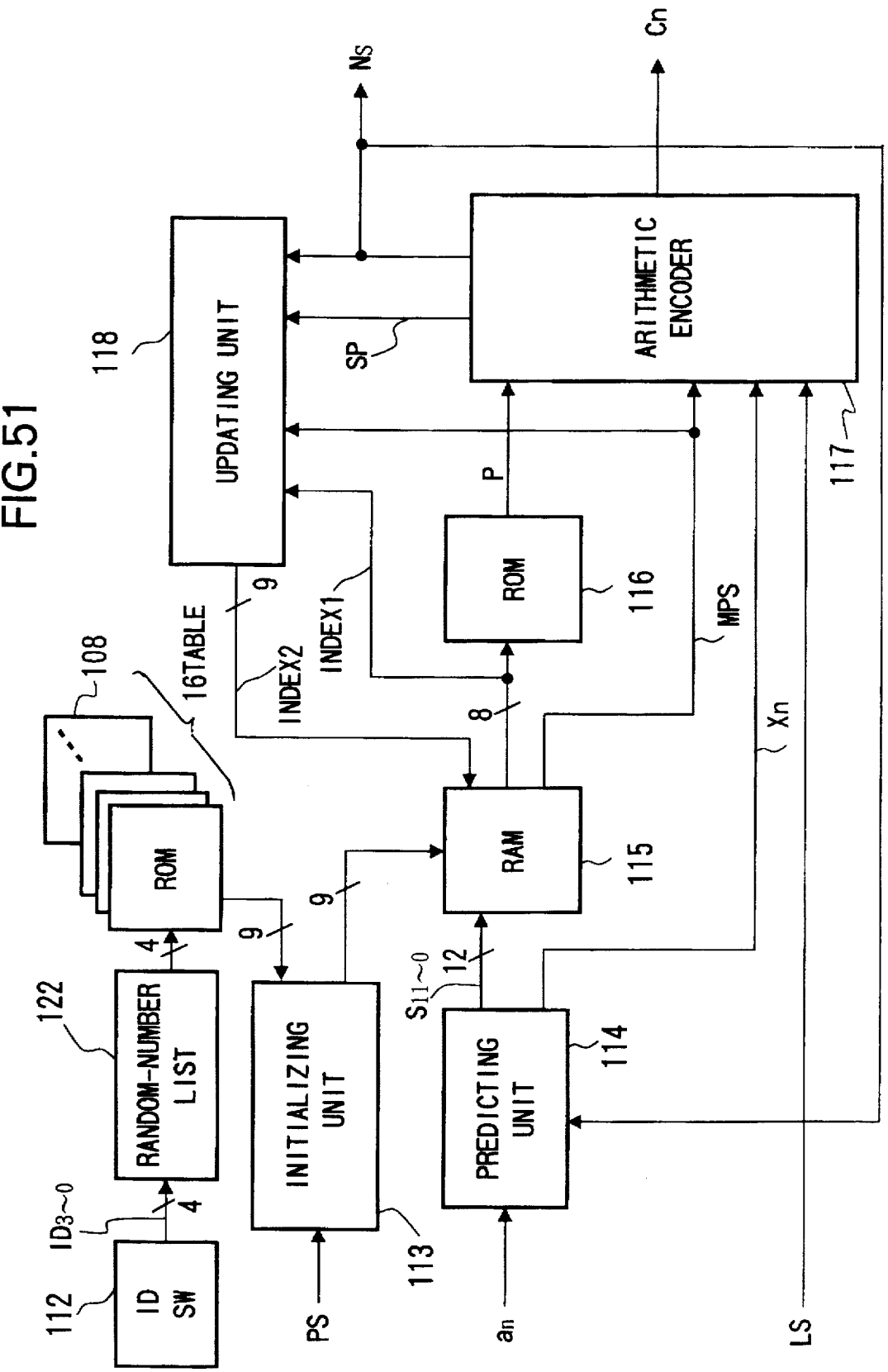
FIG. 51 is a block diagram illustrating the construction of the encoder in a seventh embodiment.
Figure 52:
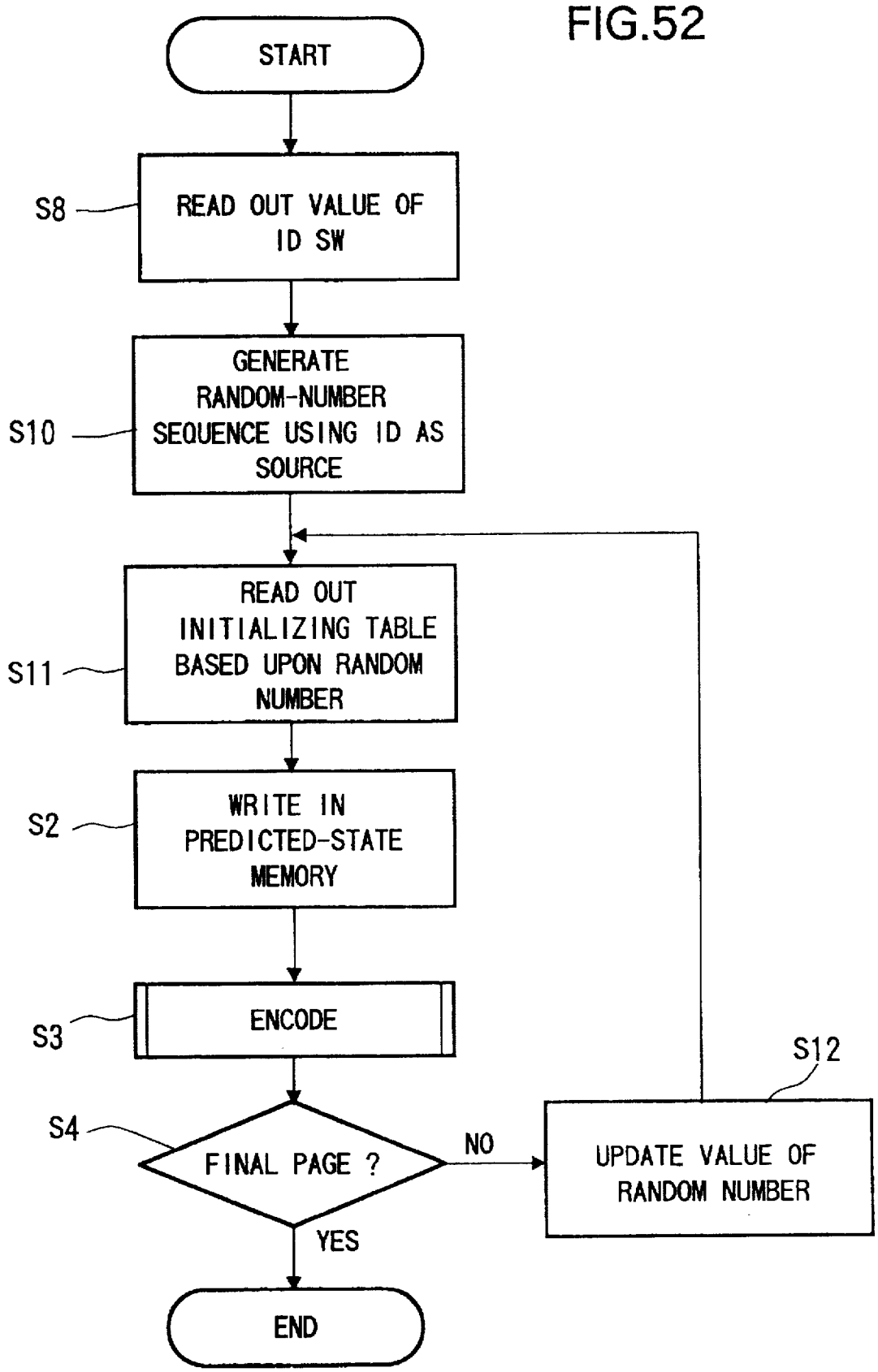
FIG. 52 is a flowchart illustrating the operation of encoding in the seventh embodiment.

FIG. 51 is a block diagram of the encoder according to a seventh embodiment of the present invention. In the fifth embodiment described above, the ID is changed by a counter page by page. In this embodiment, on the other hand, the arrangement is such that the initializing table 108 is changed by the values of a random-number sequence. FIG. 52 is a flowchart illustrating the encoding operation according to the seventh embodiment.

When there is a request to begin encoding, the value of the ID switch 112 is read out at step S8 and a random-number sequence is generated at step S10 with this value serving as the source. The values of the initializing table based upon the random number are read out at step S11, and the values are written in the predicted-state memory 115 at step S2. Next, the ENCODE subroutine shown in FIG. 6 is called and the encoding of one page is performed at step S3. If the page is not the last page, the next random number is read out at step S12 in order to update the value of the random number. The processing of steps S11, S2, S3 and S12 is repeated as in the aforementioned manner. When the processing of the final page ends at step S4, encoding is terminated. At the time of transmission, a cipher identification code is appended to the header, after which the encoded data is transmitted.

Figure 53:
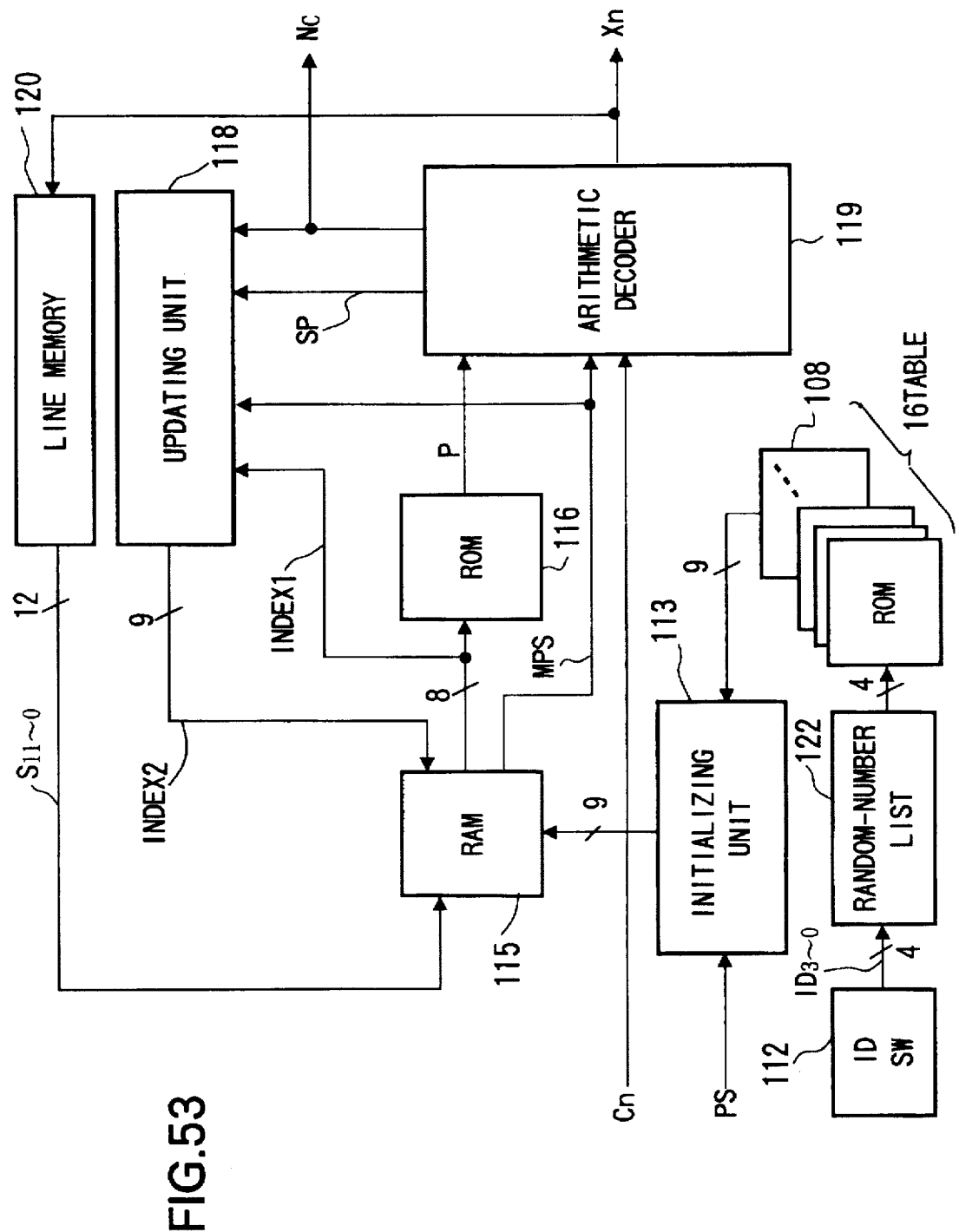
FIG. 53 is a block diagram illustrating the construction of a decoder in the seventh embodiment.
Figure 54:
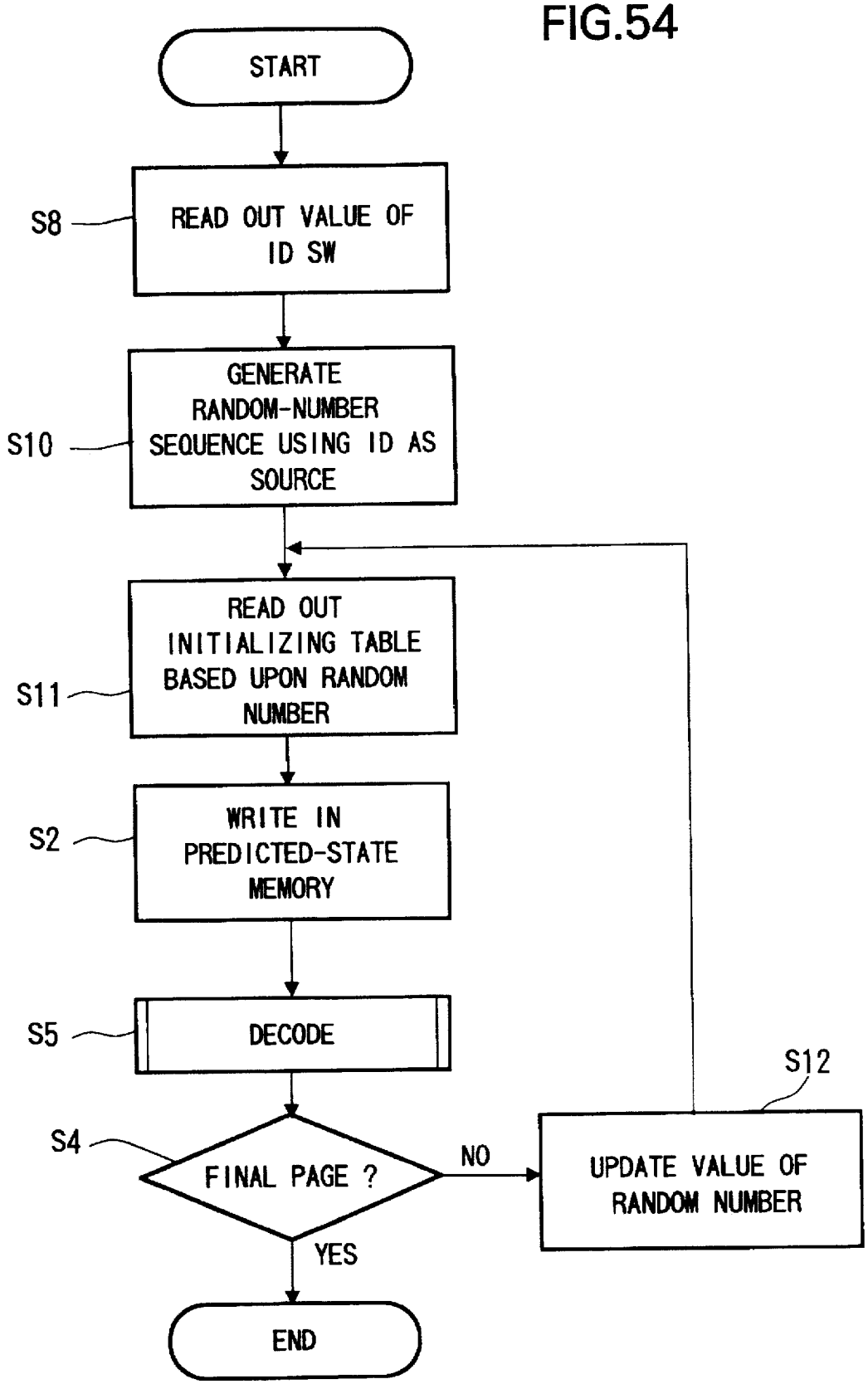
FIG. 54 is a flowchart illustrating the operation of decoding in the seventh embodiment.

FIG. 53 is a block diagram of a decoder according to a seventh embodiment of the present invention. In the seventh embodiment described above, the value of the random number is updated and changed every page, as in the manner of the above-described encoder. FIG. 54 is a flowchart illustrating the decoding operation according to the seventh embodiment.

When it is determined that the header of the received data has the cipher identification code appended thereto, the value from the ID switch 112 is read out at step S8 and a random-number sequence is generated at step S10 with this value serving as the source. The values of the initializing table based upon this random number value are read out at step S11, and the values are written in the predicted-state memory 115 at step S2. Next, the DECODE subroutine shown in FIG. 18 is called and the decoding of one page is performed at step S5. Thereafter, the processing of steps S11, S2, S5 and S12 is repeated. When the processing of the final page ends at step S4, decoding is terminated.

<Eighth Embodiment>

Figure 55:
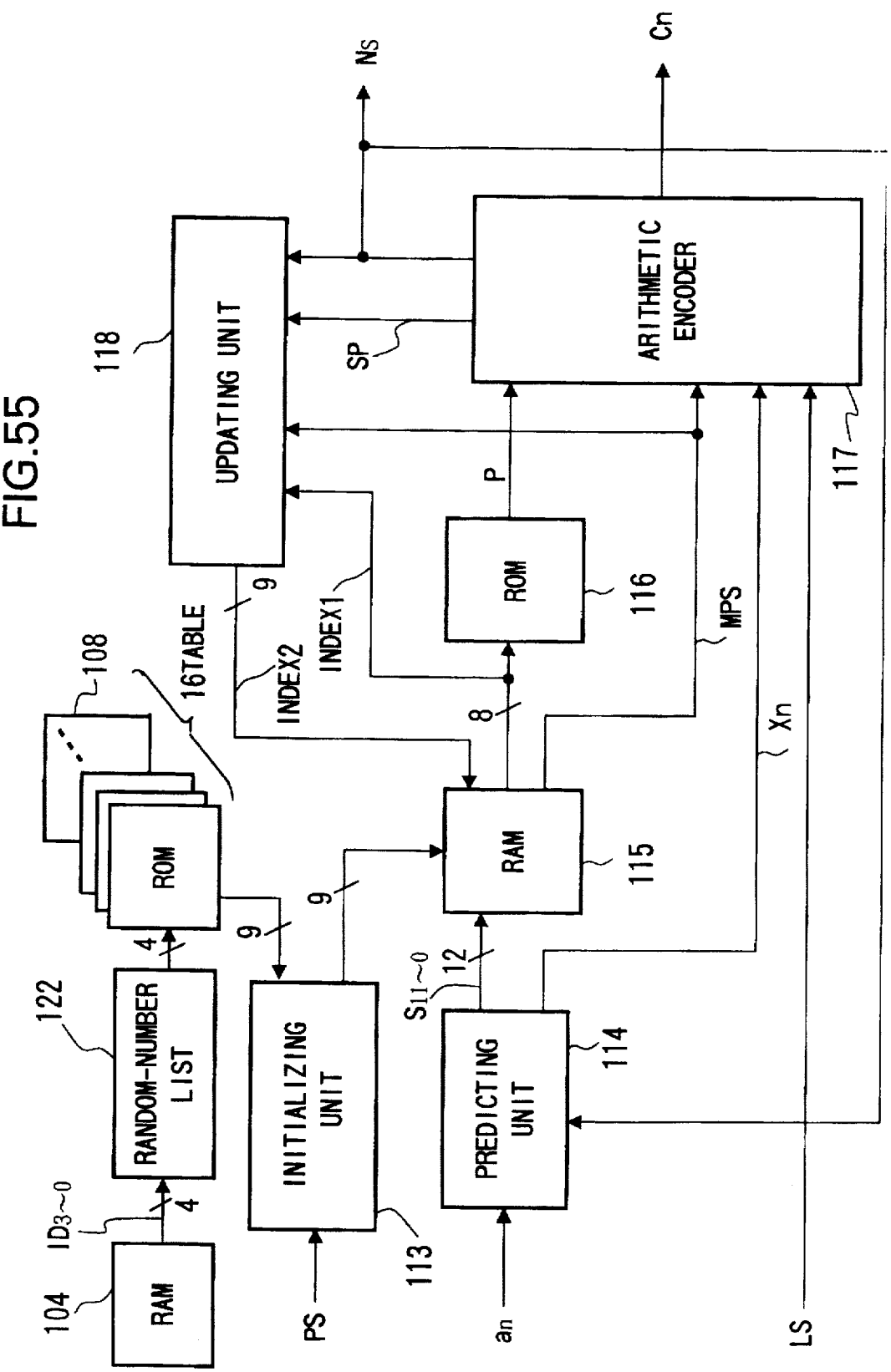
FIG. 55 is a block diagram illustrating the construction of the encoder in an eighth embodiment.
Figure 56:
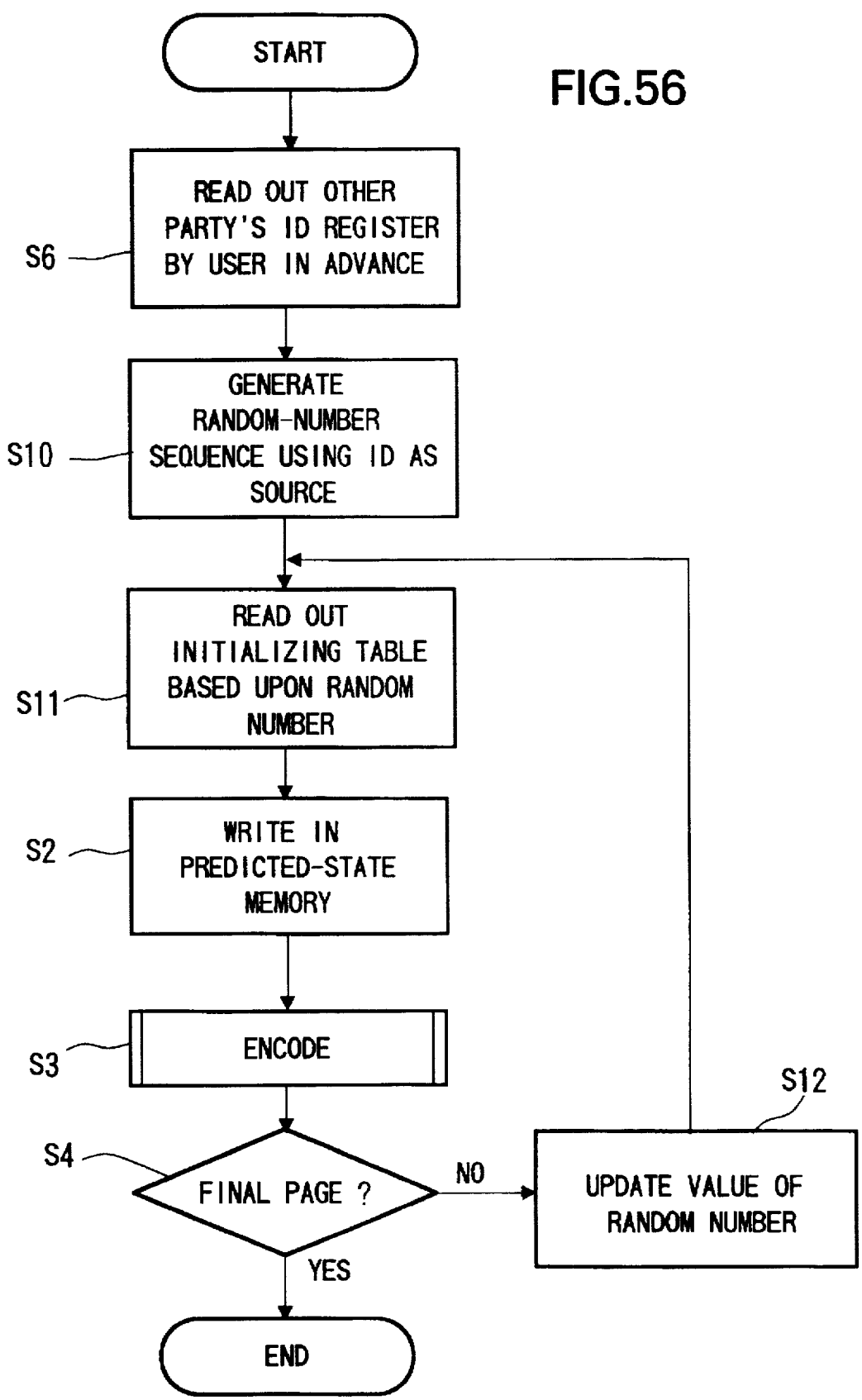
FIG. 56 is a flowchart illustrating the operation of encoding an the eighth embodiment.

FIG. 55 is a block diagram showing the encoder according to an eighth embodiment of the invention. Instead of relying upon the ID switch 112 of the seventh embodiment, this embodiment employs the user memory 104 from which the ID of the destination of the transmission is read out. FIG. 56 is a flowchart illustrating the operation of encoding according to the eighth embodiment.

When there is a request to begin encoding, the ID of the other party's apparatus registered in advance by the user is read out at step S6 and a random-number sequence is generated at step S10 with the ID serving as the source. The values of the initializing table based upon the random number are read out at step S11, and the values are written in the predicted-state memory 115 at step S2. Thereafter, as in the seventh embodiment, the processing of steps S11, S2, S3 and S12 is repeated. When the processing of the final page ends at step S4, encoding is terminated. At the time of transmission, a cipher identification code is appended to the header, after which the encoded data is transmitted.

Figure 57:
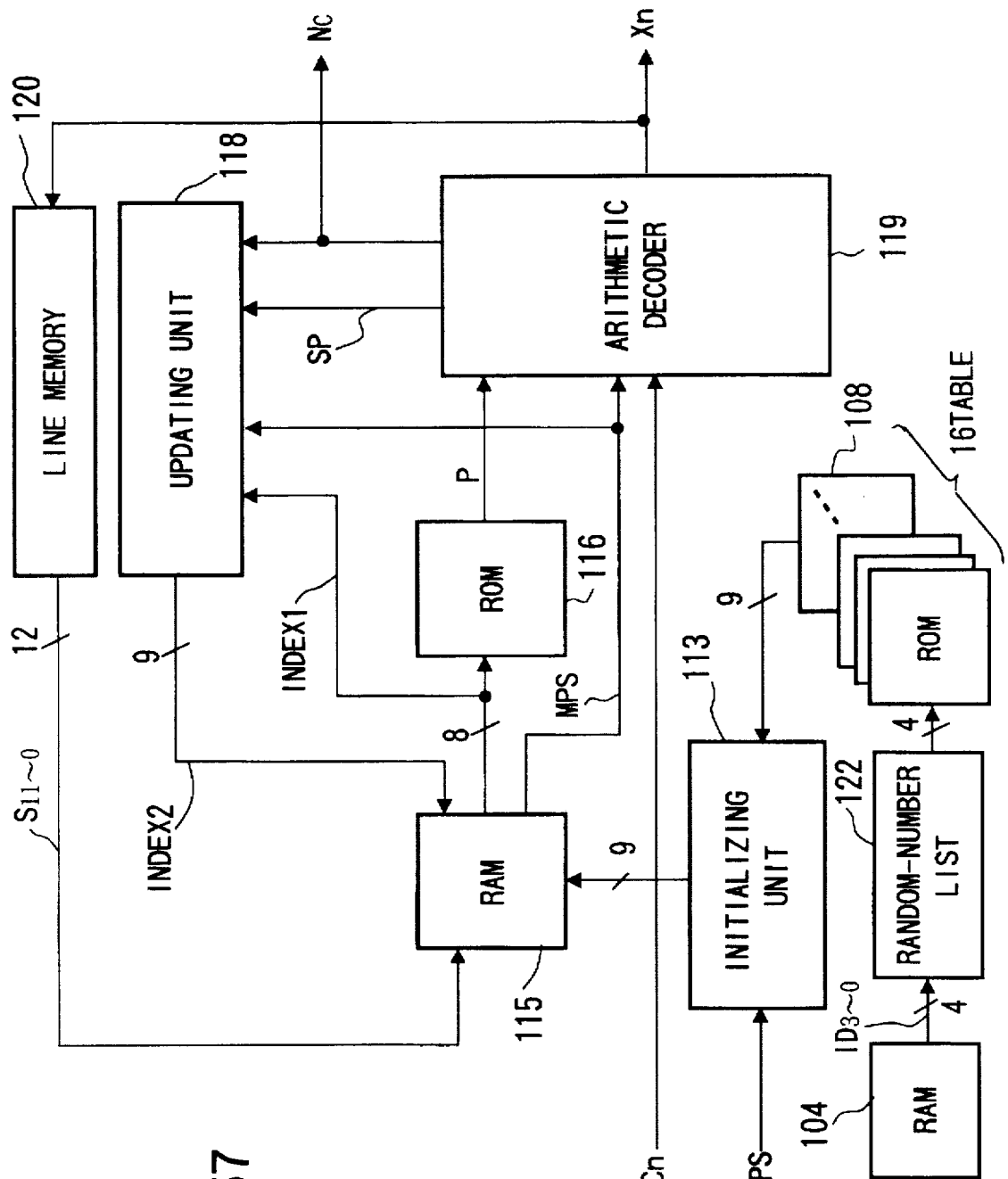
FIG. 57 is a block diagram illustrating the construction of a decoder in the eighth embodiment.
Figure 58:
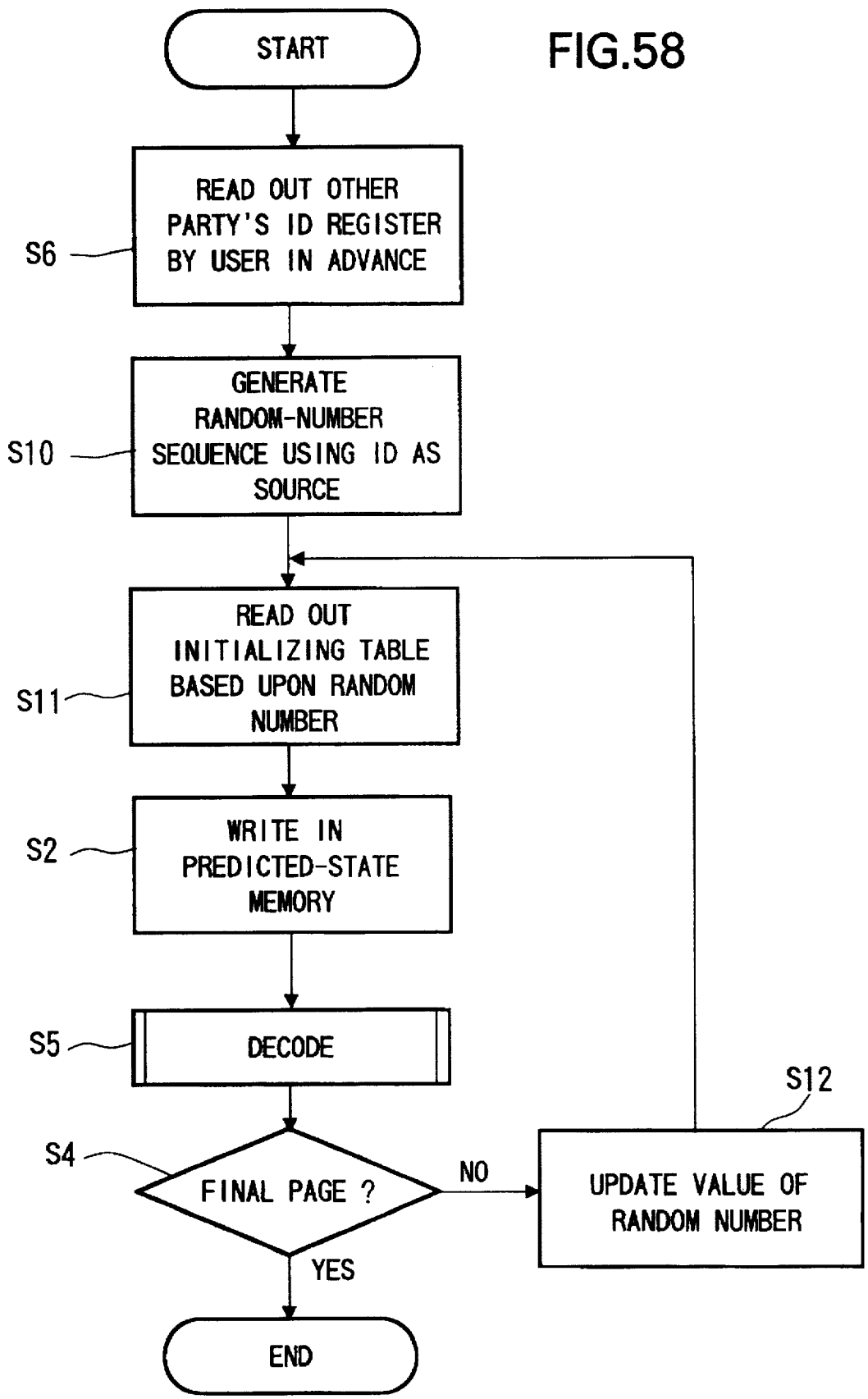
FIG. 58 is a flowchart illustrating the operation of decoding in the eighth embodiment.

FIG. 57 is a block diagram showing a decoder according to the eighth embodiment of the invention. Instead of relying upon the ID switch 112, this embodiment employs the user memory 104 from which the ID of the destination of the transmission is read out, as in the manner of the encoder described above. FIG. 58 is a flowchart illustrating the operation of decoding according to the eighth embodiment.

When it is determined that the header of the received data has the cipher identification code appended thereto, the ID of the transmitting party's apparatus registered in advance by the user is read out at step S6 and a random-number sequence is generated at step S10 with this ID serving as the source. The values of the initializing table based upon the random number are read out at step S11, and the values are written in the predicted-state memory 115 at step S2. Thereafter, as in the seventh embodiment, the processing of steps S11, S2, S5, S12 is repeated. When the processing of the final page ends at step S4, decoding is terminated.

Thus, in accordance with the embodiments described above, an image transmission apparatus for transmitting and receiving images using dynamic arithmetic encoding is provided with a plurality of initializing tables, and one of these tables is selected based upon an ID registered in advance. On the transmitting side, a predicted-state memory within the encoder is initialized at the beginning of communication or at the beginning of each page and, after enciphered encoding is carried out, a signal to the effect that enciphered encoding has been performed is appended, after which the transmission is made. On the receiving side, it is determined whether the signal indicative of enciphering has been appended. If the signal is identified, then, in a manner similar to that on the transmitting side, a predicted-state memory within a decoder is initialized by an initializing table selected based upon the ID, and decoding is carried out. If the IDs of the transmitting and receiving sides do not agree, received image data can no longer be decoded correctly, and therefore the confidentiality of the contents of the communication can be maintained.

<Other Embodiments>

Other embodiments of the present invention will now be described with reference to the related drawings.

In the second, fourth, sixth and eighth embodiments, the ID of the other party's apparatus is read out of the user memory 104 instead of the ID switch 112. A case in which the ID of the apparatus is read will now be described as another embodiment of the invention.

Figure 59:
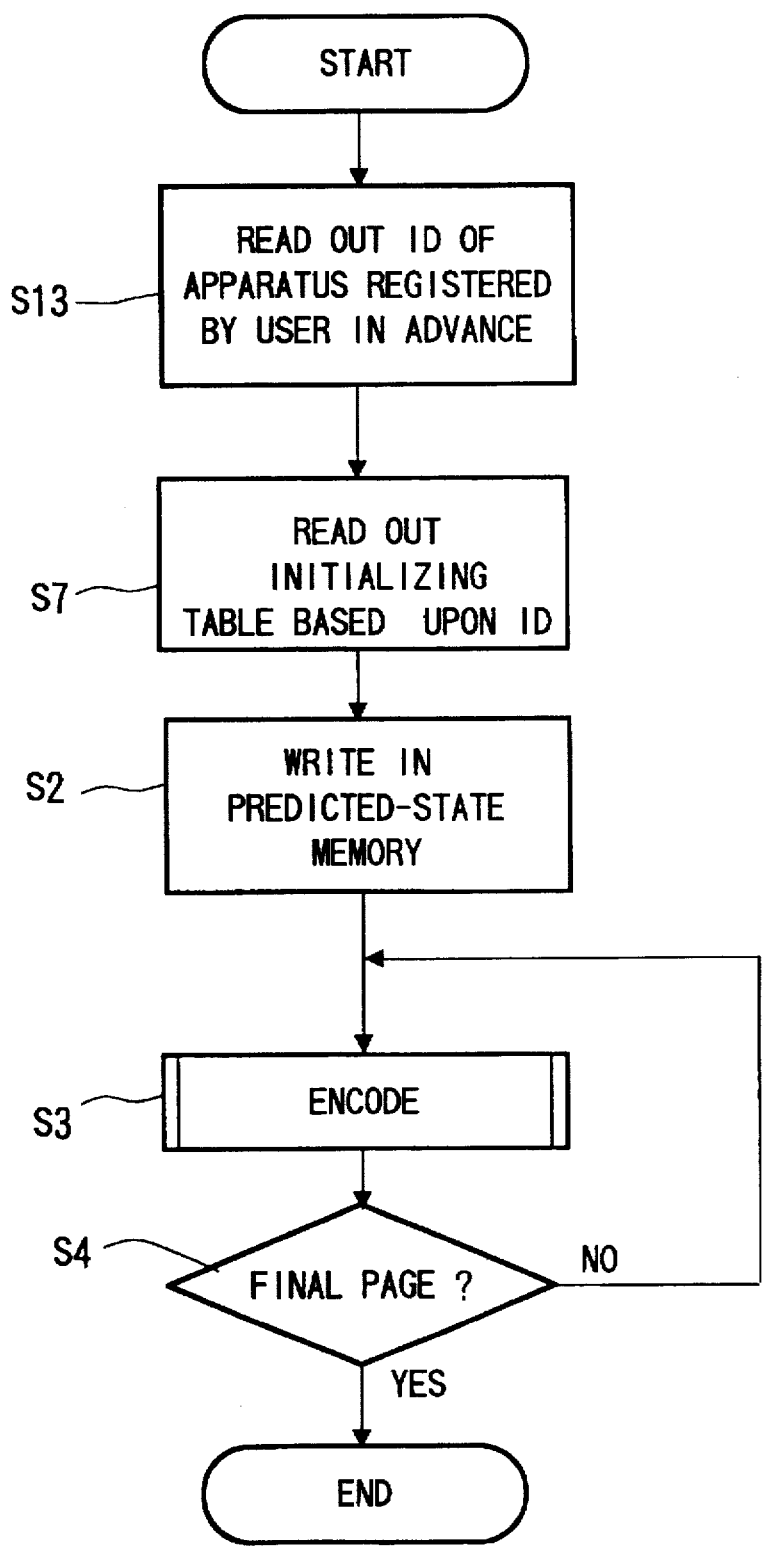
FIGS. 59-66 are flowcharts illustrating the operation of encoding and decoding in other embodiments of the present invention.

The operation of encoding corresponding to the second embodiment will now be described in accordance with the flowchart shown in FIG. 59.

When there is a request to begin encoding, the four-bit ID of the apparatus set by the user at the time of registration is read out at step S13, the values of the initializing table selected by this ID are read out at step S7, and these values are written in the predicted-state memory 115 at step S2. Thereafter, as in the second embodiment, the processing of step S3 is repeated without initializing the predicted-state memory 115. When processing of the final page ends at step S4, encoding is terminated. At the time of transmission, a cipher identification code is appended to the header, after which the encoded data is transmitted.

Figure 60:
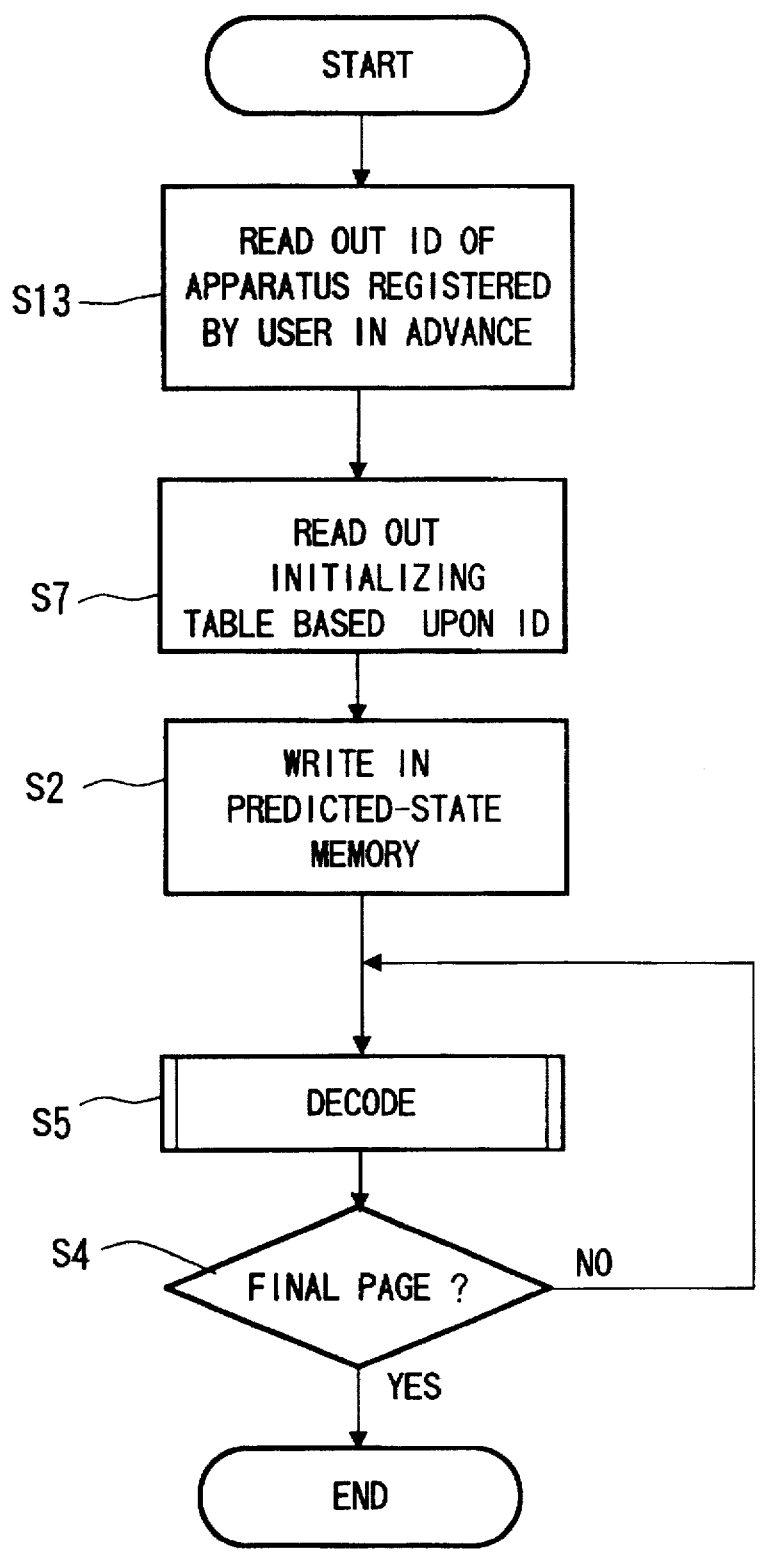

The operation of decoding corresponding to the second embodiment will now be described in accordance with the flowchart of FIG. 60.

When it is determined that the header of the received data has the cipher identification code appended thereto, the four-bit ID of the apparatus set by the user at the time of registration is read out at step S13, the values of the initializing table selected by this ID are read out at step S7, and these values are written in the predicted-state memory 115 at step S2. Thereafter, as in the second embodiment, the processing of step S5 is repeated without initializing the predicted-state memory 115. When processing of the final page ends at step S4, decoding is terminated.

Figure 61:
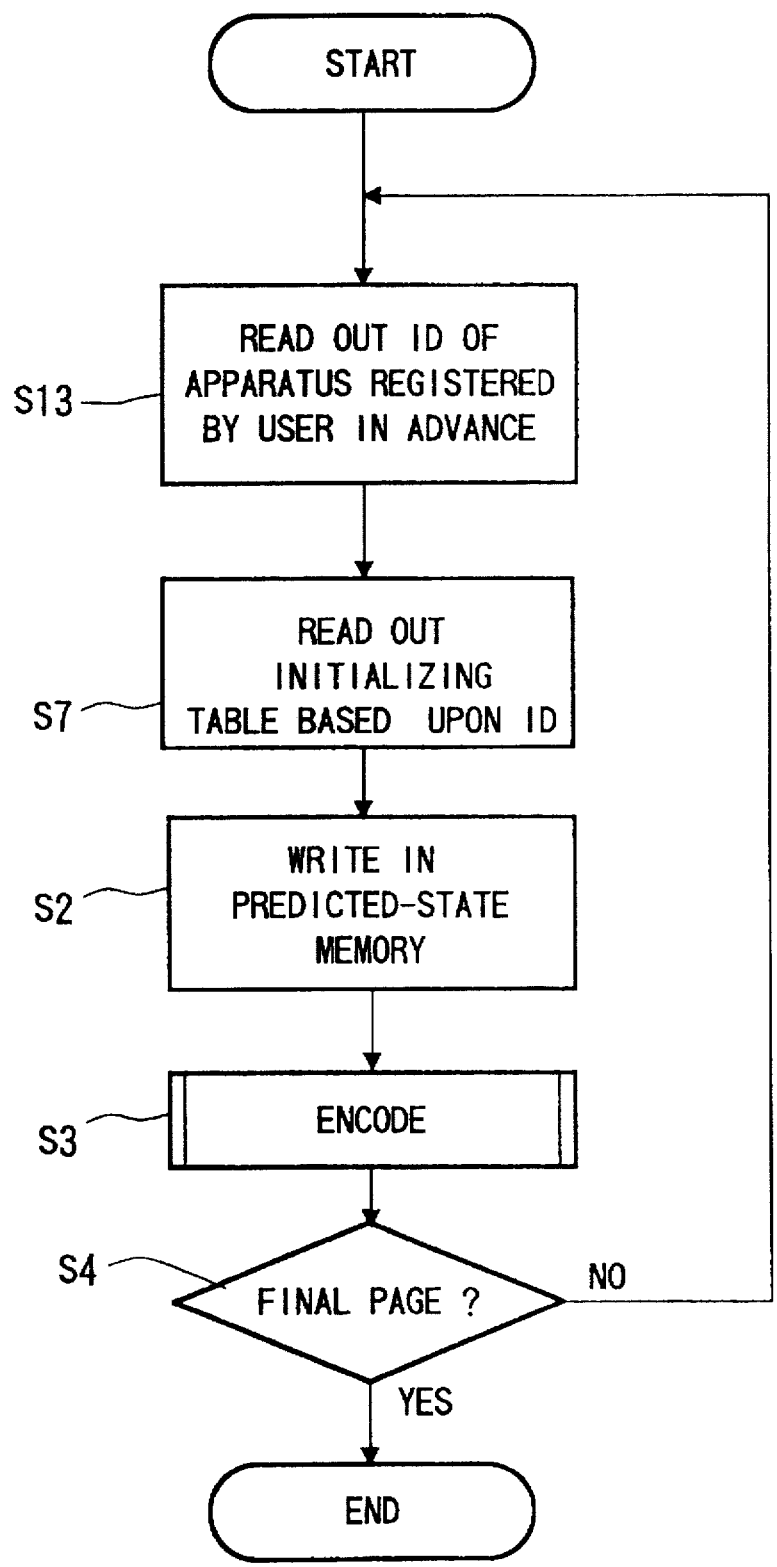

The operation of encoding corresponding to the fourth embodiment will now be described in accordance with the flowchart shown in FIG. 61.

When there is a request to begin encoding, the ID of the apparatus set by the user at the time of registration is read out at step S13, the values of the initializing table selected by this ID are read out at step S7, and these values are written in the predicted-state memory 115 at step S2. Thereafter, as in the fourth embodiment, the processing of steps S13, S7, S2 and S3 is repeated. When processing of the final page ends at step S4, encoding is terminated. At the time of transmission, a cipher identification code is appended to the header, after which the encoded data is transmitted.

Figure 62:
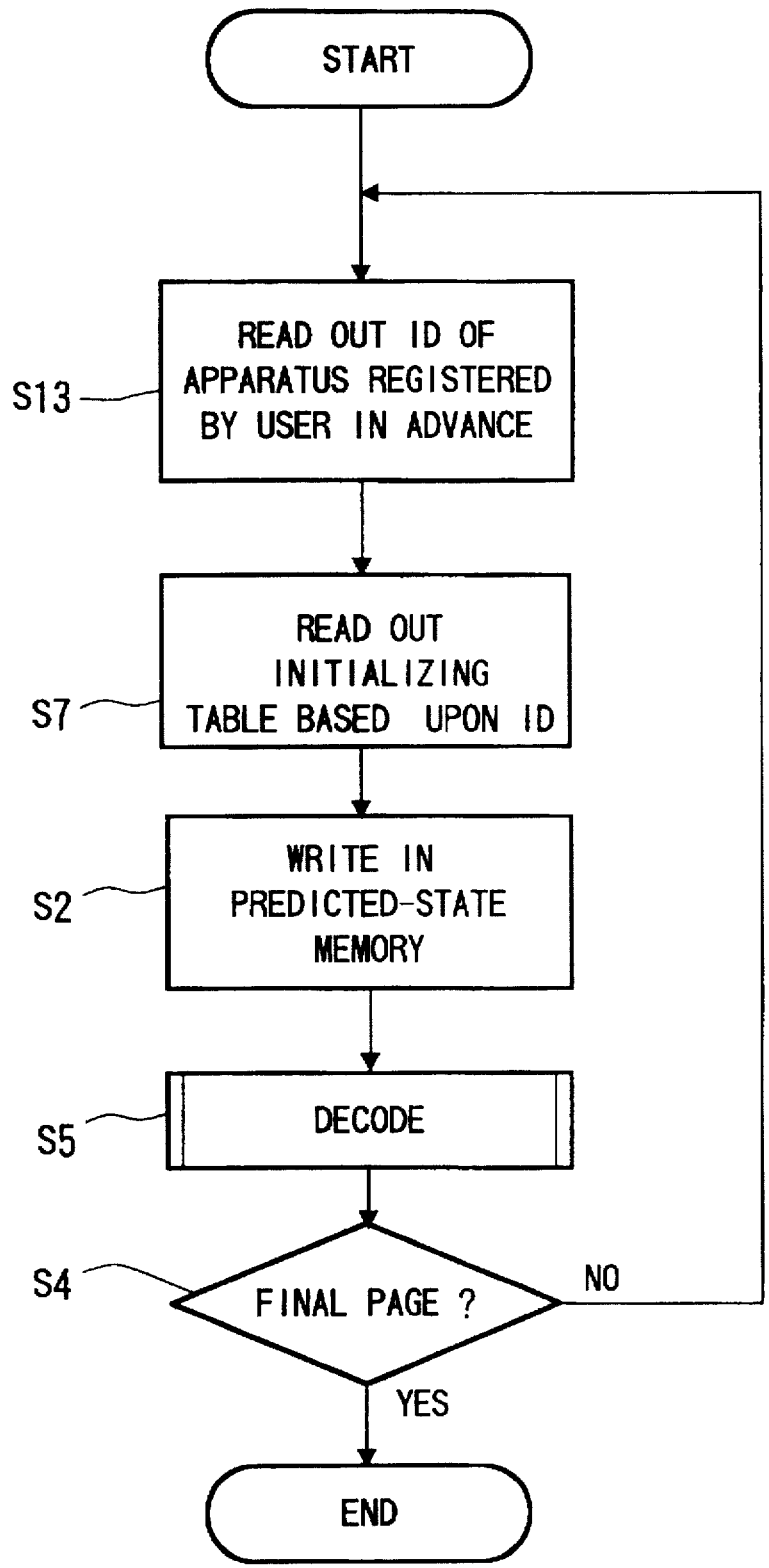

The operation of decoding corresponding to the fourth embodiment will now be described in accordance with the flowchart of FIG. 62.

When it is determined that the header of the received data has the cipher identification code appended thereto, the ID of the apparatus set by the user at the time of registration is read out at step S13, the values of the initializing table selected by this ID are read out at step S7, and these values are written in the predicted-state memory 115 at step S2. Thereafter, as in the fourth embodiment, the processing of steps S13, S7, S2, S5 is repeated. When processing of the final page ends at step S4, decoding is terminated.

Figure 63:
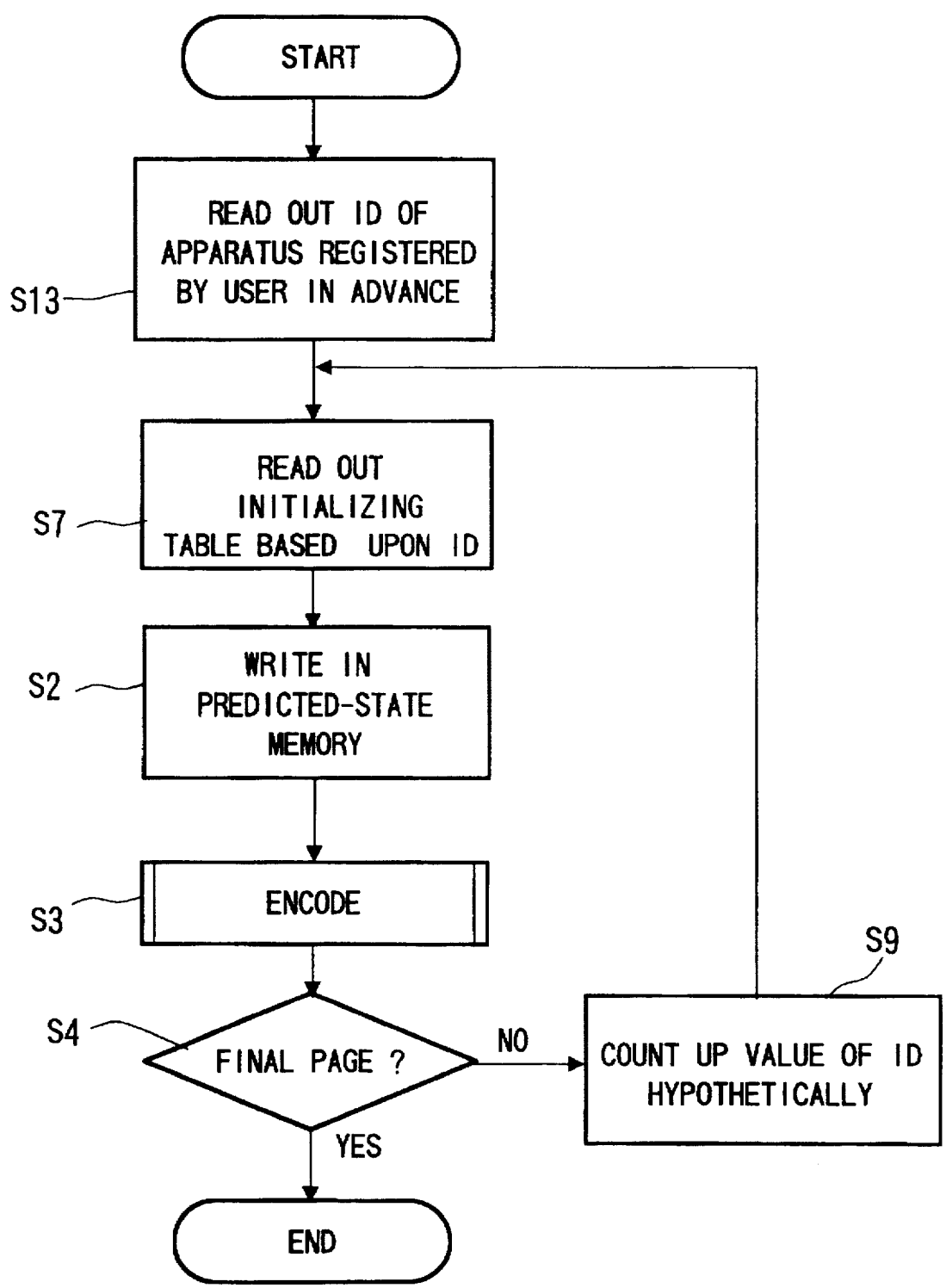

The operation of encoding corresponding to the sixth embodiment will now be described in accordance with the flowchart shown in FIG. 63.

When there is a request to begin encoding, the ID of the apparatus set by the user at the time of registration is read out at step S13, the values of the initializing table selected by this ID are read out at step S7, and these values are written in the predicted-state memory 115 at step S2. Thereafter, as in the sixth embodiment, the processing of steps S7, S2, S3 and S9 is repeated. When processing of the final page ends at step S4, encoding is terminated. At the time of transmission, a cipher identification code is appended to the header, after which the encoded data is transmitted.

Figure 64:
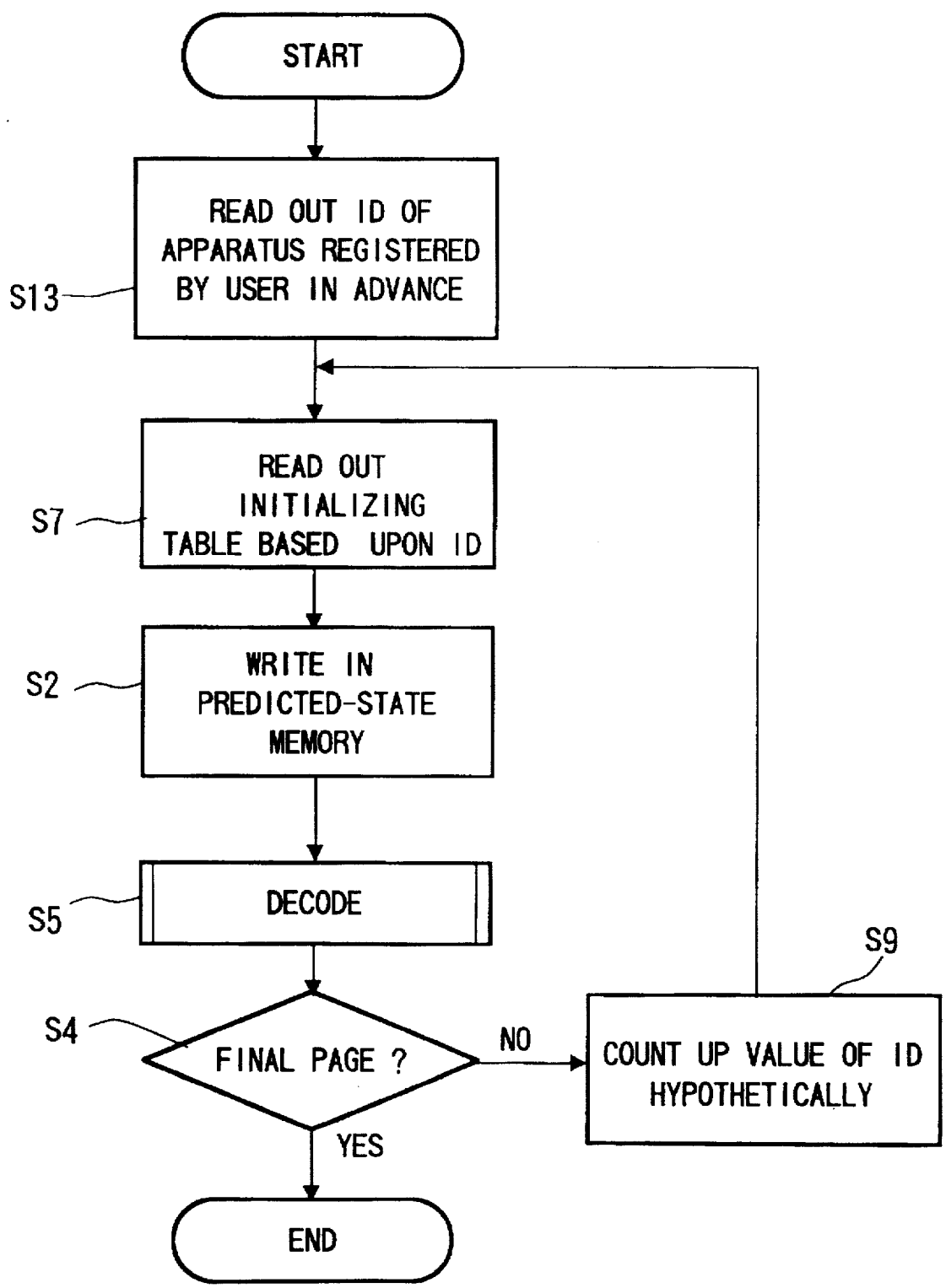

The operation of decoding corresponding to the sixth embodiment will now be described in accordance with the flowchart of FIG. 64.

When it is determined that the header of the received data has the cipher identification code appended thereto, the ID of the apparatus set by the user at the time of registration is read out at step S13, the values of the initializing table selected by this ID are read out at step S7, and these values are written in the predicted-state memory 115 at step S2. Thereafter, as in the sixth embodiment, the processing of steps S7, S2, S5, S9 is repeated. When processing of the final page ends at step S4, decoding is terminated.

Figure 65:
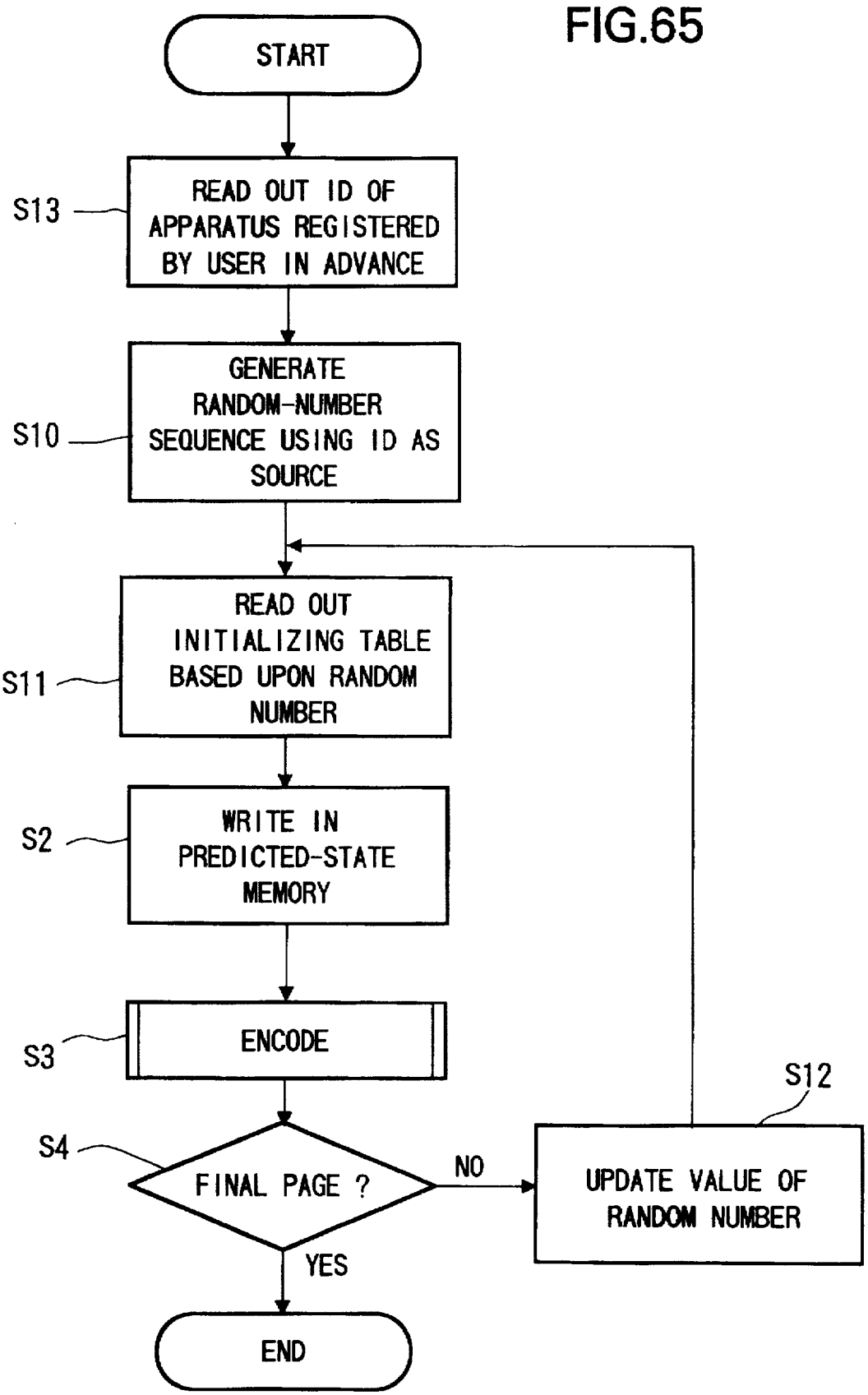

The operation of encoding corresponding to the eighth embodiment will now be described in accordance with the flowchart shown in FIG. 65.

When there is a request to begin encoding, the ID of the apparatus set by the user at the time of registration is read out at step S13 and a random-number sequence is generated at step S10. Thereafter, as in the eighth embodiment, the processing of steps S11, S2, S3 and S12 is repeated. When processing of the final page ends at step S4, encoding is terminated. At the time of transmission, a cipher identification code is appended to the header, after which the encoded data is transmitted.

Figure 66:
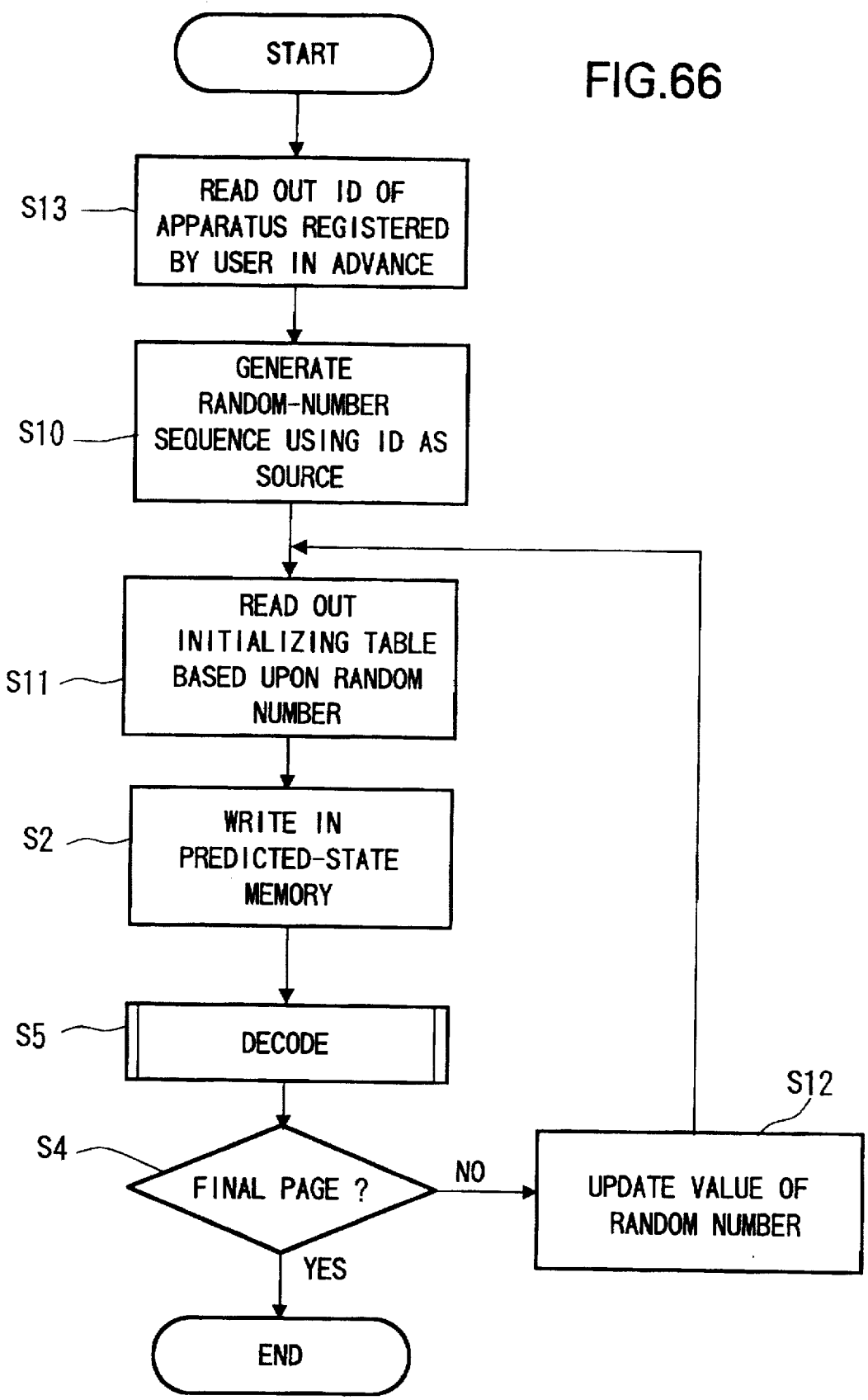

The operation of decoding corresponding to the eighth embodiment will now be described in accordance with the flowchart of FIG. 66.

When it is determined that the header of the received data has the cipher identification code appended thereto, the ID of the apparatus set by the user at the time of registration is read out at step S13 and a random-number sequence is generated at step S10 with this ID serving as the source. Thereafter, as in the eighth embodiment, the processing of steps S11, S2, S5, S12 is repeated. When processing of the final page ends at step S4, decoding is terminated.

Though ROMs and RAMs are mentioned as the memories in the embodiments, this does not impose a limitation upon the invention. For example, a RAM or a hard disk may be used in place of a ROM.

Further, though the ID in the embodiments is a four-bit numerical value, this does not impose a limitation upon the invention. For example, the ID may be a numerical value of another number of bits or a character.

Thus, in accordance with the embodiments described above, the confidentiality of transmitted data can be maintained by encoding or decoding the data in dependence upon identification apparatus specifying the apparatus.

As many apparently widely different embodiments of the present invention can be made without departing from the spirit and scope thereof, it is to be understood that the invention is not limited to the specific embodiments thereof except as defined in the appended claims.

What is claimed is:

1. An image transmission apparatus comprising:

input means for inputting image data representing a value of each pixel of an image;

predicting means for predicting a value of a pixel of interest in the image;

initializing means for initializing an index representing a probability of an inferiority symbol in dependence upon identification information which specifies an apparatus;

providing means for providing the probability of an inferiority symbol based on the index initialized by said initializing means;

arithmetic encoding means for arithmetic encoding the image data based upon the predicted value of the pixel of interest and the probability of an inferiority symbol provided by said providing means; and transmitting means for transmitting the encoded image data obtained by said arithmetic encoding means.

2. The apparatus according to claim 1, wherein said initializing means comprises:

memory means for storing a plurality of initializing tables in which a plurality of indexes are written; and selecting means for selecting an initializing table stored in said memory means in dependence upon the identification information, wherein said providing means provides the probability of an inferiority symbol based upon the index written in the initializing table selected by said selecting means.

3. The apparatus according to claim 1, wherein said transmitting means transmits the encoded image data with a cipher identification code.

4. The apparatus according to claim 1, wherein said providing means comprises a predicted-state memory for storing the index, wherein the index stored in said predicted-state memory is initialized at the beginning of one communication.

5. The apparatus according to claim 4, wherein initialization of the index stored in said predicted-state memory is carried out in units of a page.

6. The apparatus according to claim 2, wherein said selecting means selects the initializing table in units of a page based upon the identification information.

7. The apparatus according to claim 6, wherein said selecting means selects the initializing table in accordance with identification information which is changed in units of a page.

8. The apparatus according to claim 2, wherein said selecting means selects the initializing table in accordance with a random number generated based upon the identification information.

9. An image transmission method comprising the steps of:

inputting image data representing a value of each pixel of an image;

predicting a value of a pixel of interest in the image;

initializing an index representing a probability of an inferiority symbol in dependence upon identification information which specifies an apparatus;

providing the probability of an inferiority symbol based upon the index initialized in said initializing step;

arithmetic encoding the image data based upon the predicted value of the pixel of interest and the probability of an inferiority symbol provided in said providing step; and transmitting the encoded image data obtained in said arithmetic encoding step.

10. The method according to claim 9, wherein the encoded image data is transmitted with a cipher identification code.

11. The method according to claim 9, wherein said initializing step comprises the step of selecting one of a plurality of initializing tables, in which a plurality of indexes are written, in dependence upon the identification information, wherein, in said providing step, the probability of an inferiority symbol is provided based upon the index written in the initializing table selected in said selecting step.

12. An image decoding apparatus for decoding encoded image data of an image which is obtained by predicting a value of a pixel of interest in the image and arithmetic encoding the image data based upon the predicted value of the pixel of interest and a probability of an inferiority symbol, comprising:

receiving means for receiving the encoded image data representing the image;

initializing means for initializing an index representing a probability of an inferiority symbol in dependence upon identification information which specifies an apparatus which transmits the encoded image data;

providing means for providing the probability of an inferiority symbol based upon the index initialized by said initializing means; and decoding means for decoding the encoded image data based upon the probability of an inferiority symbol provided by said providing means.

13. The apparatus according to claim 12, wherein said initializing means comprises:

memory means for storing a plurality of initializing tables in which a plurality of indexes are written; and selecting means for selecting an initializing table stored in said memory means in dependence upon the identification information, wherein said providing means provides the probability of an inferiority symbol based upon the index written in the initializing table selected by said selecting means.

14. The apparatus according to claim 12, wherein said decoding means comprises a predicted-state memory for storing the index, wherein the index stored in said predicted-state memory is initialized at the beginning of one communication.

15. The apparatus according to claim 14, wherein the initialization of the index stored in said predicted-state memory is carried out in units of a page.

16. The apparatus according to claim 13, wherein said selecting means selects the initializing table in units of a page based upon the identification information.

17. The apparatus according to claim 16, wherein said selecting means selects the initializing table in accordance with identification information which is changed in units of a page.

18. The apparatus according to claim 13, wherein said selecting means selects the initializing table in accordance with a random number generated based upon the identification information.

19. An image decoding method of decoding encoded image data which is obtained by predicting a value of a pixel of interest and arithmetic encoding image data based upon the predicted value of the pixel of interest and a probability of an inferiority symbol, comprising the steps of:

receiving the encoded image data representing an image;

initializing an index representing a probability of an inferiority symbol in dependence upon identification information specifying an apparatus which transmits the encoded image data;

providing the probability of an inferiority symbol based upon the index initialized in said initializing step; and decoding the encoded image data based upon the probability of an inferiority symbol provided in said providing step.

20. The method according to claim 19, wherein said initializing step comprises the step of selecting one of a plurality of initializing tables, in which a plurality of indexes are written, in dependence upon the identification information.

wherein, in said providing step, the probability of an inferiority symbol is provided based upon the index written in the initializing table selected in said selecting step.

21. An image communication system for communicating image data between a transmitting station and a receiving station, wherein the transmitting station comprises:

input means for inputting image data representing a value of each pixel of an image;

predicting means for predicting a value of a pixel of interest in the image;

first initializing means for initializing an index representing a probability of an inferiority symbol in dependence upon identification information which specifies the transmitting station;

first providing means for providing the probability of an inferiority symbol based on the index initialized by said first initializing means;

arithmetic encoding means for arithmetic encoding the image data based upon the predicted value of a pixel of interest and the probability of an inferiority symbol provided by said first providing means; and transmitting means for transmitting the encoded image data obtained by said encoding means; and wherein the receiving station comprises:

receiving means for receiving the encoded image data;

second initializing means for initializing an index representing a probability of an inferiority symbol in dependence upon identification information which specifies the transmitting station;

second providing means for providing the probability of an inferiority symbol based upon the index initialized by said second initializing means; and decoding means for decoding the encoded image data based upon the probability of an inferiority symbol provided by said second providing means.

22. An image communication method of communicating image data between a transmitting station and a receiving station, comprising the steps of:

at the transmitting station, inputting image data representing a value of each pixel of an image;

predicting a value of a pixel of interest in the image;

initializing an index representing a probability of an inferiority symbol in dependence upon identification information which specifies the transmitting station;

providing the probability of an inferiority symbol based upon the index initialized in said initializing step;

arithmetic encoding image data based upon the predicted value of the pixel of interest and the probability of an inferiority symbol provided in said providing step; and transmitting the encoded image data obtained in said encoding step to the receiving station; and at the receiving station, receiving the encoded image data;

initializing an index representing a probability of an inferiority symbol in dependence upon identification information specifying the transmitting station;

providing the probability of an inferiority symbol based upon the index initialized in said initializing step; and decoding the encoded image data based upon the probability of an inferiority symbol provided in said providing step.

* * * * *